May 1, 1945.  C. T. WALTER ET AL  2,375,155
SEWING MACHINE
Filed Feb. 17, 1941  20 Sheets-Sheet 1

Charles T. Walter
and Lowell R. Newton
INVENTOR

BY R. G. Story
ATTORNEY

ATTEST -

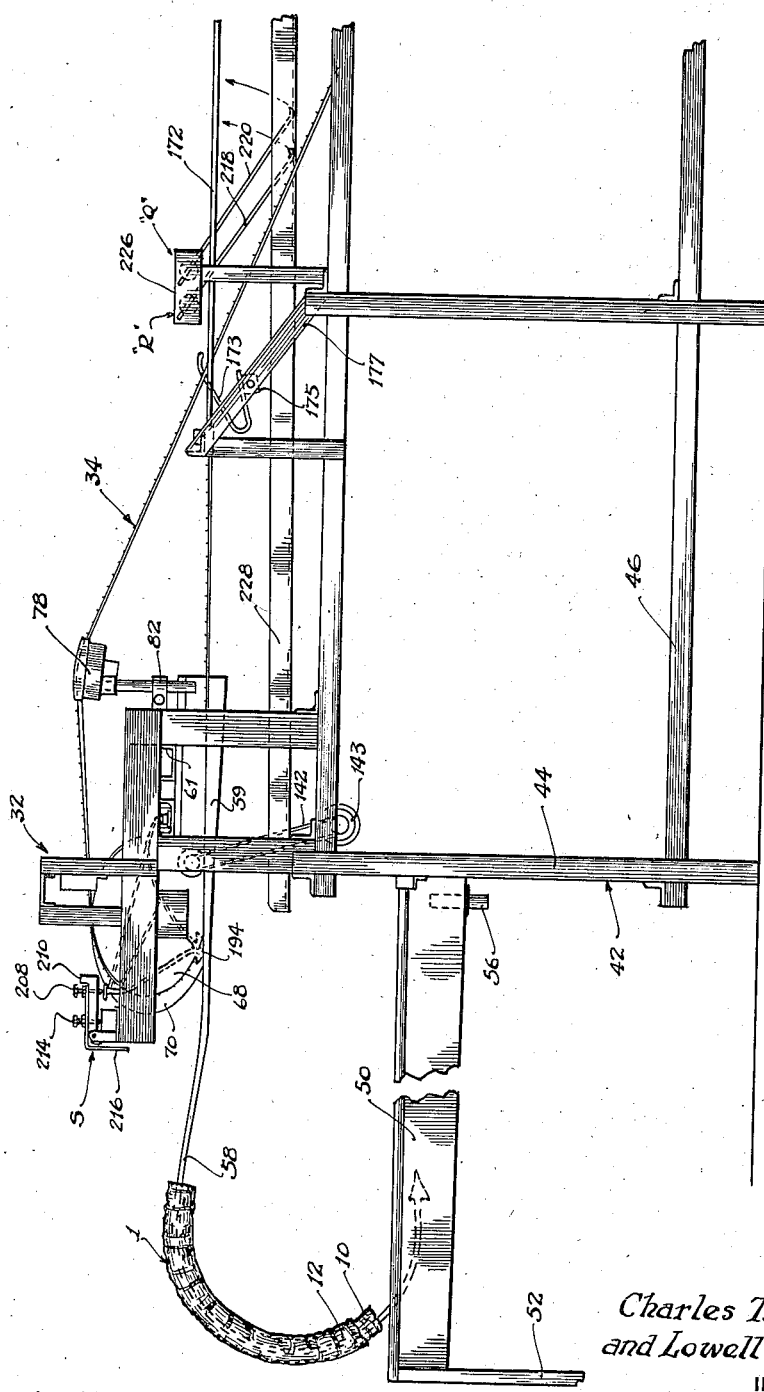

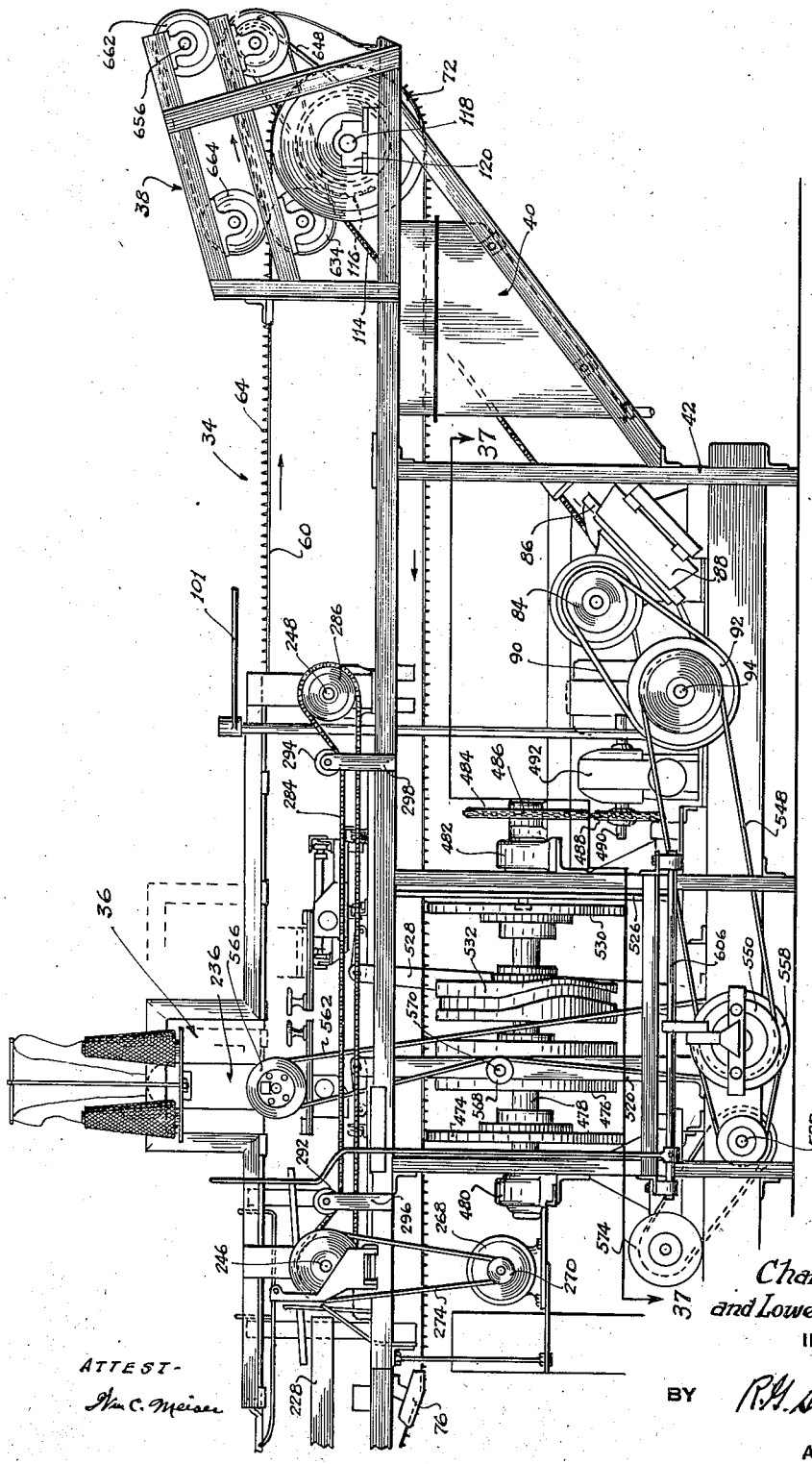

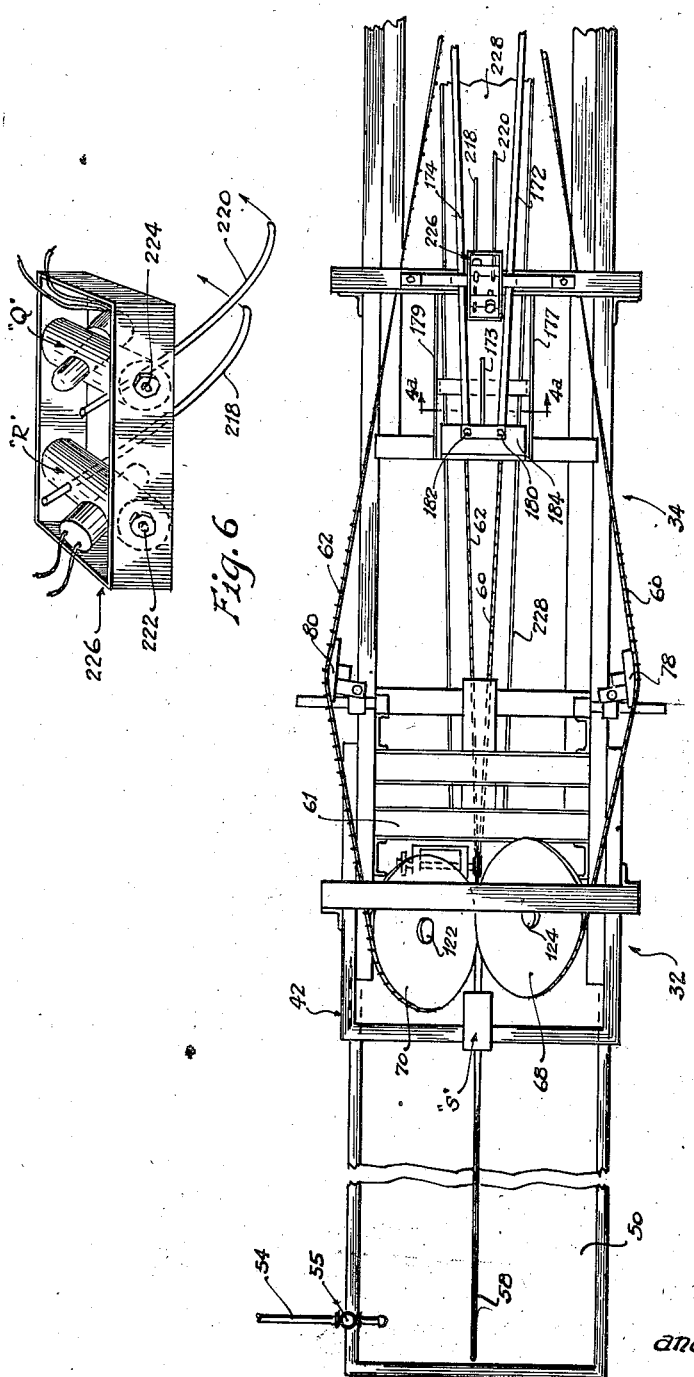

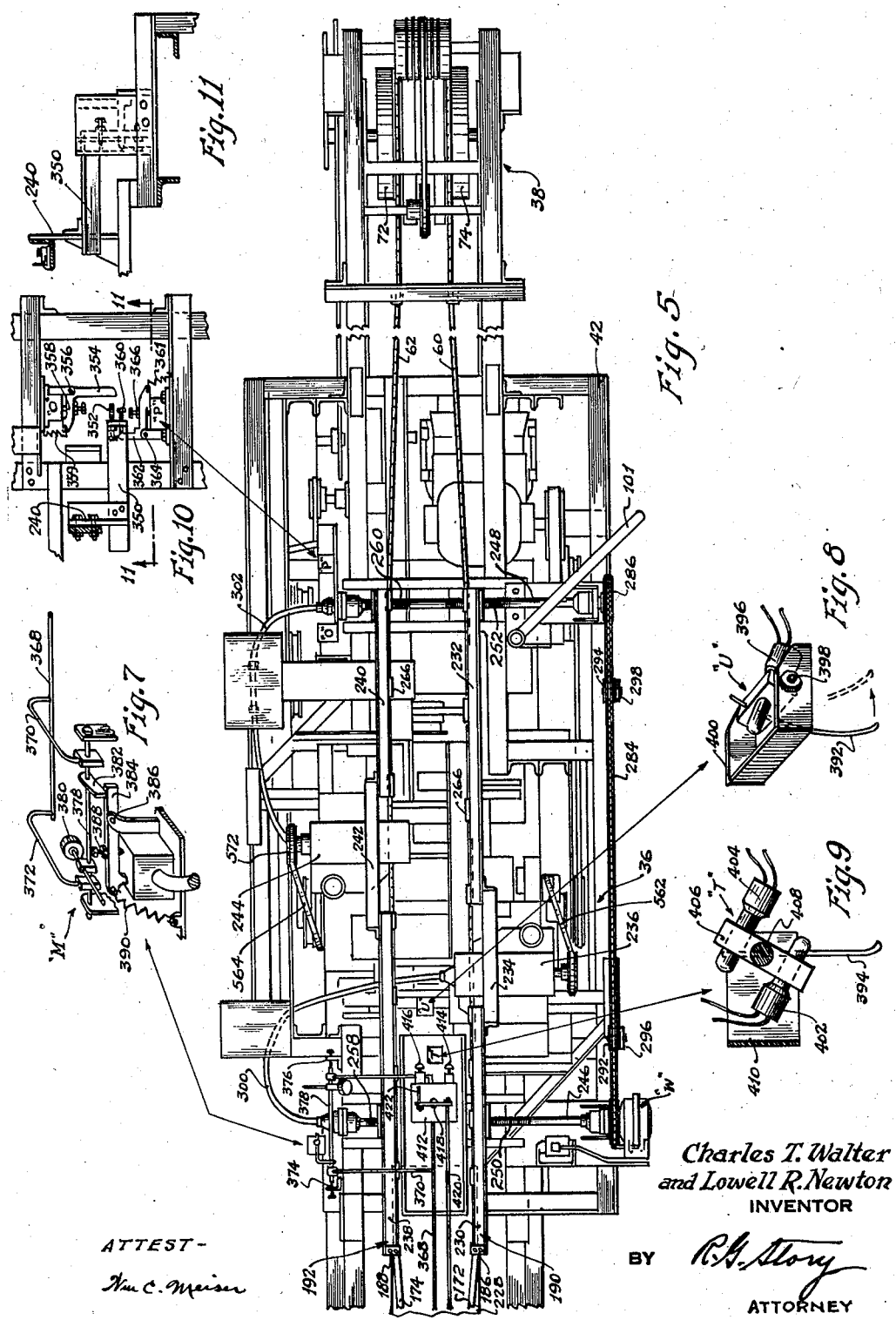

May 1, 1945.                C. T. WALTER ET AL                2,375,155
                                SEWING MACHINE
                            Filed Feb. 17, 1941          20 Sheets-Sheet 6

Charles T. Walter
and Lowell R. Newton
                INVENTOR
BY  R. A. Story
                ATTORNEY ATTEST-
Wm. C. Meiser

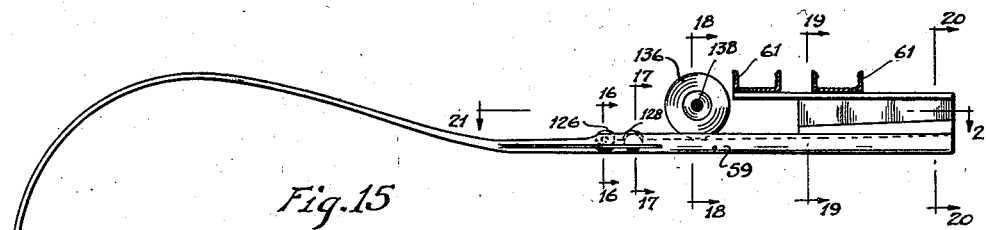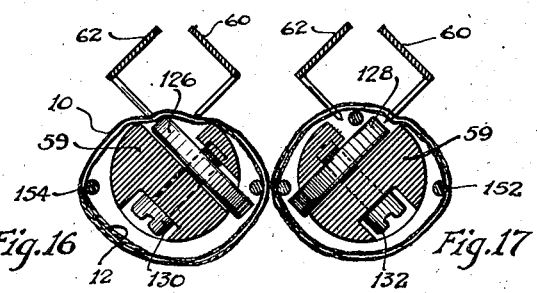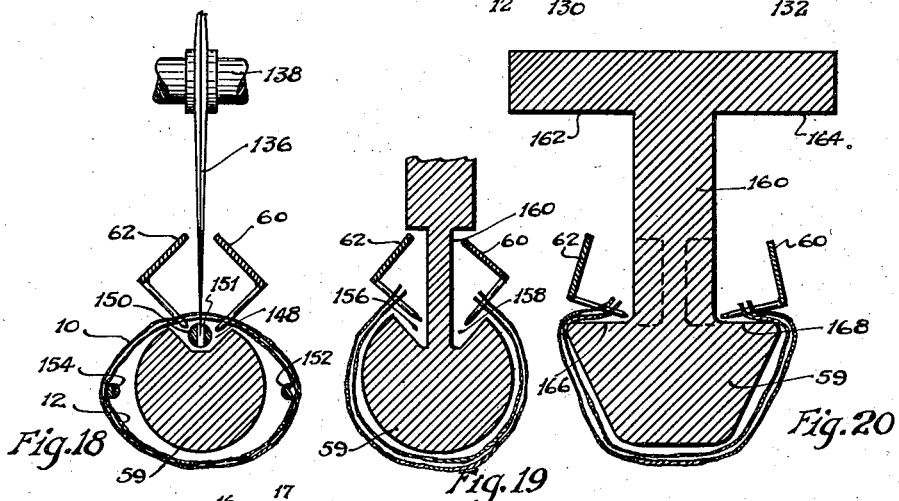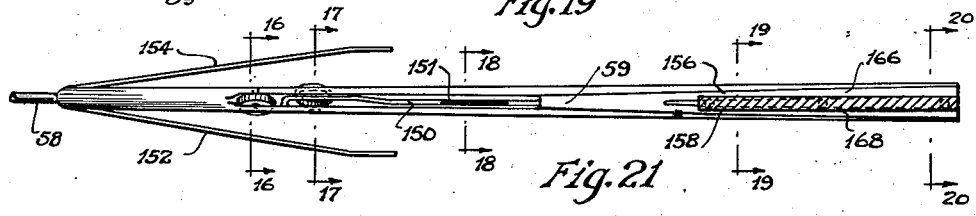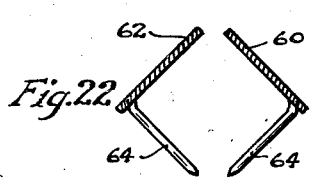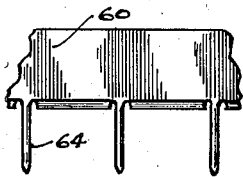

May 1, 1945.  C. T. WALTER ET AL  2,375,155
SEWING MACHINE
Filed Feb. 17, 1941  20 Sheets-Sheet 8

Charles T. Walter
and Lowell R. Newton
INVENTOR

ATTEST-

BY
ATTORNEY

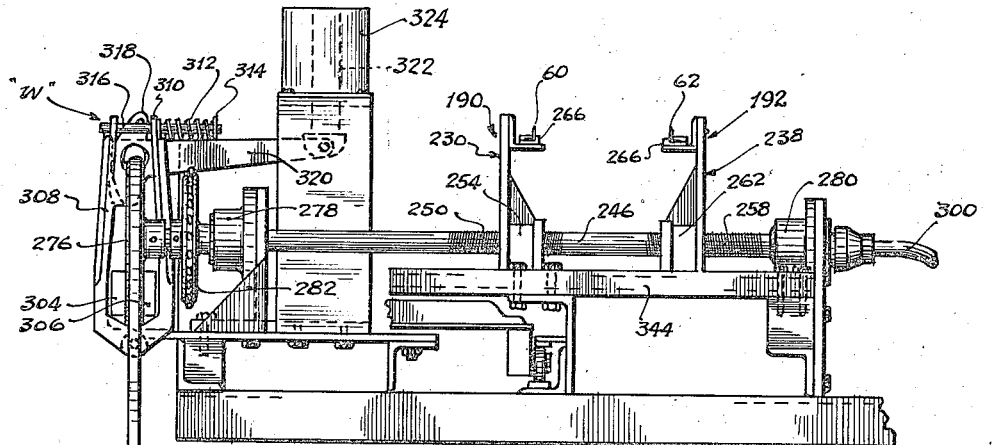
Fig. 31
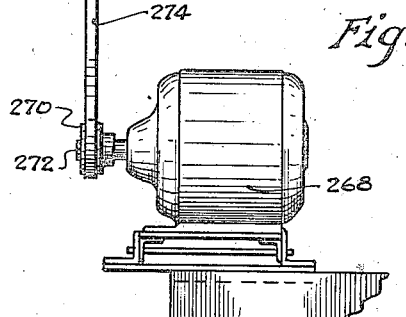
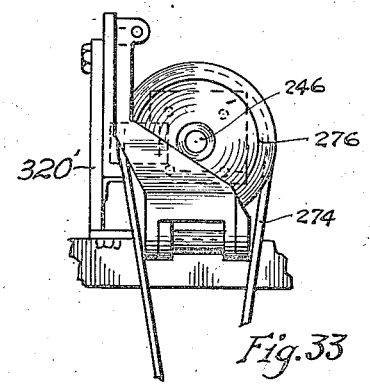
Fig. 33
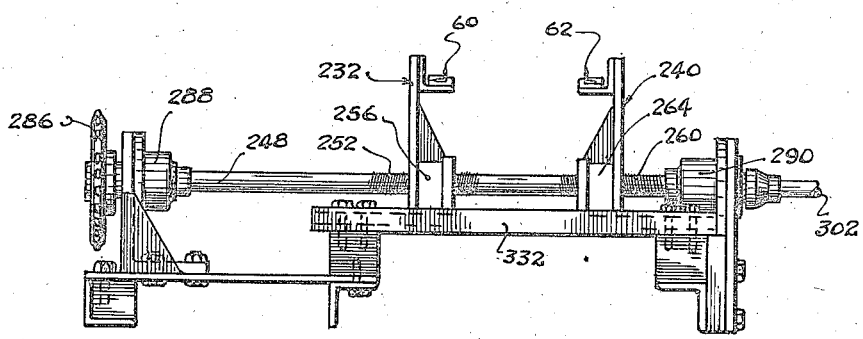
Fig. 32
Charles T. Walter
and Lowell R. Newton
INVENTOR

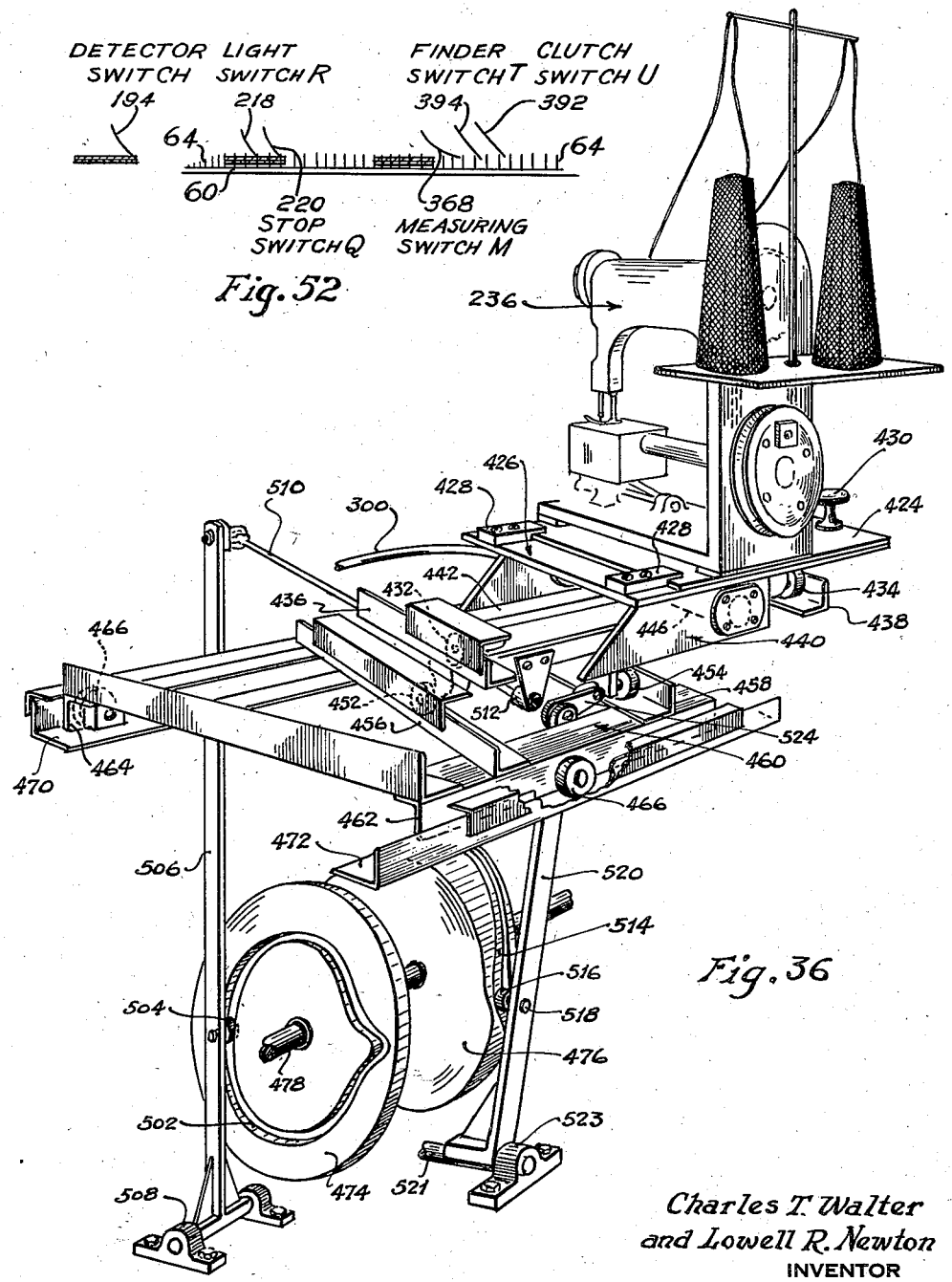

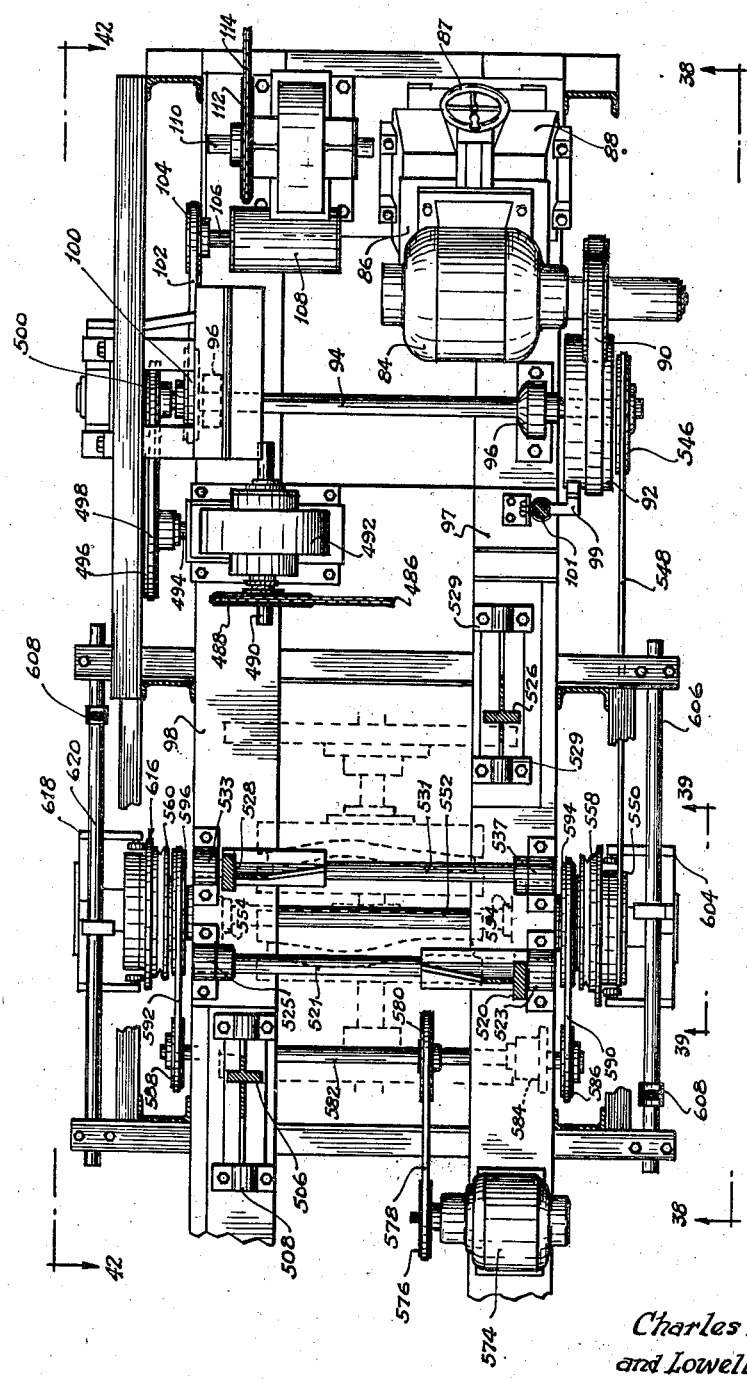

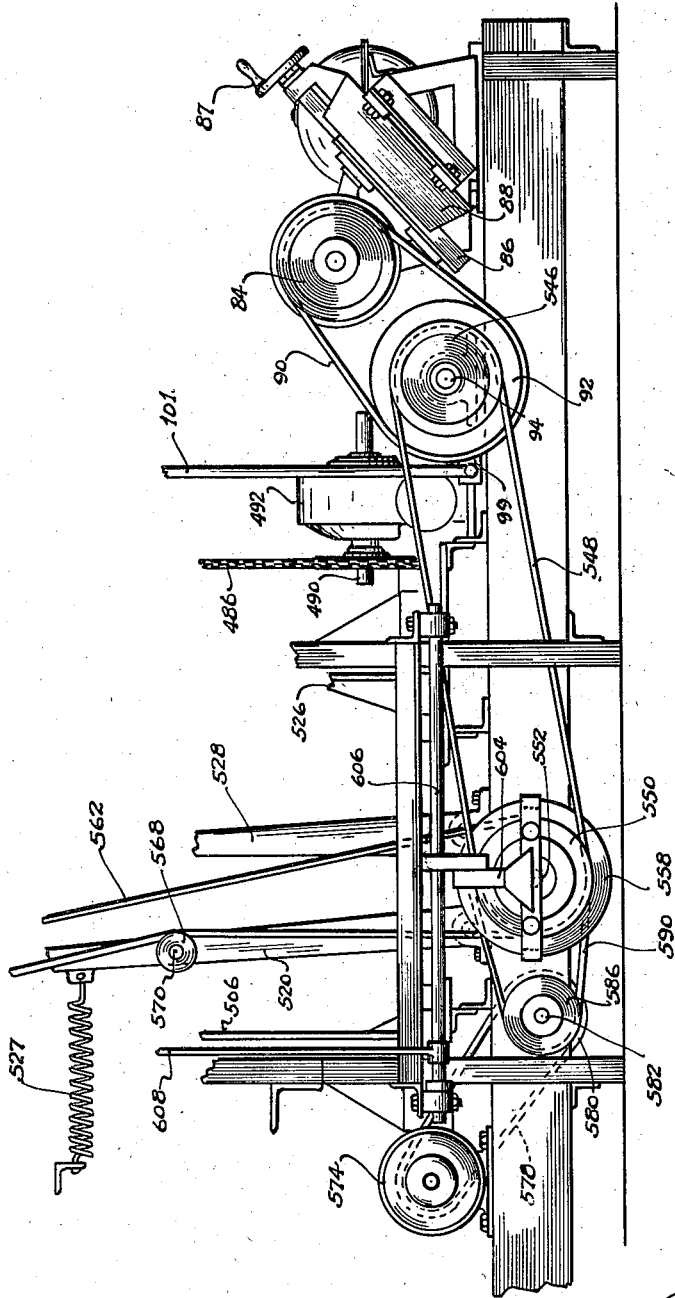

May 1, 1945.  C. T. WALTER ET AL  2,375,155
SEWING MACHINE
Filed Feb. 17, 1941   20 Sheets-Sheet 17
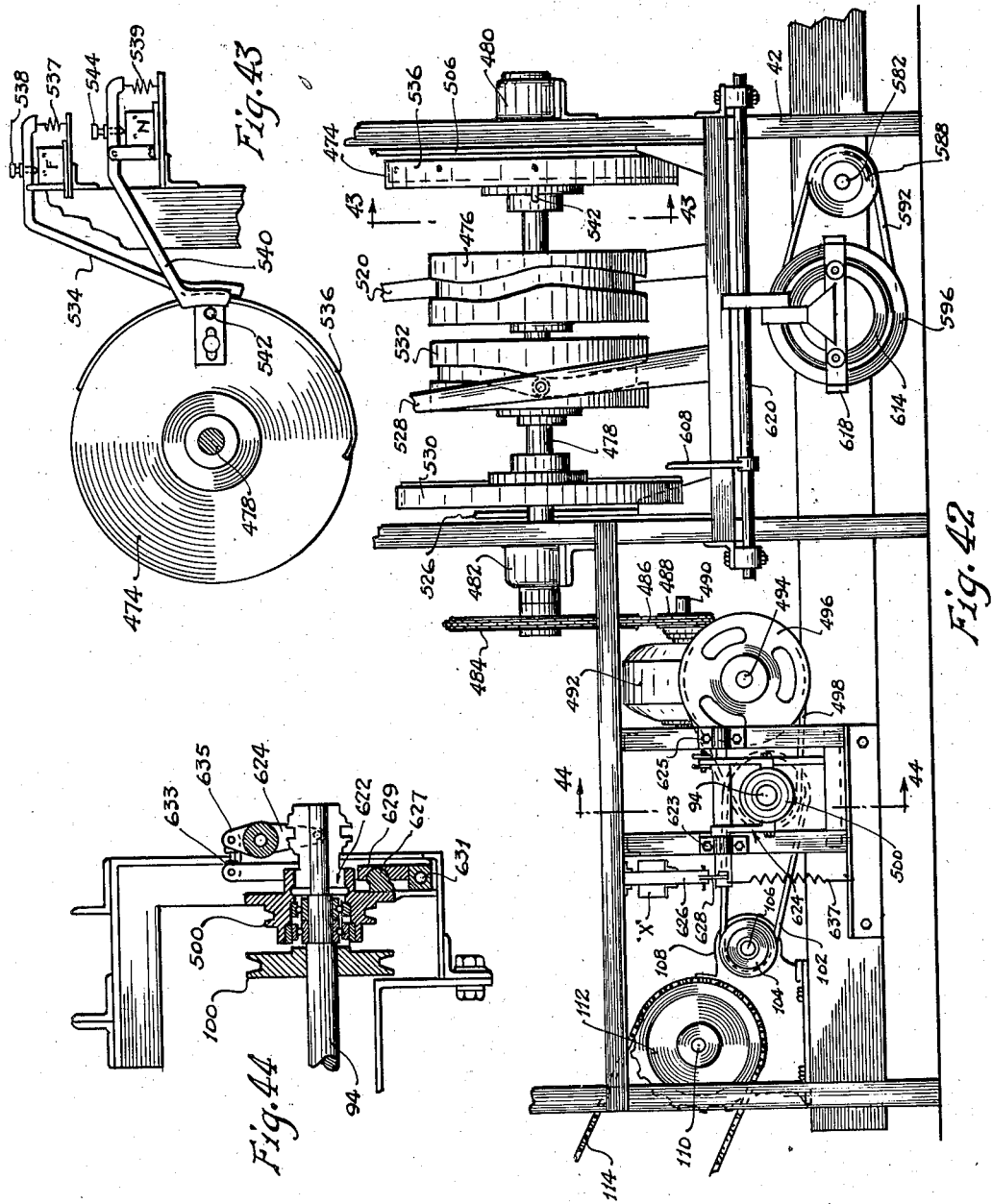
Charles T. Walter
and Lowell R. Newton
INVENTOR
ATTEST-
BY
ATTORNEY

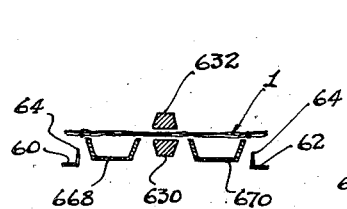
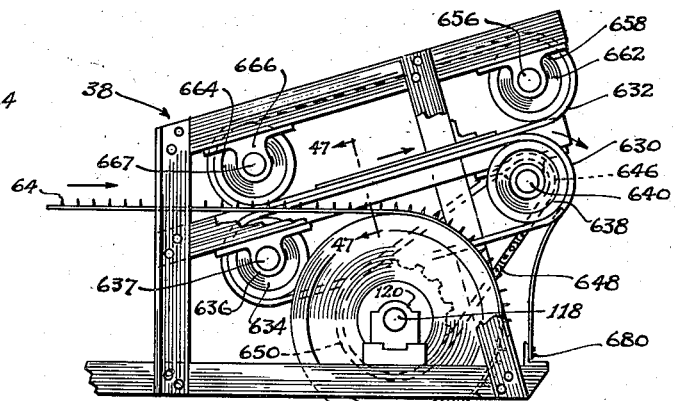
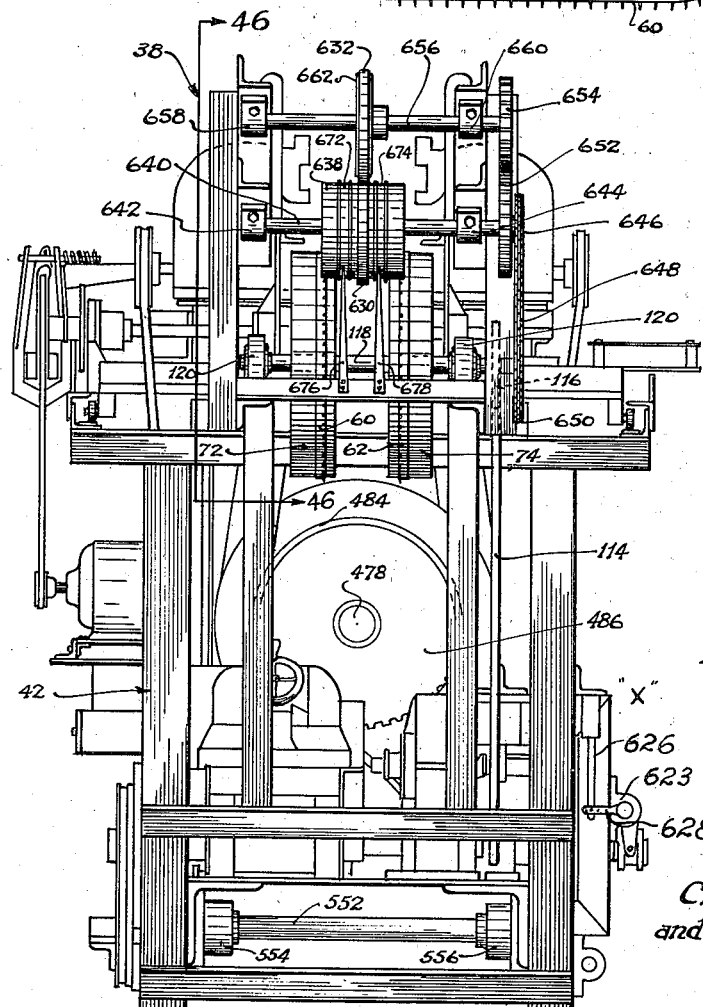

May 1, 1945.  C. T. WALTER ET AL  2,375,155
SEWING MACHINE
Filed Feb. 17, 1941  20 Sheets-Sheet 19

Charles T. Walter
and Lowell R. Newton
INVENTOR

ATTEST -
BY
ATTORNEY

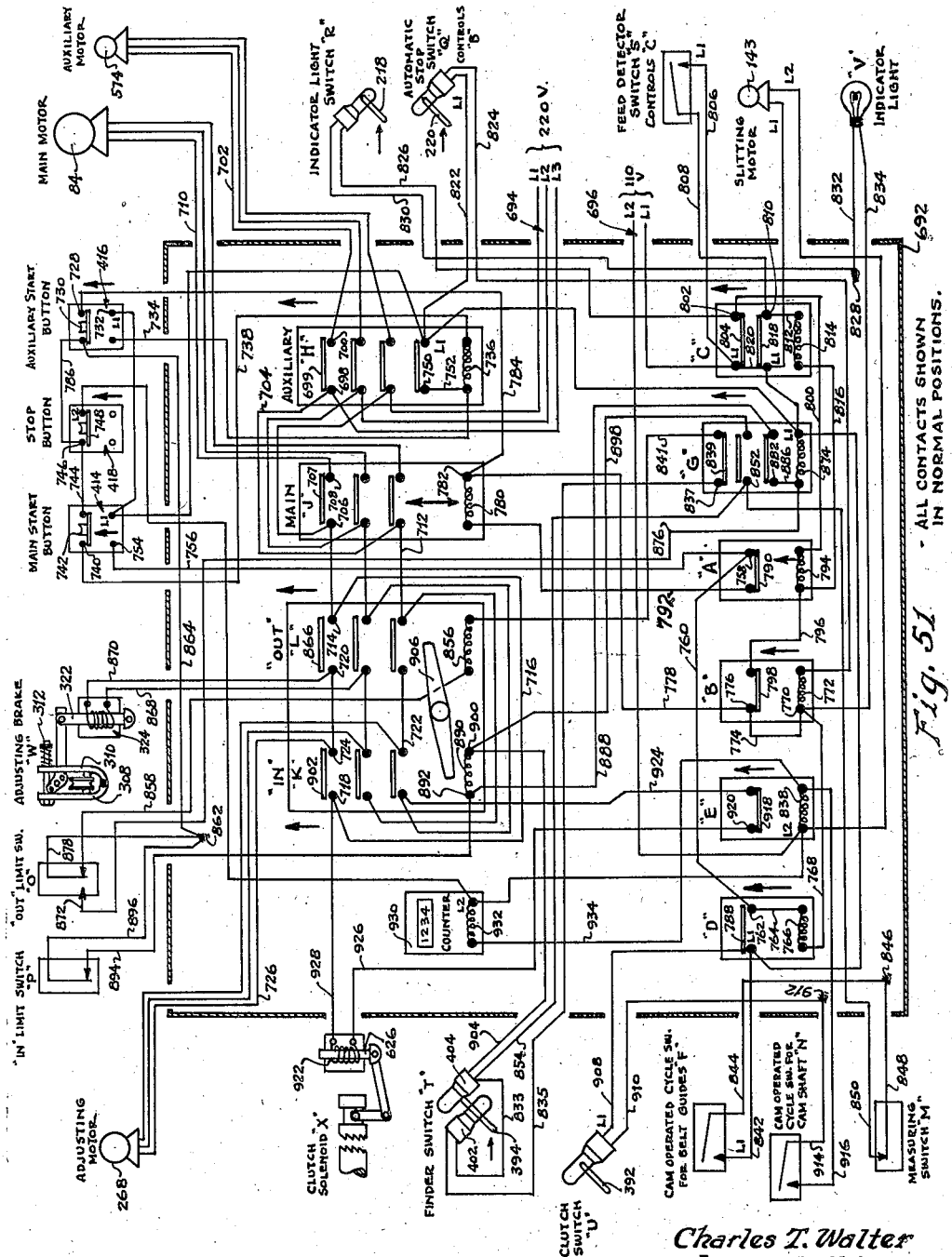

Patented May 1, 1945

2,375,155

UNITED STATES PATENT OFFICE 2,375,155

SEWING MACHINE

Charles T. Walter and Lowell R. Newton, Chicago, Ill., assignors to Industrial Patents Corporation, Chicago, Ill., a corporation of Delaware Application February 17, 1941, Serial No. 379,288

88 Claims. (Cl. 112—2)

The present invention relates to novel means for and method of conditioning telescopically arranged pieces of material to provide enclosures or housings of greater sectional capacity than could be provided from the individual pieces of material.

Among the objects of the present invention is to provide novel means for and method of conditioning telescopically arranged pieces of material to provide superimposed layers of material, which are then stitched to form enclosures or housings adapted to receive and retain material introduced into the same.

Another object of the present invention is to provide novel means for and method of securing, by way of stitching, adjacently disposed pieces of material to form enclosures or housings adapted to receive and retain material introduced into the same.

Still another object of the present invention is to provide novel means for and method of sewing or stitching juxtaposed pieces of material, such as superimposed layers of animal intestines, to provide casings of greater sectional capacity than could be provided from the individual intestines from which the same are made.

Although the present invention embraces within its scope a novel device for and method of securing, by way of stitching, juxtaposed pieces of material to produce enclosures or coverings for materials to be inserted therein and of greater sectional capacity than could be formed from the individual pieces of material, nevertheless the invention, as particularly disclosed and described herein, embodies such novel means for and method of producing meat casings from beef middles or other animal intestines of greater sectional capacity than could be secured from the individual middles or intestines from which the same are made.

In accordance with the prior practices well known in the art in connection with the formation of such meat casings, the said beef middles constituting one particular type of intestine used in forming the said casings of substantial cross section have been processed by various procedures involving, in all instances, however, a stretching and drying of the cut intestines and the stitching or sewing of said dried and conditioned intestines to form the desired casings wherein the pieces forming the same have been secured by said stitching operation along the marginal edges thereof and across one end, thus leaving an open end to the casings for the introduction of meat products therein, after which the same are tied or otherwise fastened together to complete the finished meat product. According to all of these prior art procedures, the said middles or intestines are subject to various procedures prior to the stitching operation and subsequently thereto, requiring a substantial amount of manual handling of the product, greatly increasing the cost of the resulting casing and oftentimes leading to a product which, due to the drying and subsequent moistening step necessary to turn the said casings inside out to form the finished product, has resulted in inferior casings inasmuch as, during such processing and handling, the fats and other fluid bodies of the said casings become rancid or are otherwise affected detrimentally from the standpoint of providing a desirable food product.

The present invention has accordingly proceeded upon the theory of providing a novel mechanism embodying in its structure suitable sewing mechanisms adapted, during the movement of juxtaposed pieces of beef middles or other animal intestines in association therewith, to effect a stitching of the said juxtaposed pieces of intestines to provide these casings of relatively large sectional capacity compared to the sectional capacity of the individual intestines from which the said pieces are formed.

The invention, in one of its phases, has as an object the idea of providing a machine adapted to mechanically condition telescopically arranged beef middles or other animal intestines to sever and present such severed middles or intestines to sewing mechanism adapted to secure the same together in a desired manner and to discharge the stitched middles or intestines from the said machine in a condition to be readily handled and inspected, and in a condition for future use in forming commercial meat products.

One of the objects within the purview of the present invention embraces within its scope the idea of providing a novel method of stitching juxtaposed pieces of animal intestines to provide meat casings, and while the said method, in its broadest aspect, relates to novel stitching steps adapted to be employed in connection with such juxtaposed pieces of animal intestines of conventional length as used in connection with the particular meat products contemplated and which involves stitching the marginal edges thereof followed by a cross-stitching at the end of said juxtaposed pieces of intestine, nevertheless the said novel method includes as one of its characteristics, novel stitching operations applicable to juxtaposed pieces of beef middles or other animal intestines of a length sufficient to form two casings of conventional length for the meat products for which the same are intended, such novel stitching processes involving the steps of securing the marginal edges of said juxtaposed pieces of intestine throughout portions thereof interconnected by way of cross-stitchings of such a character that when the said stitched intestines are severed adjacent the medial line defining the cross-stitching, two completed casings of desired length are formed by proper marginal and end closure stitches.

A further object of the invention particularly relating to the novel means for and method of forming meat casings from juxtaposed pieces of animal intestines is the provision for handling said animal intestines in their original moist and untreated condition to effect the sewing operation and to complete the said casings while in that condition.

The present invention has proceeded upon the principle of providing a novel mechanism or machine particularly adapted for continuous operation for successively conditioning telescopically arranged pieces of animal intestine to slit or cut the same, presenting said cut intestines in proper position in respect of sewing mechanisms for the sewing operations above referred to, and progressively and successively discharging the stitched intestines in the form of untreated casings from said machine in condition for inspection and disposal for the next succeeding process in the formation of meat products in connection with which the same are used.

The present invention, embracing within its scope the idea of continuously and automatically conditioning telescopically arranged intestines intermittently introduced into the operating mechanisms of the said machine in moist condition, involves novel means for and method of continuously and progressively moving the said intestines in slit or cut condition in proper position for a sewing operation, which said sewing operation is effected during continued travel of the said conditioned intestines through the machine, and consists in part of stitching said intestines along the margins thereof, and in part of cross-stitching between said marginal stitching to provide stitched casings from said intestines.

More particularly, the present invention contemplates the provision of novel means for and method of properly presenting the cut and superimposed pieces of animal intestines to the sewing mechanisms for the carrying out of the sewing operation whereby a proper stitching thereof together is effected irrespective of the variations which may exist in the width of successively presented superimposed pieces of animal intestines.

The present invention includes as a further object the provision of novel conveyor mechanism embodying means controlled by the cut superimposed pieces of animal intestines for varying the disposition of said conveyor mechanism to properly present the said juxtaposed pieces of animal intestines to the sewing mechanisms for the sewing operation.

A further object of the present invention is to provide novel means for and method of presenting juxtaposed cut pieces of animal intestines in their original untreated and moist condition to sewing mechanism, involving the use of novel conveyor means comprising spaced conveyor elements adapted to support said juxtaposed animal intestines in taut condition therebetween with their marginal edges in adjacently disposed relation to facilitate a stitching operation in accordance with a predetermined pattern.

Still another object within the purview of the present invention is to provide novel means for and method of stitching said juxtaposed pieces of animal intestine in their original moist and untreated condition throughout a portion of their length adjacent the margins thereof, and which marginal stitches are interconnected by cross-stitching in the form of overlapping loops to form adjacently disposed casings adapted to be severed substantially along the medial line of said loops to provide casings closed at one end when severed from one another.

The present invention further contemplates novel stitching methods involving continuously operable sewing mechanism whereby successively stitched animal intestines are interconnected by stitching to facilitate the stitching of successively presented juxtaposed layers of animal intestines to said sewing mechanism and their further handling upon discharge of the same from the machine.

Still a further object of the present invention is to provide novel means for stripping the said stitched pieces of animal intestines from the conveyor mechanism and for discharging the same from the machine.

A still further object of the invention is to provide novel discharge means for said stitched casings embodying in its structure means particularly adapted for handling said interconnected stitched casings.

Inasmuch as the invention embraces within its scope the idea of providing a continuously operable mechanism for forming stitched casings from the individual animal intestines dependent only upon the feeding of telescopically arranged animal intestines to the machine at predetermined intervals, an object of the present invention is to provide novel electrical control means adapted to control the various operating mechanisms of the machine during the passage of these intestines through the machine at predetermined spaced intervals apart, whereby operation of said operating mechanisms is initiated in proper sequence to one another for conditioning and stitching the said animal intestines.

As a still further object of the present invention, the said novel electrical control means embodies means whereby the feeding of telescopically arranged animal intestines to the machine can be regulated thereby, such regulation being by way of an indicator controlled by said electrical control means to indicate to the operator the proper time at which to feed said telescopically arranged animal intestines to the machine.

A still further object of the present invention is to provide a novel electrical control means embodying means for rendering the conveyor mechanism inoperative to advance the animal intestines beyond a certain station of the machine where an operator does not feed the telescopically arranged animal intestines to the machine at the proper interval of time with respect to the preceding telescopically arranged animal intestines which have been fed thereto.

More particularly, the invention embraces within its scope a novel electrical control means having means operated by feeding telescopically arranged animal intestines at the proper interval of time for maintaining the said electrical control means in operative condition to automatically condition and stitch the said animal intestines progressively as they pass through the machine.

A still further object of the present invention is to provide a novel control mechanism embodying means to indicate to the operator the proper time for feeding another set of telescopically arranged animal intestines to the machine which is uninfluenced by certain control elements which may be accidentally operated by said operator prior to the time when the same should be operated in the normal course of operation of the said machine.

The invention embraces within its scope a novel electrical control means embodying additional means for operating in proper sequence the mechanism incorporated in the machine for tensioning the superimposed layers of animal intestines passing through the machine a predetermined amount and in predetermined sequence in the operation of the machine, whereby the said superimposed layers of animal intestines are properly presented at the proper interval of time in a taut condition to the sewing machines for the stitching operation.

Still another object of the present invention is to provide the said novel electrical control means with means operable under all conditions of operation of the machine to return the guide members for the conveyor involved in the tensioning operation to their minimum spacing, whereby said guide members are always in a position to receive oncoming superimposed layers of animal intestines irrespective of their width and to move under the influence of their operating mechanisms into a position to tension the superimposed layers of animal intestines. The said novel electrical control means also embodies means for rendering the conveyor guide members inoperative after the said superimposed layers of animal intestines suspended between the said conveyor elements have been tensiond a predetermined amount.

A still further object of the present invention is to provide in said novel electrical control means means for initiating movement of the sewing machines in proper predetermined sequence in relation to the tensioning of the superimposed layers of animal intestines to bring about a stitching operation conforming to the pattern herein disclosed.

The present invention further includes as an object the idea of providing a novel electrical control means having means controlling operation of the various operating mechanisms of the machine and which are operated and controlled in predetermined sequence by passage of said pieces of animal intestines in predetermined spaced relation through the machine whereby the various operations in accordance with the present invention are carried out successively and automatically at timed intervals in accordance with the movement of said pieces of animal intestines.

Other objects, features, capabilities and advantages are comprehended by the invention, as will later appear and are inherently possessed thereby.

Referring to the drawings:

Figure 2 is a view in elevation of a part of the machine of Figure 1, with the protective housing removed to disclose the various elements more in detail;

Figure 3 is a view in elevation of another part of the device of Figure 1 of the drawings, with the protective housing removed to likewise disclose the various operating mechanisms more in detail, the said figure, together with Figure 2, disclosing a complete view in side elevation of the machine according to the present invention with its protective housing removed;

Figure 4 is a top plan view of that part of the machine shown in Figure 2 of the drawings;

Figure 4a is a fragmentary view in cross section taken in a plane represented by line 4a—4a of Figure 4 of the drawings;

Figure 5 is a top plan view of that part of the device shown in Figure 3 of the drawings;

Figure 13:
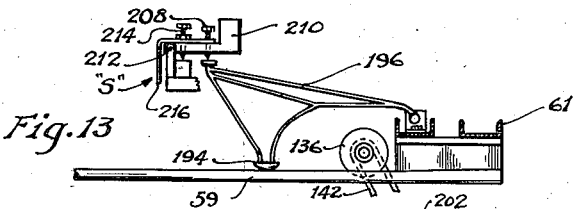
Figure 14:
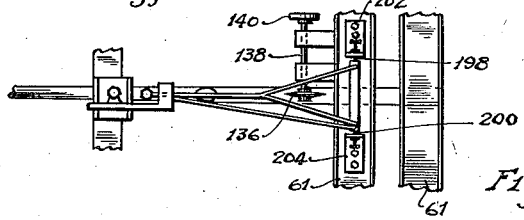
Figure 12:
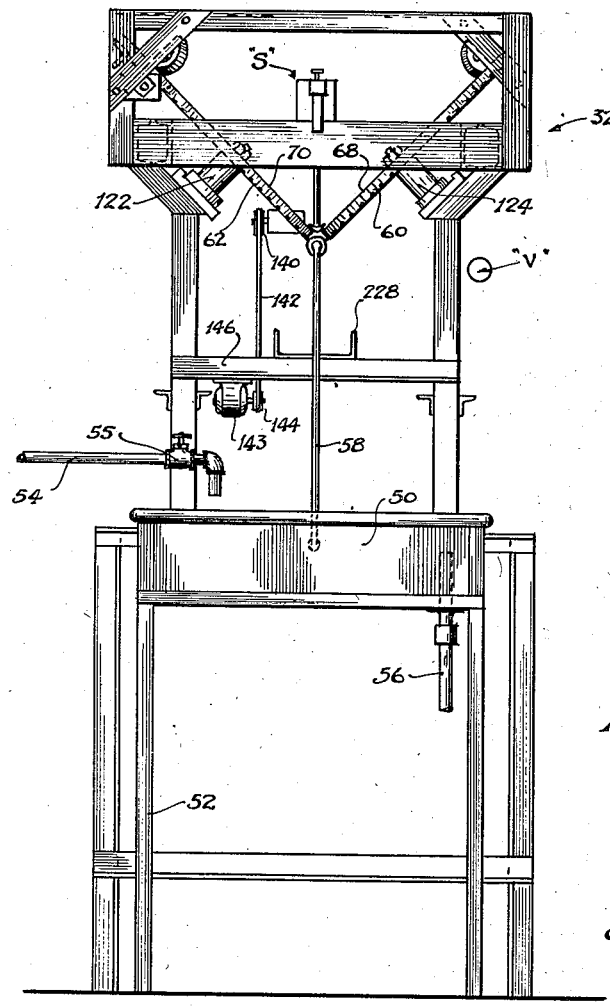
Figure 24:
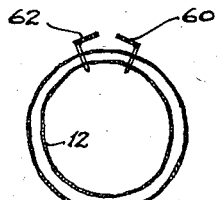
Figure 25:
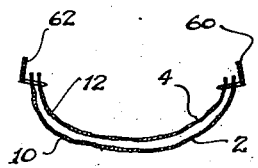
Figure 26:
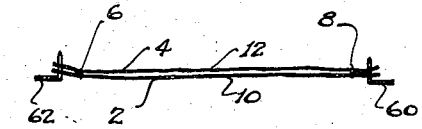
Figure 27:
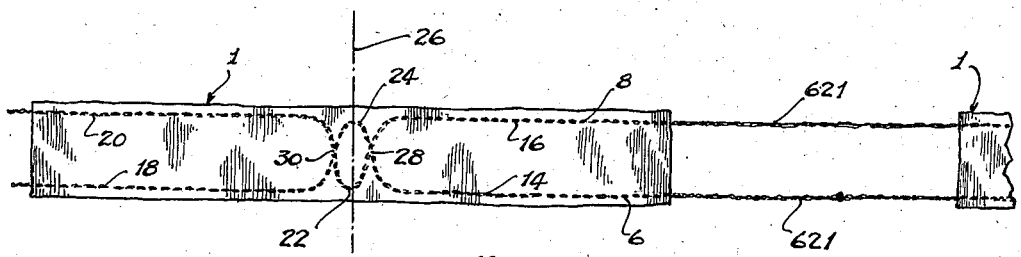
Figure 28:
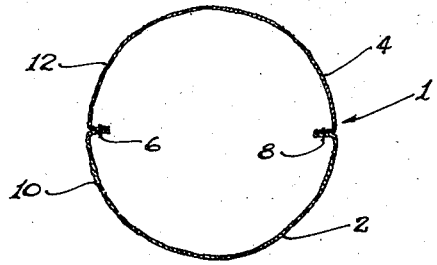
Figure 29:
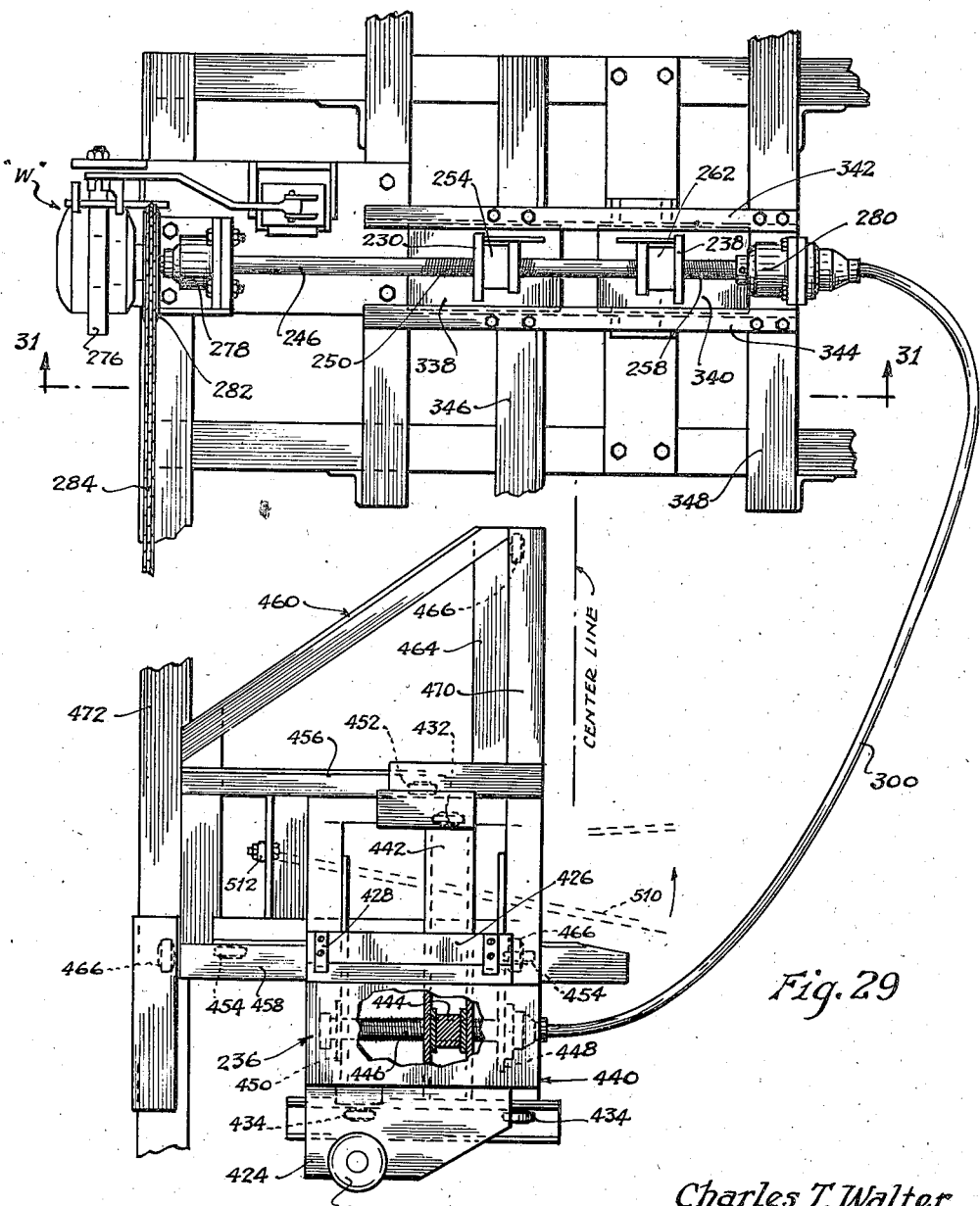
Figure 30:
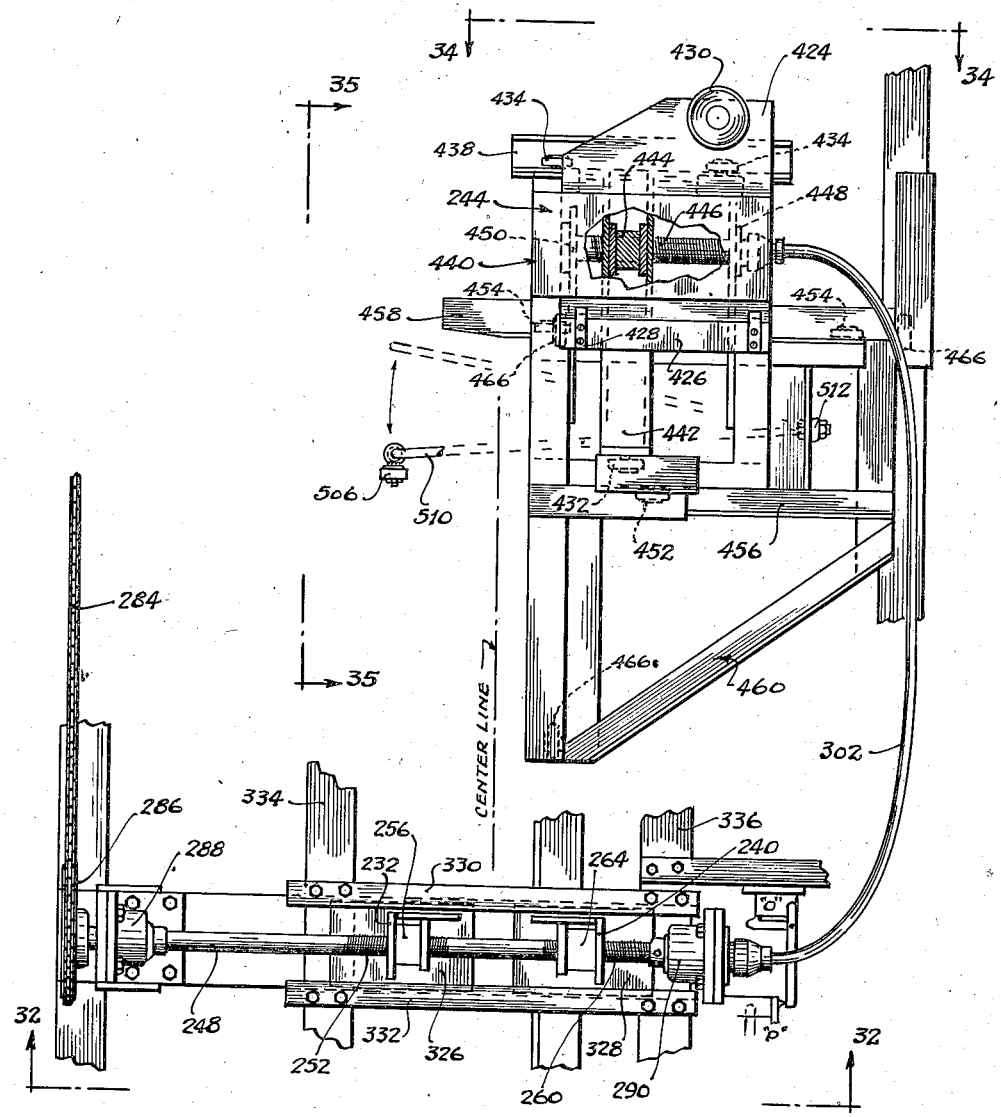
Figure 34:
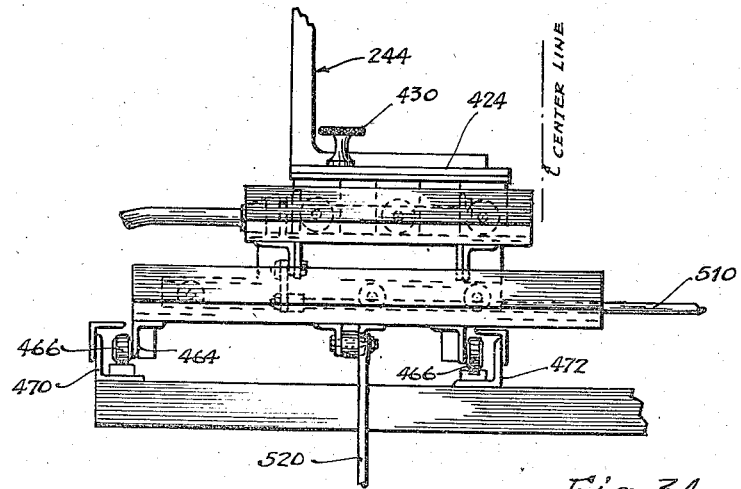
Figure 35:
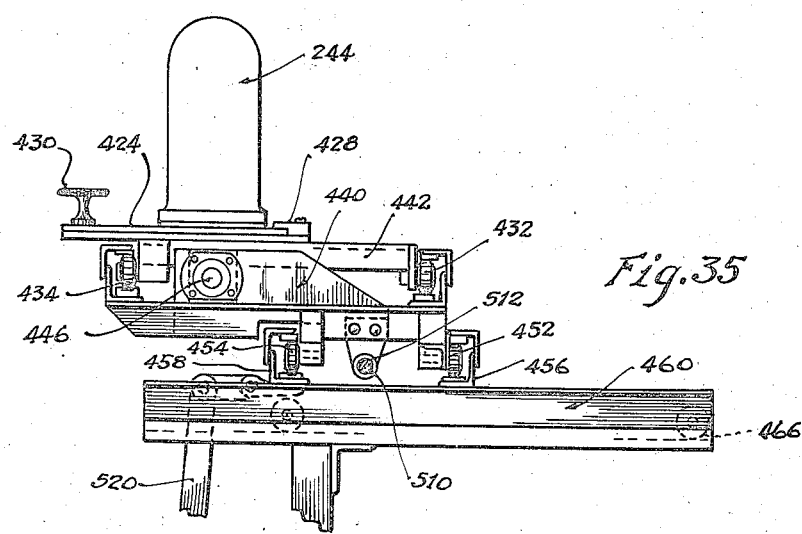
Figure 41:
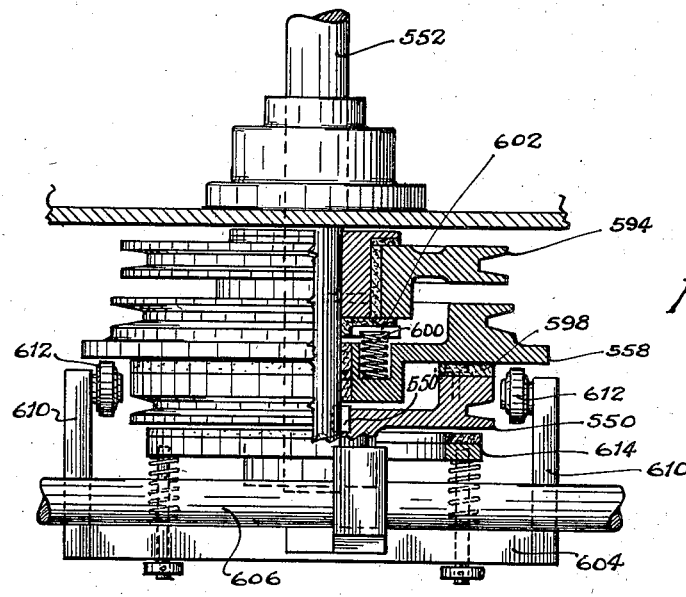
Figure 39:
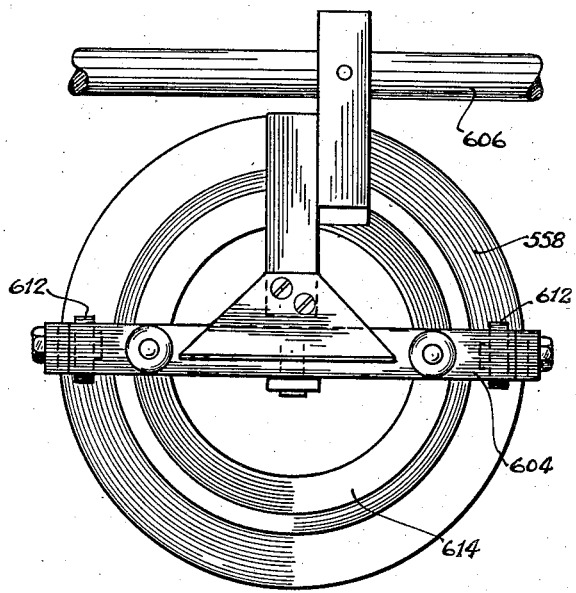
Figure 40:
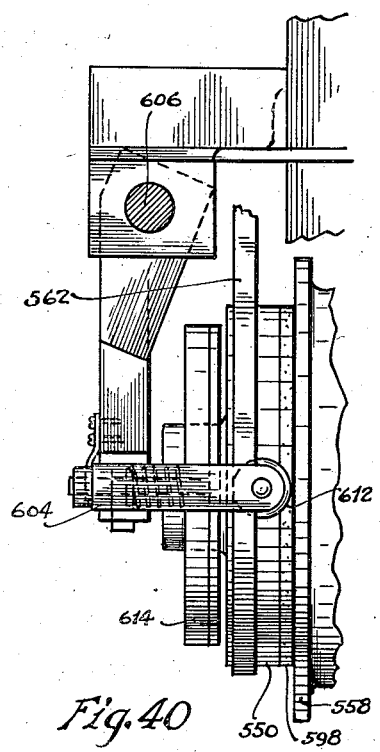
Figure 50:
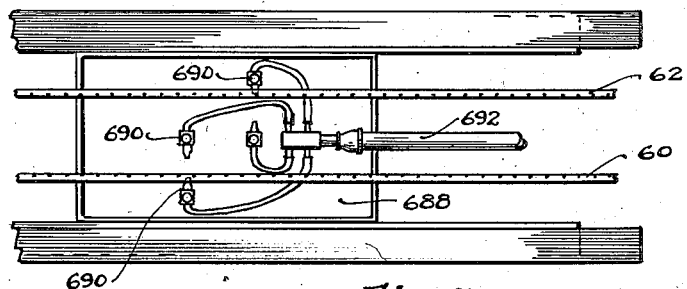
Figure 48:
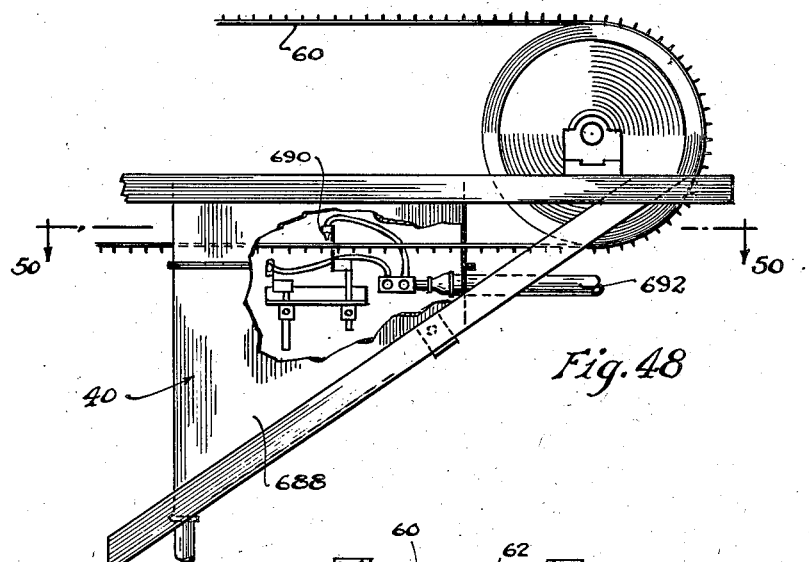
Figure 49:
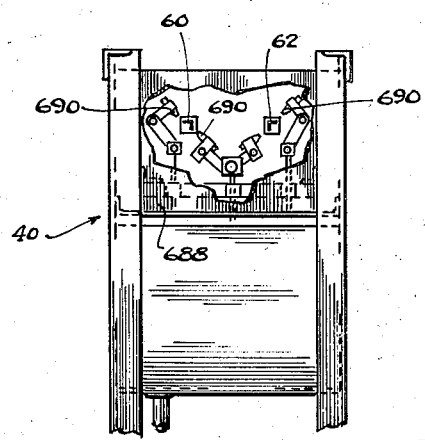

Figures 6 to 11 inclusive are fragmentary detached views, certain of which are in perspective and others of which are in plan and elevation, of control switches incorporated in a control circuit for the device and cooperating with certain mechanisms of the mechanism for controlling the operations thereof;

Figure 12 is a view in end elevation of that part of the device shown in Figures 2 and 4 of the drawings;

Figure 13 is a view partly in elevation and partly in cross section of certain control mechanisms associated with the receiving and cutting or slitting mechanisms shown in Figures 2, 4 and 6 of the drawings;

Figure 14 is a fragmentary top plan view of the mechanisms shown in Figure 13 of the drawings;

Figure 15 is a detached view partly in elevation and partly in section of certain mechanism embodied in the machine at the receiving end thereof;

Figure 16 is a view in cross section taken in the plane represented by line 16—16 of Figure 15 of the drawings;

Figure 17 is a view in cross section taken in the plane represented by line 17—17 of Figure 15 of the drawings;

Figure 18 is a fragmentary view partly in elevation and partly in section taken in the plane represented by line 18—18 of Figure 15 of the drawings;

Figure 19 is a fragmentary view in cross section taken in the plane represented by line 19—19 of Figure 15 of the drawings;

Figure 20 is a view in cross section taken in the plane represented by line 20—20 of Figure 15 of the drawings;

Figure 21 is a fragmentary view partly in plan and partly in section taken in the plane represented by line 21—21 of Figure 15 of the drawings;

Figure 22 is a detached cross-sectional view of the conveying mechanism taken in substantially the plane represented by line 18—18 of Figure 15 of the drawings;

Figure 23 is a fragmentary view in side elevation of one element of said conveying mechanism;

Figure 24 is a diagrammatic view in cross section of telescopically arranged animal intestines in their operative relation to the conveyor and fairly representative of their positions in a plane intermediate the planes represented by lines 17—17 and 18—18 of Figure 15 of the drawings;

Figure 25 is a diagrammatic view in section of the superimposed layers of animal intestines subsequent to the cutting operation performed on the telescopically arranged animal intestines according to Figure 24 of the drawings, and disclosing the same in operative association with the conveyor elements of the device in a plane forwardly of the plane represented by line 20—20 of Figure 15 of the drawings;

Figure 26 is a diagrammatic view in section of the superimposed layers of animal intestines and their operative association with the conveyor elements of the device subsequent to their discharge from the mechanism disclosed in Figure 15 of the drawings;

Figure 27 is a plan view of the juxtaposed pieces of animal intestines stitched in accordance with the sewing operations of the present invention;

Figure 28 is a cross-sectional view of a meat casing made in accordance with the present invention;

Figure 29 is a fragmentary detached view partly in plan and partly in section of certain mechanisms used in the present machine for tensioning the superimposed layers of animal intestines and for moving one of the sewing mechanisms associated therewith;

Figure 30 is a view similar to Figure 29 of mechanisms conforming substantially thereto, also used in the device according to the present invention for performing said operations;

Figure 31 is a fragmentary view partly in section and partly in elevation of mechanism shown in Figure 29 of the drawings and taken substantially in the plane represented by line 31—31 of said figure;

Figure 32 is a fragmentary view partly in section and partly in elevation of mechanism disclosed in Figure 30 of the drawings and taken substantially in the plane represented by line 32—32 of said figure;

Figure 33 is a fragmentary view in end elevation of mechanism shown in Figure 31 of the drawings;

Figure 34 is a fragmentary view partly in section and partly in elevation, taken in the plane represented by line 34—34 of Figure 30 of the drawings;

Figure 35 is a fragmentary view partly in elevation and partly in section taken in the plane represented by line 35—35 of Figure 30 of the drawings;

Figure 36 is a detached view in perspective of operating mechanism for a sewing device embodied in the machine disclosed in Figures 2 to 5 inclusive, and embodying in detail certain of the structures shown in Figures 29, 30, 34 and 35;

Figure 37 is a fragmentary view partly in plan and partly in section taken in the planes substantially represented by line 37—37 of Figure 3 of the drawings;

Figure 38 is a detached fragmentary view in elevation of certain mechanism shown in Figure 37 of the drawings and taken in a plane substantially represented by line 38—38 of Figure 37 of the drawings;

Figure 39 is a fragmentary view in elevation taken in the plane represented by line 39—39 of Figure 37 of the drawings;

Figure 40 is a fragmentary view in side elevation of the structure shown in Figure 39 of the drawings;

Figure 41 is a fragmentary view partly in section and partly in plan of the mechanism shown in Figure 39 of the drawings;

Figure 42 is a fragmentary view in elevation taken in the plane represented by line 42—42 of Figure 37 of the drawings;

Figure 43 is a fragmentary view partly in section and partly in elevation, taken in a plane represented by line 43—43 of Figure 42 of the drawings, and disclosing certain control mechanisms;

Figure 44 is a fragmentary view partly in elevation and partly in section taken in the plane represented by line 44—44 of Figure 42 of the drawings;

Figure 45 is a view in end elevation of the discharge end of the machine shown in Figures 3 and 5 of the drawings;

Figure 46 is a fragmentary view partly in elevation and partly in section taken in the plane represented by line 46—46 of Figure 45 of the drawings;

Figure 47 is a fragmentary view in cross section taken in the plane represented by line 47—47 of Figure 46 of the drawings;

Figure 48 is a fragmentary view in elevation of the belt washer mechanism at the discharge end of the device, with parts broken away to disclose more in particular the detailed construction for the elements thereof;

Figure 49 is a fragmentary view in elevation of the structure shown in Figure 48 of the drawings;

Figure 50 is a fragmentary view partly in plan and partly in section taken in the plane represented by line 50—50 of Figure 48 of the drawings; and Figure 51 is a diagrammatic drawing of the electrical control means for the device made in accordance with the present invention.

Figure 52 is a diagrammatic showing of a series of spaced intestines passing through the machine and engaging the various monitoring means which control the automatic operation of the machine.

Referring now more in detail to the drawings, the present invention in one of its particular adaptations is directed to the provision of a suitable machine for and a method of conditioning beef middles or other animal intestines to provide casings of substantially greater sectional area than could be provided by the individual intestines alone.

Such casings, as 1, as illustrated in Figure 28 of the drawings, are constituted by pieces of animal intestines generally represented in that Figure as 2 and 4, which have been stitched as at 6 and 8 along the margins and across one end thereof, all in accordance with the present invention, to provide a housing or enclosure open at one end for receiving meat products, after which the said open end of the casings can be tied or otherwise secured to completely seal said products to complete the finished article. More particularly, the present invention involves novel mechanism and a novel process whereby telescopically arranged animal intestines 10 and 12, as illustrated in Figures 2 and 24 of the drawings, can be fed into the machine at intervals where the same are slit or cut longitudinally thereof to provide juxtaposed pieces of intestines, as illustrated in Figures 25 and 26, which are then stitched along their marginal edges as at 14—16 and 18—20 throughout portions of the length thereof and are cross-stitched to provide the opposed loops 22 and 24 substantially centrally and intermediate the ends thereof to form stitched animal intestines adapted to be severed along the line 26 constituting substantially the medial line of said opposed loops 22 and 24 to provide two casings closed by the cross-stitching as at 28 and 30. These stitched animal intestines may be turned inside out to form casings such as shown in Figure 28 which are closed at one end as by cross-stitchings 28 and 30 and have their opposite ends open for receiving meat and other products, which ends may be closed in any desired manner to complete the finished article.

The device herein disclosed as constituting an embodiment of the invention includes novel mechanism generally referred to as 32, Figures 2, 4 and 12, for receiving and slitting or cutting longitudinally, telescopically arranged lengths of animal intestines, such as 10 and 12, with which mechanism is associated conveyor mechanism, generally represented as 34, which conveys the telescopically arranged pieces of animal intestine to the cutting mechanism and continues to move said cut or slit intestines in the form of superimposed layers of intestines to present the same to sewing mechanism, generally represented as 36, Figures 2 and 3, for performing the stitching operations, after which the completed stitched casings are stripped from said conveying mechanism 34 at the discharge end of the machine, generally represented as 38. Operatively associated with the conveyor mechanism 34 at the discharge end of the machine is washing and conveyor conditioning mechanism, generally represented as 40.

The device including the various mechanisms above referred to in a general way embodies an elongated skeleton frame structure, generally referred to as 42, for supporting the said mechanisms, and which is constituted by a plurality of structural elements, such as the standards 44 and connecting members 46, but which structure will be referred to hereinafter in its specific detailed construction only when necessary to describe its operative association with the various mechanisms and elements of the device which have been incorporated for carrying out the various procedures herein contemplated. This elongated skeleton frame structure 42 with its associated operating mechanisms is substantially completely enclosed by housing structure 48 to guard against possible injury to operators attending the machine and to prevent the accumulation of dust and dirt into the various parts, and particularly those in close association with the animal intestines passing through the machine.

The receiving end of the machine is formed in part by the storage pan 50 connected at one end to the skeleton frame structure and suitably supported at its other end by pedestals, such as 52, to provide a receptacle for the animal intestines to be introduced into the machine. This pan or receptable is adapted to receive wash water by way of the inlet 54 (Figure 4), being controlled by valve 55, excess wash water within the pan being disposed of by way of the overflow pipe 56 which may be connected to a sewer or the like. Disposed in association with the pan 50 is a mandrel 58, Figures 2, 15 and 21, in the form of a hook having an elongated shank 59 disposed longitudinally of the machine and substantially centrally of the skeleton frame and being connected in any desired manner to the transversely disposed frame members 61 of said skeleton frame. The said mandrel has its other end in close proximity to the storage pan 50 to facilitate threading of the lengths of animal intestines onto the same for feeding said intestines in telescopic arrangement to the machine. The said animal intestines are fed into the machine in telescopic association with one another, as clearly shown in Figure 2 of the drawings. This disposition of the said intestines with respect to one another is accomplished by successively threading the lengths of said intestines onto the hook-shaped mandrel where the said intestines may be adjusted or straightened with respect to one another to prepare the same for feeding into the machine. Inasmuch as these telescopically arranged intestines are to be slit longitudinally and then stitched in superimposed relation, it is essential that the inner of said telescopically arranged intestines be threaded on the said mandrel with its fat side on the interior, and that the outer of said telescopically arranged intestines be threaded onto the mandrel and over the first named intestine with its fat side exteriorly disposed. This threading operation is greatly facilitated by the shape and disposition of the said mandrel with respect to said storage pan (Figs. 4 and 5.)

The said conveying mechanism 34 is constituted by the continuous spaced metal tapes or belts 60 and 62 formed with a plurality of points or spikes 64 spaced at intervals throughout their entire length, the said metallic conveyor belts 60 and 62 passing around the conveyer idler wheels 68 and 70, respectively, adjacent the receiving end of the machine and around the drums 72 and 74, respectively, disposed at the discharge end of the machine and constituting in part the discharge mechanism 38.

It is to be noted that the continuous conveyor belts 60 and 62 in their normal operating cycle move in a substantially horizontal position from the underside of idler wheels 68 and 70 (Figure 2) at the receiving end of the machine to the top side of the drums 72 and 74 (Figure 3) at the discharge end of the machine, the said belts being returned in their said normal operating cycle through the sterilizer 40 at the discharge end of the machine to the guide shoes, such as 76, adjacent the central part of the machine and thence to the opposed guide shoes 78 and 80 adjacent the receiving and cutting mechanism 32 at the receiving end of the machine, these shoes, 76, 78 and 80 being adjustably mounted in the brackets such as 82, for taking up slack in the conveyor belts.

Disposed intermediate the ends of the skeleton frame 42 herein disclosed and supported thereby adjacent the discharge end of the machine are various mechanisms, best shown in Figures 3, 37, 38 and 42, which will be hereinafter more fully described, but which include a main prime mover in the form of motor 84 mounted upon a base 86 supported upon the support 88 secured to skeleton frame structure 42 and adjustable with respect to said support by adjustable mechanism 87, this adjustment of motor 84 being provided to vary the speed of its driving belt and accordingly those mechanisms driven thereby. The motor 84, through the instrumentality of a belt 90, operates pulley 92 mounted upon transversely disposed operating shaft 94 which is journaled in spaced relation in the bearings, such as 96, one of which is connected to the elongated structural element 97 of the frame on one side of the machine and the other of which is connected to the elongated structural element 98 on the other side of the machine. Associated with pulley 92 is a manually operated brake 99 (Figures 37 and 38) operated by an upwardly extending operating arm controlled by lever 101 whereby the shaft 94 and the various mechanisms operatively connected thereto can be decelerated to stop movement of the same when so desired. Shaft 94, adjacent the end in opposed relation to pulley 92, has a pulley 100 mounted thereon in fixed position which, through a belt 102, operates pulley 104 mounted on the shaft 106 of a reduction gear mechanism 108. Reduction gear mechanism 108 has as its drive a shaft 110 upon which is mounted sprocket wheel 112 for operating the sprocket chain 114, which in turn passes around sprocket wheel 116 (Figures 3 and 4.5) mounted upon shaft 118 suitably journaled on the opposite side of the skeleton frame structure at the discharge end 38 of the machine in spaced bearings 120. This shaft 118 has the drums 72 and 74 mounted thereon whereby the conveyor belts are continuously operated during the operation of motor 84 for receiving and advancing the animal intestines through the machine, all in accordance with the operations hereinafter to be more fully described.

The idler wheels 70 and 68 are mounted for rotation upon the skeleton frame structure by way of the angularly disposed stub shafts 122 and 124 (Figures 4 and 12), respectively, whereby the peripheries of said wheels are disposed in close association with one another immediately above the securing shank 59 of the mandrel 58. The conveyor elements 60 and 62, as they pass about said wheels 68 and 70, are disposed immediately above the securing shank 59 in close proximity to one another and in a position whereby the prongs 64 thereof are in angular relation to one another and in depending relation to their flexible supporting belts, as disclosed in Figures 16 and 17 of the drawings. In order that the said prongs of said conveyor elements may have their ends in close proximity to one another as they pass beneath the idler wheels 68 and 70 without interference, said shafts 122 and 124 are offset slightly in the longitudinal direction of the machine (Figure 2).

Immediately below the idler wheels 70 and 68 are feed rollers or wheels 126 and 128 having metallic hubs mounted upon the screw-threaded shafts 130 and 132 journaled in the shank 59 of mandrel 58. These wheels are offset longitudinally of the machine in accordance with the offset relation of idler wheels 70 and 68 and have their outer rim, which is preferably of some material such as rubber or the like, in the path of movement of the prongs 64 of said conveyor elements 60 and 62, respectively, whereby the same are engaged and penetrated by said prongs in their passage about the underside of said wheels 70 and 68 to rotate said feed rollers 126 and 128 during such movement. As the said telescopically arranged animal intestines are presented to the feed rollers, penetration thereof by the prongs 64 of the conveyor elements for movement of the same forwardly of the machine is facilitated by the engaging relation of the prongs 64 with the feed rollers 126 and 128.

As the said telescopically arranged animal intestines are progressively engaged and penetrated by the spikes or prongs 64 of the conveyor elements 60 and 62, the same are progressively moved forwardly into engagement with a cutting blade 136 (Figures 15 and 18) whereby the said telescopically arranged animal intestines are slit longitudinally thereof as the same are moved by the conveyor elements 60 and 62, into the machine. This cutting blade 136 is of circular formation, mounted upon a shaft 138 journaled in suitable bearings on the skeleton frame 42 and upon which is mounted a pulley 140 (Figures 12 and 14) driven by means of a belt 142 passing over a motor pulley 144 of motor 143 mounted on a cross-frame member 146, this motor 143 being connected in a control circuit to be hereinafter more fully described and which is operable during the operation of the machine to engage and slit longitudinally telescopically arranged animal intestines successively fed into the machine.

The securing shank 59 of the mandrel 58 extends longitudinally of the machine in cooperative relation with the said spikes or prongs 64 of the conveyor elements 60 and 62, and assumes in a longitudinal direction the shape as clearly shown by Figures 16 to 20 inclusive of the drawings to provide a slot or recess, such as 148, extending longitudinally thereof adjacent its upper surface to receive the said prongs 64 and in which is disposed a guide element 150. This guide element 150 is slotted as at 151 to guide the cutting blade 136 and extends into the environment of said feed rollers 126 and 128 for guiding the telescopically arranged animal intestines as the same are received into the machine and pass forwardly into engagement with the cutting element 136. In order to spread the telescopically arranged animal intestines to hold the same in proper relative position to one another while being picked up by the conveyor elements 60 and 62 and during the cutting operation, additional flexible guiding and spreading elements 152 and 154 are provided, the same extending laterally of and in diverging relation to the shank 59 in the vicinity of said feed rollers 126 and 128. This recess 148 in a longitudinal direction is intercepted to form longitudinal recesses or grooves 156 and 158 by a depending web 160 which, together with the laterally disposed flanges 162 and 164 connected thereto provide means for securing the shank 59 of the mandrel to the said frame members 61. Said recesses 156 and 158 gradually merge in a longitudinal direction with the horizontal guide surfaces 166 and 168 disposed adjacent the innermost end of the shank 59.

It will be noted that as the conveyor elements 60 and 62 move forwardly of the machine from adjacent the feeding rollers 126 and 128 where their prongs are in position for engagement and penetration of the animal intestines, the same are gradually turned about their longitudinal axes to position their prongs substantially horizontally and turned inwardly toward one another as the same leave the securing shank 59 of the mandrel 58 in their forward movement in the machine. This movement is clearly portrayed in Figures 16 to 20 inclusive of the drawings. The conveyor elements 60 and 62 in their forward progressive movement in the machine move into association with guide elements 172 and 174 (Figures 4, 4a and 5), at which time the prongs of said conveyor elements 62 and 60 have been turned into a vertical position, as clearly shown in Figure 4a of the drawings, and have been turned a substantial amount from their normal depending position to penetrate the animal intestines at the feed rollers 126 and 128. The disposition of the prongs 64 of conveyor elements 60 and 62 in close proximity to one another and in depending angular relation at the feeding rollers 126 and 128 was found desirable in handling these telescopically arranged animal intestines and to present them to the cutting blade 136. Such engagement as is provided between the prongs and said intestines by the penetration of said intestines at the feed rollers 126 and 128 is sufficient for the cutting operation, but inasmuch as the said intestines are in the form of superimposed layers of animal intestines after the cutting or slitting operation, and other operations are to be performed thereon, it became necessary to impale said layers of intestines on said conveyor elements to assure proper supporting relation thereof between said conveyor elements during such further operations. Accordingly, means has been provided for guiding said conveyor elements during their movement forwardly of the machine after the cutting or slitting thereof to turn said prongs into an upright position and to move the said superimposed layers of animal intestines with respect thereto to firmly embed the said prongs therein to properly support the said superimposed layers of animal intestines in suspended relation between the conveyor elements 60 and 62.

As said conveyor elements 60 and 62 approach guide elements 172 and 174 with their said prongs in substantially vertical position, the superimposed layers of animal intestines are engaged by the depending arms 176 and 178 of the said guides 172 and 174, respectively, to move the superimposed layers of animal intestines downwardly with respect to the spikes or prongs 64 of the conveyor elements to firmly affix the said superimposed layers of animal intestines on the said prongs in supporting relation therewith and suspended between conveyor elements 60 and 62. This movement of the superimposed layers of animal intestines with respect to the prongs or spikes of the conveyor elements 60 and 62 to securely affix the same thereto is facilitated by their engagement on the underside thereof by a guide and stretching member 173 affixed as at 175 (Figure 2) upon the opposed diagonally disposed frame members 177 and 179, which guiding and stretching member moves the said superimposed layers of animal intestines into substantially taut relation with respect to the prongs of the said conveyor elements 60 and 62, thus rendering the arms 176 and 178 of guide elements 172 and 174 effective to move the said superimposed layers of animal intestines with respect to said prongs.

Guide elements 172 and 174 are pivoted as at 180 and 182 (Figure 4), respectively, to a transverse frame element 184 and gradually diverge in a longitudinal direction and are pivotally connected as at 186 and 188 (Figure 5), respectively, to additional guide elements, generally referred to as 190 and 192, respectively.

As the said telescopically arranged animal intestines are moved into feeding relation to the feed rollers 126 and 128, the same engage contact element 194 (Figures 2, 13 and 14) of a switch arm 196 pivoted as at 198 and 200 upon brackets 202 and 204 mounted upon one of the crossframe members 61 whereby the said arm 196 is pivoted about said pivot points 198 and 200 as the telescopically arranged animal intestines are moved into association with the contact portion 194 thereof. This arm 196 is in contacting relation with an adjustable pin 208 of a lever arm 210 of a feed detector switch S normally open, but closed when in engagement with said telescopically arranged animal intestines through the contact portion 194, and being included within a control circuit to be hereinafter more fully described. The lever arm 210 of the said switch is pivoted as at 212 and has contact elements 214 for operating the switch and being further provided with a depending arm 216 operable from exteriorly of the housing 48 for a purpose to be hereinafter more fully described.

The superimposed layers of animal intestines being conveyed into guiding relation to the movable guide elements 172 and 174 (Figure 6) successively engage the arms 218 and 220 of normally open mercury switch R and normally closed mercury switch Q pivoted as at 222 and 224 in the opposed walls of switch box 226, respectively, whereby the said arms 218 and 220 are moved in a counterclockwise direction, as shown in Figure 2 of the drawings, and ride upon the surface of said superimposed layers of animal intestines during a certain portion of their travel forwardly of the machine. These control switches R and Q, referred to hereinafter as indicator light switch R and automatic stop switch Q, respectively, are in the control circuit hereinbefore mentioned for controlling the operation of the machine in a predetermined selected manner, as will be hereinafter more fully described in connection with the description for said control mechanism.

The operating arms 218 and 220 of mercury switches R and Q are limited in their downward movement upon engagement with the bottom wall of a drip pan 228 (Figure 2) which extends from the receiving end 32 of the machine above the casing pan 50 a substantial distance forwardly of the machine for receiving moisture and the like from the animal intestines as the same are being conveyed, to return said fluids and moisture to the said casing pan, the drip pan being mounted upon the skeleton frame 42 in any desired manner.

The movable guide elements 190 and 192 hereinbefore referred to in connection with their pivotal engagement with guide elements 172 and 174 are of somewhat similar construction, as clearly shown in Figures 5, 29, 30, 31 and 32 of the drawings, and are disposed in opposed relation with respect to one another. The guide element 190 is constituted by guide members 230 and 232 interconnected by a yoke 234 (Figure 5) disposed in opposed relation to a sewing machine 236, whereas guide element 192 is constituted by the guide members 238 and 240 interconnected by a yoke 242 in opposed relation to sewing machine 244 offset in relation to sewing machine 236, as will be hereinafter more fully described. The guide element 190 is mounted upon the spaced shafts 246 and 248 and in threaded engagement with threads 250 and 252 thereof (Figures 29 and 30), respectively, by way of the threaded bearings 254 and 256 provided on members 230 and 232, respectively. The guide element 192 is likewise mounted upon threaded portions 258 and 260 of shafts 246 and 248, respectively, and in opposed relation to the guide element 190 by means of the threaded bearings 262 and 264 of guide members 238 and 240, respectively. The opposed threads 250 and 258 of shaft 246 and the opposed threads 252 and 260 of shaft 248 are oppositely cut whereby the said guide elements 190 and 192 can be moved toward or away from one another to vary the spacing therebetween upon operation of shafts 246 and 248 for a function to be hereinafter more fully described. The conveyor elements 60 and 62 are guided in association with guide elements 190 and 192, respectively, by guide brackets, such as 266 (Figure 5), suitably spaced along members 230 and 232 of guide element 190 and members 238 and 240 of guide element 192.

The movement of shafts 246 and 248 is imparted by the reversible adjusting motor 266 (Figures 3 and 5) which has a pulley 270 mounted on its rotor shaft 272 which drives belt 274 passing over pulley 276 fixed to the end of shaft 246. Shaft 246 is journaled in bearings 278 and 280 at opposite sides of the skeleton frame of the machine, and which shaft 246 has a sprocket 282 mounted thereon between pulley 276 and bearing 278 which is adapted to drive the chain 284 extending longitudinally of the machine and passing over a driving sprocket 286 mounted upon the end of shaft 248. Shaft 248 is journaled in bearings 288 and 290 on opposite sides of the machine. In order to guide sprocket chain 284 during its operation, idler guide pulleys 292 and 294 mounted upon brackets 296 and 298 are provided, the said brackets 296 and 298 being secured in adjustable relation to the skeleton frame 42 of the machine. Operatively connected to shafts 246 and 248 are flexible shafts 300 and 302 which are operatively connected with certain adjusting mechanisms of sewing machines 236 and 244, respectively, as will be more fully set forth hereinafter.

Operatively associated with pulley 276 (Figures 29 and 31) at the end of shaft 246 is an adjusting brake W provided with friction shoes 304 and 306 movably mounted upon the opposed arms 308 and 310 of the brake in opposed relation to the opposite faces of said pulley 276 for braking the said pulley and to stop rotation of shaft 246 after certain adjusting movements of guide elements 190 and 192, as will be hereinafter more fully described, the said arms 308 and 310 being spring-pressed toward one another by coil spring 312 disposed in abutting relation to abutment washer 314 of the guide rod 316 secured to arm 308 and arm 310. The said adjusting brake W is normally disposed in a position whereby said friction shoes 304 and 306 are in engaging relation with opposed faces of pulley 276 under the impulse of spring 312. Spreading of the arms 308 and 310 to disengage the brake shoes 304 and 306 from their contacting engagement with pulley 276 is effected through cam 318 at the end of the arm 320 pivotally mounted on standard 320', Fig. 33. The free end of arm 320 is connected to the armature 322 of a solenoid 324 included within the control circuit hereinbefore mentioned and which will be described hereinafter more in detail and an actuation of the arm 320 through solenoid 324 causes cam 318 to rotate between arms 308 and 310 to spread them. Thus when the said solenoid is energized, the brake shoes 304 and 306 will be moved away from their braking engagement with pulley 276.

The bearings 256 and 264 are mounted upon the guide shoes 326 and 328 operable within the channels of opposed channel members 330 and 332 secured transversely of the machine upon elements such as 334 and 336 of the said skeleton structure of the machine whereby said guide shoes and their bearings are suitably guided in their transverse movement with respect to one another upon movement of the guide elements 190 and 192 in accordance with the rotation of shafts 246 and 248.

The bearings 254 and 262 for said guide elements 190 and 192 are similarly mounted upon guide shoes 338 and 340, respectively, operable within the guide channels of the opposed guide members 342 and 344 (Figure 31) suitably connected to structural elements such as 346 and 348 of the skeleton frame structure to properly guide said guide elements 190 and 192 in accordance with the movement of shaft 246.

Operatively connected to the guide member 240 (Figure 10) is a transversely extending arm 350 having mounted at its end an adjustable screw 352 extending outwardly thereof and in line with one leg of bell crank lever arm 354 of a two-way "out" limit switch O, having one of its contacts normally closed and the other of its contacts normally open, when said guide elements 190 and 192 are in their innermost position and having the relation of said contacts reversed should said guide elements be moved to their outermost limits as restricted by said "out" limit switch O. The lever arm is pivoted as at 356 and carries an adjustable switch operating element 358 of the said switch O, the said arm being maintained in its normal position by spring 359. Said arm 350 further carries an adjustable screw member 360 extending inwardly and in the path of movement of one leg of bell crank lever arm 362 of the "in" limit switch P, which is normally open when the said guide elements 190 and 192 are in their innermost position. The said lever arm 362 is pivoted as at 364 and carries an adjustable switch operating element 366, the said arm being returned to its normally open position upon release from its engagement with member 360 upon movement of guide element 192 by spring 361. The two switches O and P are included within the control circuit aforementioned and are normally in the positions above recited for a purpose to be hereinafter more fully described in connection with the adjustment of guide elements 190 and 192, it being observed, however, at this point that said guides 190 and 192 are normally in their innermost position with respect to one another at the time the superimposed layers of animal intestines approach the same, the normal spacing of said guide elements 190 and 192 being determined by the narrowest set of superimposed layers of animal intestines expected to pass through the machine whereby the said guide elements 190 and 192 are always in a position to move outwardly as the said superimposed layers of animal intestines are carried by the conveyor between guide members 230 and 238 to tension the same, and to prepare them for a stitching operation accomplished by sewing machines 236 and 244.

As the said superimposed layers of animal intestines approach the guide elements 190 and 192, the same are engaged by the rider or switch arm 368 (Figures 5 and 7) disposed longitudinally of the machine between the guide members 230 and 238 and having the laterally extending arms 370 and 372 which are mounted for pivotal or swinging movement as at 374 and 376 through the medium of the pivot rod 378 having an adjustable weight 380 connected thereto. Attached to pivot rod 378 is an operating lever 382 adapted to operate the operating arm 384 of measuring switch M, the said arm 384 being pivoted as at 386 and having an adjustable switch operating element 388 secured thereto, said arm being returned to its normally closed position by way of the spring 390. This measuring switch M controlled by the rider or measuring arm 368 is in the control circuit previously referred to and the operation of which will be hereinafter more fully described.

The superimposed layers of animal intestines in their normal progress through the machine and when in association with guide elements 190 and 192 are adapted to successively engage the switch arms 394 and 392 of finder switch T and clutch switch U, respectively, located in the normal path of movement of said superimposed layers of animal intestines (Figures 8 and 9). The finder switch T is constituted by the two mercury switches 402 and 404 normally open and normally closed, respectively, and connected as a unit through the mounting 406 pivotally secured as at 408 in the switch housing 410, while the clutch switch U, constituted by one mercury switch 396, is normally closed and is pivoted as at 398 in the opposed walls of a switch housing 400. The finder switch T and clutch switch U are operatively connected in the control circuit before mentioned and their operation in connection with the operation of the machine will be hereinafter more fully described in connection with the description of the operation of the said control circuit.

In passing, it may be mentioned that closely associated with switch T is a switch unit 412 (Figure 5) embracing within its structure the main starting switch operated by the button 414 and an auxiliary switch operated by the auxiliary switch button 416. The switch unit further includes a stop switch button 418 normally controlled along a portion of the machine by way of the operating rod 420 extending toward the rear of the machine (Fig. 1) into the environment of the casing pan at the receiving end of the machine, while the said stop switch button 418 is controlled by way of a similar rod 422 extending forwardly of the machine to a point beyond the sewing machine 244, these control rods being so disposed that operators for the machine may quickly stop the machine when desired, at the points within reach of the said rods 420 and 422. This switch mechanism 412 is further included in the aforementioned control circuit, all as will be later more fully explained.

The sewing machines 236 and 244, used in stitching the superimposed layers of animal intestines according to the stitching pattern shown in Figure 27 of the drawings, embody novel structure which renders said machines adapted for stitching moist animal intestines. The machines are of particular use where the stitching operation is effected during relative movement between the said sewing machines and the superimposed layers of animal intestines as for example results when the line of stitching, in effect, turns through an angle of at least 180 degrees in stitching said superimposed layers of animal intestines according to the pattern shown in Figure 27 of the drawings. These novel developments constitute the subject matter of an application Serial No. 436,116, filed March 25, 1942, describing and claiming said improvements. Insofar as this application is concerned, however, no detailed reference will be made to these specific improvements, and the said sewing machines will be referred to broadly only as elements in the machine whereby the superimposed layers of animal intestines are stitched to form the casings in accordance with the present invention.

The two sewing machines are of similar construction and are similarly mounted in the present mechanism for identical operations for stitching the said superimposed layers of animal intestines. Figure 36 of the drawings discloses in perspective sewing machine 236 mounted upon a base 424 which is secured to platform 426 by way of the spaced brackets 428 and clamping screw 430. The platform 426 is movably supported, by way of roller 432, at one end, and spaced rollers, such as 434, at the other end, upon transversely disposed guide elements 436 and 438 of a platform 440. The mounting for the platform 426 embodies the cross-frame member 442 having threaded bearings 444 threadedly engaging the threaded shaft 446 mounted in the movable platform 440 as at 448 and 450 (Figure 29) said threaded shaft 446 being driven by the flexible shaft 300 in accordance with the operation of shaft 246 whereby the sewing machine 236 is adjustable transversely of the device to conform to the movement of the guide element 190 to maintain the same relative position of the stitching element of sewing machine 236 to the said guide element 190 for stitching each set of superimposed layers of animal intestines passing through the machine adjacent their margin at said guide element 190 and at a fixed determinative distance from conveyor element 62 irrespective of its movement to accommodate superimposed layers of animal intestines varying in width. Adjustable movement of the sewing machine 236 is therefore in accordance with the movement of said guide element 190.

In addition to the movement of sewing machine 236 in respect of its mounting for adjustment thereof with respect to guide element 190, the said platform 440 is mounted by way of the roller 452 at one end thereof and by rollers 454 at the other end thereof upon the transverse guides 456 and 458, respectively, extending transversely of the machine and forming a part of another platform, generally referred to as 460. The movable platform 460 has spaced longitudinal members 462 and 464 supported by means of spaced rollers, such as 466, upon the frame support and guide members 470 and 472, which frame members are disposed longitudinally of the machine.

From the above it will be noted that the sewing machine 236 has a mounting by way of platform 440 and platform 460 whereby the said machine as a unit can be moved transversely and longitudinally with respect of the device. This movement of sewing machine 236 is effected by way of spaced cam members 474 and 476 mounted upon cam shaft 478, one end of which is mounted in bearing 480 and the other end of which is mounted in bearing 482, both of which bearings are suitably mounted on the skeleton frame 42 of the device. The said cam shaft 478 has mounted thereon adjacent its bearing 482 a sprocket wheel 484 (Figure 3) which sprocket wheel is driven by the sprocket chain 486 and which chain, in turn, passes about a sprocket wheel 488 mounted on the end of shaft 490 of a speed reduction gear mechanism 492 (Figures 37 and 42) having a driven shaft 494 upon which is mounted a pulley 496 driven by means of belt 498 which passes about pulley 500 loosely mounted upon the shaft 94 in opposed relation to the pulley 100.

Cam 474 (Figure 36) has a cam groove 502 in one face thereof of a particular pattern adapted to receive cam roller 504 mounted upon the lever arm 506, which lever arm is pivoted at its lower end in journal bearings 508 mounted on the skeleton frame and is connected at its upper end to a rod 510 which extends transversely of the machine and is connected to the operating link 512 connected to frame 440 whereby, upon rotation of cam 474, cam roller 504, in following the cam groove 502, will move operating arm 506 at the pivot points 508 to move the platform 440 and the sewing machine 236 adjustably mounted thereon in a direction transversely of the movement of the superimposed layers of animal intestines being conveyed by the conveyor elements 60 and 62.

The cam 476 is provided with cam groove 514 disposed about the periphery thereof and which is adapted to receive the cam roller or follower 516 connected as at 518 to the operating arm 520. Operating arm 520 is mounted upon the transversely disposed shaft 521 journaled in spaced bearings 523 and 525 mounted on the skeleton frame and has its upper end connected as by way of link 524 to platform 460. In order to maintain cam follower 516 in cooperative relation to one face of cam groove 514, a spring 527 (Figure 38) may be connected to said operating arm 520 above cam follower 516 and an adjacent element of the said skeleton frame. The cam groove 514 is of such a contour that platform 460 is moved longitudinally of the machine to move the sewing machine 236 longitudinally of the superimposed layers of animal intestines to effect, in conjunction with the movement imparted to said machine in a transverse direction by operation of operating lever 506, the desired pattern for stitching of said superimposed layers of animal intestines according to Figure 27 of the drawings.

The design for the contour of cam grooves 502 and 514 was arrived at with due regard to the normal speed of movement of the superimposed layers of animal intestines positioned between conveyor elements 60 and 62 such that the stitching operation for the sewing machine 236 consists of forming the longitudinal stitching 14, the intermediate loop 24 and the final longitudinal stitching 18, all in accordance with the disclosure of Figure 27 of the drawings. The cam groove 514 further embodies in its design a contour which, cooperating with the roll 516, completes the loop 24 when the said machine 236 is longitudinally offset toward the discharge end of the machine from its normal position at the beginning of a stitching operation, thus requiring longitudinal movement of said sewing machine 236 toward the feeding end of the device during the stitching of the longitudinal portion 18 of the stitching pattern. The completion of the normal cycle of movement of the sewing machine 236 will be referred to hereinafter in connection with the description of the control circuit.

The sewing machine 244 is mounted in the same manner as the sewing machine 236, the adjustment thereof in relation to guide element 192 being effected by way of flexible shaft 302 operable in accordance with the operation of shaft 248. This sewing machine has movable platforms 440 and 460 movable, respectively, by operating arms 526 and 528, the former being journaled at its lower end in spaced bearings 529 mounted on the skeleton frame, and the latter of which at its lower end is mounted upon the transversely disposed shaft 531 journaled in the bearings 533 and 537 mounted in spaced relation on said skeleton frame adjacent bearings 523 and 525 for shaft 521. Operating arms 526 and 528 have their cam followers in operative association with cam grooves of cams 530 and 532 corresponding to the cams 474 and 476, respectively, and which cams are mounted upon the cam shaft 478 and driven thereby, all in accordance with the operation of said cams 474 and 476.

Said operating arms 526 and 528 are connected at their upper ends to platforms 440 and 460 for the sewing machine 244 in the same manner as operating arms 506 and 520, respectively, for the sewing machine 236.

Inasmuch as sewing machine 244 is offset longitudinally toward the discharge end of the device with respect to sewing machine 236, the cam surfaces for cams 530 and 532 are angularly offset relative to corresponding surfaces for the cam grooves of cams 474 and 476 whereby corresponding stitching operations of said sewing machine 244 take place subsequent to the same stitching operations of sewing machine 236. Similarly to the operation of sewing machine 236, the sewing machine 244 during a portion of its operation stitches longitudinally along the margins of the superimposed layers of animal intestines adjacent the guide element 192 to form the longitudinal stitching 16 subsequently followed by stitching in the form of loop 22, and then a stitching operation longitudinally as at 20 adjacent the said marginal edges of the superimposed layers of animal intestines. As described in connection with sewing machine 236, the sewing machine 244 returns to its normal position at the completion of the normal cycle of operation during the stitching longitudinally of the superimposed layers of animal intestines as at 20, all in accordance with the operation of the previously described sewing machine 236.

The normal sequence of operation of sewing machines 236 and 244 in their normal operating cycle is controlled by the cycle switches F and N, more particularly shown in Figure 43 of the drawings, and which switches are incorporated in the control circuit, reference to which will be made hereinafter as to the details of its operation. The cycle switch F conforms to the previously described switches as to its operation, the same being controlled by a switch arm 534 cooperating with cam plate 536 secured to periphery of cam 474 and which switch arm 534 has the adjustable switch operating element 538 for operating the said switch. The cycle switch F in its normal position is closed when said cam shaft 478 is at rest, but is opened upon movement of said shaft to permit one complete rotation of said shaft and the cams mounted thereon, all as will be hereinafter more fully described in connection with the control circuit. Spring 537 tends to open said switch upon movement of said cam shaft 478. The cycle switch N, which is likewise open during operation of the cam shaft 478, is controlled by switch arm 540 which is operated by a pin 542 extending laterally from cam 474 and which pin, upon completion of one revolution of cam shaft 478, engages the switch arm 540 to close the switch N through the adjustable switch operating element 544 connected thereto. Spring 539 holds switch N open upon release of arm 540 from its engagement with pin 542.

As previously described, shaft 94 with its pulley 100 is continuously operated under normal operating conditions for the machine to drive the conveyor through the belt 102, reduction gear mechanism 108 and the sprocket chain 114. The said cam shaft 478 is intermittently operated at predetermined intervals for one revolution to move the sewing machines 236 and 244 for a stitching cycle when the superimposed layers of animal intestines supported in spaced relation upon the conveyor elements 60 and 62 are presented thereto. After each stitching cycle the said cam shaft 478 comes to rest for a predetermined interval of time awaiting the presentation of the next successive set of superimposed layers of animal intestines to the said sewing machines, at which time the same is again operated to move said sewing machines through their stitching cycle. Movement of cam 478 is effected through the pulley 500 which embraces shaft 94 and is normally disengaged therefrom, but which is adapted to be rotated thereby through the medium of a clutch 622 operated by the shipper mechanism 624 (Figure 44). Shipper mechanism 624 is pivoted in bearings 623 and 625 connected to the skeleton frame and has an operating arm 628 (Figure 45) connected to the lower end of armature 626 of solenoid X, which is disposed within the control circuit hereinafter to be more fully explained. Solenoid X is energized to operate clutch 622 whereby pulley 500 is interconnected with shaft 94 for driving cam shaft 478 in predetermined relation to the positioning of the superimposed layers of animal intestines presented by said conveyor elements 60 and 62 to the sewing mechanisms 236 and 244.

Operatively associated with pulley 500 is a friction brake having a friction shoe 627 connected to an operating arm 629 thereof which is pivoted as at 631 and has its upper end connected by way of a link 633 to the arm 635 of the shipper mechanism 624. Upon deenergization of solenoid X, the shipper mechanism is returned to its normal position to disengage pulley 500 from its driving connection with shaft 94 by a spring 637, at which time friction shoe 627, through movement imparted thereto by link 633 and arm 629, engages pulley 500 to stop its movement and the movement of cam shaft 478. It will therefore be seen that the cam shaft 478 is intermittently operated for one complete revolution by the mechanism above described and controlled by the solenoid X.

The sewing machines 236 and 244 are normally operated by the main motor 84 through the pulley 546 mounted upon the end of shaft 94 adjacently disposed with respect of the pulley 92, (Figures 37 and 38) this pulley 546 having the belt 548 passing thereover, which in turn passes around the pulley 550 mounted upon one end of a transversely disposed shaft 552 journaled in spaced bearings, such as 554, mounted on opposite sides of the skeleton frame structure. The shaft 552 adjacent its ends has mounted thereon pulleys 558 and 560, about which the driving belts 562 and 564 for the sewing machines 236 and 244, respectively, pass. The pulley 558 about which the driving belt 562 for sewing machine 236 passes (Figures 39, 40 and 41) is movable longitudinally of the shaft 552 and is normally in frictional engagement with friction shoe 598 attached to one face of pulley 550 under the impulse of one or more springs 600 whereby a friction drive between the drive pulley 550 and pulley 558 is secured. Oftentimes, however, it is desired to operate the sewing mechanism 236 independently of the drive for the conveyor through the main motor 84, in which case said sewing machine may be operated through the auxiliary motor 574. The auxiliary motor 574, through its pulley 576, is adapted to drive belt 578 which passes about pulley 580 mounted upon the transverse shaft 582 suitably journaled in bearings, such as 584, on opposite sides of the skeleton frame, the said shaft 582 having pulleys 586 and 588 mounted adjacent its ends adapted to drive through the belts 590 and 592, the pulleys 594 and 596 rotatably mounted on shaft 552 and disposed adjacent pulleys 558 and 560, respectively.

This drive for each of the sewing machines 236 and 244 from the auxiliary motor 574 is independent of the other, whereby either of said sewing machines may be operated without operation of the other. To effect the drive from the auxiliary motor 574 to the sewing machine 236, the said pulley 558 is moved axially along shaft 552 into clutching relation, as at 602, with pulley 594 whereby the said pulley 558 is disengaged from frictional engagement with friction shoe 598 and is then operated by pulley 594. This movement is initiated by shipper mechanism 604 mounted upon shaft 606 and operated through the control lever 608 (Figures 37 and 38), the said shipper mechanism including the spaced arms 610 having the rollers 612 mounted thereon for engagement with the pulley 558. Also operable in accordance with the movement of the shipper mechanism 604 is a spring-pressed friction brake in the form of a ring 614 which engages the face of pulley 550 to decelerate the same upon operation of the shipper mechanism 604 to change the drive for pulley 558 from the main motor 84 to the auxiliary motor 574. Similar shipper mechanism is provided at the opposite end of shaft 552 for driving the driving belt 564 of sewing machine 244 from the auxiliary motor 574, such mechanism being generally referred to as 616 and including the shipper mechanism 618 mounted upon shaft 620 and controlled by an operating lever corresponding to lever 608 whereby the pulley 560 can be disengaged from its operative connection with shaft 552 and engaged with pulley 596 operated by said auxiliary motor 574. Brake means incorporating a brake shoe corresponding to brake shoe 614 is provided at this end of shaft 552 for decelerating the same upon establishing a driving connection between pulleys 560 and 596.

The driving belt 562 passes around the driving pulley 566 for the sewing machine 236 (Figure 3), the same being guided during the movement of said sewing machine 236 for completion of a stitching operation by way of the guide roller 568 slidably secured upon the pin 570 extending laterally of the cam lever 520. The driving belt 564 likewise passes around the pulley 572 of sewing machine 244 and is guided by a guide roller corresponding to guide roller 568 attached to cam lever 528 in a similar manner to the mounting of guide roller 568 of cam lever 520.

The superimposed layers of animal intestines successively passing the stitching means 36 and stitched in accordance with the previous disclosure, pass in their normal linear movement in supported relation between conveyor elements 60 and 62 in a substantially horizontal position to the discharge end 38 of the machine and are interconnected by stitchings, such as stitchings 621 (Figure 27), inasmuch as the sewing machines 236 and 244 are continuously operated. The continuous stitchings are accomplished due to the tension upon the stitching elements of the sewing machines by the continuous moving stitched superimposed layers of animal intestines which supply sufficient tension on said elements to render this stitching possible between adjacent and successive superimposed layers of animal intestines being conveyed by the conveyor elements 60 and 62. Thus the successively stitched superimposed layers of animal intestines are presented to the discharge means 38 at the discharge end of the machine in interconnected relation.

As these stitched superimposed layers of animal intestines approach the discharge end of the machine (Figure 46), the central part of said superimposed layers of animal intestines are gripped by the opposed conveyor elements 630 and 632 which are inclined in their normal operative position with respect to the plane of travel of the conveyor elements 60 and 62. The lower belt 630 passes around a pulley 634 disposed between and adjacent the conveyor elements 60 and 62 which is mounted in spaced bearings, such as 636 upon shaft 637, on suitable frame elements at the discharge end of the skeleton frame, while the other end of said belt 630 passes around a driving drum 638 mounted upon shaft 640 journaled in the spaced bearings 642 and 644 secured to the skeleton frame, as disclosed in Figure 45 of the drawings, and which shaft extends beyond the bearing 644 and has thereon a sprocket 646 driven by sprocket chain 648 which is driven by sprocket 650 mounted on the end of shaft 118. Also mounted upon shaft 640 is a gear 652 in meshing relation with gear 654 mounted upon the end of shaft 656 which is journaled in bearings 658 and 660 upon the skeleton frame structure at the discharge end of the device, said shaft 656 having mounted thereon pulley 662 about which the conveyor belt 632 passes. The other end of the said belt 632 passes about pulley 664 journaled in spaced bearings, such as 666 upon shaft 667, mounted on the skeleton frame at the discharge end of the machine in substantially opposed relation to the pulley 634.

The conveyor belts 630 and 632 accordingly operate in accordance with the drive for the conveyor elements 60 and 62 through the shaft 118, so that whenever stitched superimposed layers of animal intestines are presented thereto, the same are adapted to grip said stitched superimposed layers of animal intestines intermediate their marginal edges and to strip the same from the conveyor elements 60 and 62. In order to make this stripping fully effective (Figure 47), stripping elements 668 and 670 are disposed on opposite sides of the conveyor belts 630 and 632 longitudinally thereof and having their marginal edges at their innermost end disposed adjacent the conveyor elements 60 and 62, respectively, whereby the said stitched superimposed layers of animal intestines are removed or stripped from the prongs or spikes of said conveyor elements. The said stripper elements 668 and 670 are in the form of channel members terminating at their outer ends in alignment with the circumferential channels or grooves 672 and 674, respectively, provided in the surface of the driving drum 638.

As the discharged stitched superimposed layers of animal intestines are progressively conveyed by the conveyor belts 630 and 632 and pass over the driving drum 638, the same are removed from the said drum 638 by flexible stripping elements 676 and 678 (Figure 45) connected as at 680 to the skeleton frame and having their free end in operative association within the channels or grooves 672 and 674, respectively, of the drum 638 whereby the said stitched superimposed layers of animal intestines are disposed in position to be received in the elongated receptacle 682 disposed exteriorly of the housing 48 at the discharge end of the machine. As the said stitched superimposed layers of animal intestines are discharged from the machine, the interconnecting stitchings 621 are received and guided within the channels of stripping elements 668 and 670, as well as the grooves 672 and 674, to prevent their entanglement with the operating mechanisms at the discharge end of the machine.

Figure 1:
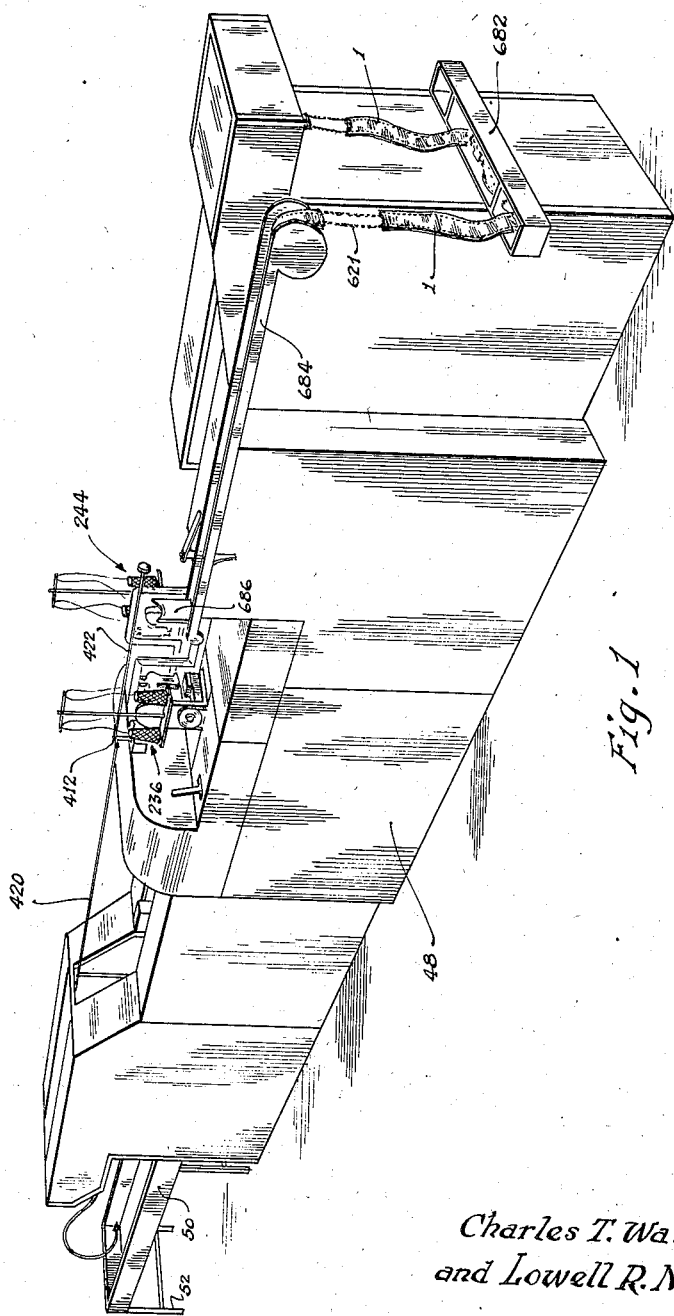
Figure 1 is a view in perspective of a machine made in accordance with the present invention.

In the normal operation of the machine as disclosed in Figure 1 of the drawings, an operator is stationed in proximity to the sewing machines 236 and 244, at which station said operator is in a position to observe the operation of the machine and to stop the machine should conditions warrant the same. Inasmuch as the casings are marketed in a condition to be used immediately for receiving meat products and the like, the stitched superimposed layers of animal intestines as discharged from the machine are severed along the line 26, as shown in Figure 27 of the drawings. In order that this operation may be accomplished by the operator stationed adjacent the sewing machines 236 and 244, the present machine further embodies a channel-shaped conveyor member 684 extending from immediately above the one end of receptacle 682 longitudinally of the machine to adjacent the station before sewing machines 236 and 244. The interconnected stitched superimposed layers of animal intestines are moved over this conveyor element to adjacent the inner end thereof where the operator picks up the successively conveyed stitched superimposed layers of animal intestines to sever the same along the line 26 by means of the cutting element 686 mounted at the end of the conveyor member 684. Substantially at the time these stitched superimposed layers of animal intestines are cut along the line 26 to form the individual casings, the interconnecting stitching is likewise cut adjacent their margins to form the finished product. These finished casings are therefore in a condition to be turned inside out to receive meat products in accordance with further processes involved in furnishing the completed meat products.

As the conveyor elements 60 and 62 are stripped of their stitched superimposed layers of animal intestines, the same pass about the drums 72 and 74 and are guided through the washer 40, which consists essentially of a receptacle 688, through the upper part of which the said conveyor elements 60 and 62 pass, the said receptacle 688 having a plurality of jets or nozzles, such as 690, disposed therein, which are supplied with hot water or the like, by way of a feed pipe 692, which jets are so disposed in relation to the conveyor elements 60 and 62 as to direct forcibly streams of hot water onto the said conveyor elements 60 and 62 to remove any particles of animal intestines or any foreign substances which may have accumulated during the progress of the said conveyor elements through the machine, to condition the same for further use to assure that the conveying and stitching of these animal intestines will take place under sanitary conditions. As said conveyor elements 60 and 62 pass through the washer, the same are guided in their return movement toward the receiving end of the machine by way of the guide shoes 76 and 78, as hereinbefore described.

As alluded to heretofore, the present invention embraces within its scope a machine as described for forming the stitched casings continuously and successively. The machine, according to its normal functioning, is adapted to receive successively at intervals the telescopically arranged animal intestines at the feeding end thereof, which are picked up by the conveyor elements 60 and 62, slit by the cutting blade 136, and progressively moved forwardly of the machine in the form of superimposed layers of animal intestines, and presented to the sewing machines 236 and 244 for the stitching operation, after which the same are progressively moved toward the discharge end of the machine and discharged therefrom, all in accordance with the description herein immediately above set forth, to provide finished casings properly stitched and in condition to receive meat products.

During the normal operation of the machine, an operator successively feeds said telescopically arranged animal intestines onto the mandrel 58 in proper timed intervals whereby the slitting thereof and the stitching operations take place in accordance with predetermined sequence of operation. The various operating mechanisms of the machine, as well as the control elements therefor, are arranged to accommodate normal pieces of intestine of substantially 40 inches in length spaced in their normal progress through the machine a distance of substantially 30 inches, although the machine can be easily and readily adapted to handle intestines of a length and at spaced intervals other than that above specified. The machine likewise operates effectively when the control elements are set to accommodate animal intestines of a given length even though there is variation in the said lengths of successively presented intestines. The arrangement of the mechanisms and control elements of the machine necessitates the feeding of these telescopically arranged animal intestines to the machine at certain intervals of time in order to operate the machine at its maximum efficiency. The machine furthermore embraces certain control elements, as above referred to, for automatically moving the conveyor guide elements 190 and 192 to accommodate the superimposed layers of animal intestines to stretch and present the same in taut condition to the sewing machines 236 and 244. This movement of the conveyor guide elements 190 and 192 is timed in respect to the operation of the sewing machines 236 and 244 to stretch the superimposed layers of animal intestines prior to the stitching operation. Furthermore, the stitching operation is automatically controlled by the superimposed layers of animal intestines in their progress through the machine.

In order to render the machine automatic except insofar as the feeding of the telescopically arranged animal intestines and the severing of the stitched casings along the line 26 and interconnected stitching are concerned, a suitable control circuit (Fig. 51) is provided which, in one of its phases, includes means for signaling the operator at the feeding end of the machine when to feed another set of telescopically arranged animal intestines to the machine in proper sequence to the previously fed set of telescopically arranged intestines which have proceeded to the point of being slit and being disposed in supporting relation to the conveyor elements 60 and 62. In another aspect, this control circuit includes means for rendering the machine inoperative when feeding does not take place in proper timed sequence with respect to the preceding set of telescopically arranged animal intestines fed to the machine.

As the superimposed layers of animal intestines are progressively moved through the machine, certain control mechanism embodied in the control means is operated to effect movement of the conveyor guide members 190 and 192 to stretch the superimposed layers of animal intestines. Said control means further embodies means operated by said superimposed layers of animal intestines to initiate the normal operating cycle for the cam mechanism controlling movement of the sewing machines 236 and 244 to stitch the said superimposed layers of animal intestines according to the pattern of Figure 27 of the drawings, all in accordance with the previous description.

The control means for operation of the machine is shown in Figure 51, in which all contacts are shown in normal or deenergized position. It includes control relays A, B, C, D, E, G, H, J, K and L mounted within a relay box 692 supported upon the skeleton frame structure 42 substantially centrally of the ends thereof, which relays are electrically connected in the control circuit having control elements briefly referred to heretofore but which will be described more in detail as the description proceeds.

The operation of the main and auxiliary motors 84 and 574, respectively, is controlled by means of the stop switch 418, which is electrically connected within the control circuit. Main and auxiliary starting switches 414 and 416 are likewise embodied in the control circuit for initiating the operation of said main and auxiliary motors. To initiate operation of the device, wall switches (not disclosed) are thrown, connecting the circuit for the said motors through the line 694, represented on the drawings as L1, L2 and L3, to a 220-volt source of power, and connecting line 696, represented on the drawings as L1 and L2, for the control circuit, with a 110-volt source of power. The 220-volt source of power is used for operating the adjusting motors 268, main motor 84 and auxiliary motor 574, and for the two solenoids of brake W and clutch X, whereas the 110-volt source of power is used in the control circuit for operating the various control mechanisms.

The 220-volt line 694 is connected to one side of the auxiliary relay H as at 698, a circuit being completed through relay H upon operation thereof across the multiple armature 699 thereof to the contacts 700 which are connected by way of the leads 702 to the auxiliary motor 574. The leads 704 extending from contacts 698 of auxiliary relay H extend to and are connected to one side of the main relay J as at 706. Upon energization of main relay J, this three-phase circuit is completed by way of multiple armature 707 across contacts 708 thereof to the leads 710 to the main motor 84. Main relay J is connected through contacts 706 and by way of the leads 712 to contacts 714 on one side of the relay L, which contacts are connected by way of the leads 716 to contacts 718 on one side of relay K. Relay L is provided with contacts 720 connected by way of the leads 722 to contacts 724 on the other side of relay K, to which are connected the leads 726 connected to the adjusting motor 268 for operation thereof when relay K or relay L is closed. Contacts 720 of relay L also connect with adjusting brake W by means of leads 868 and 870.

In order to facilitate and clarify the description for a proper understanding of the control circuit according to Figure 51, certain points have been marked "L1" and "L2" in the said circuit and control elements therefor, which indicates that such points are connected directly to either one side or the other of the 110-volt line. Therefore, in the description of the operation of this electrical control means, the various circuits will be traced from these points without attempting to trace the same from such points to the source of power.

To initiate operation of the device, the auxiliary motor is operated by pressing the starting button 730 of auxiliary starting switch 416, which is normally in closed position across the contacts 728 thereof. Movement of the button 730 closes the contacts 732, one of which is connected to the L1 side of the 110-volt circuit, as indicated. This movement of button 730 completes the circuit from the L1 side of the switch to the opposite contact 732, and thence by way of lead 734 to and through the holding coil 736 of auxiliary relay H, thence by way of lead 738 to normally closed contacts 740 of main starting switch 414, the circuit being completed therethrough by the normally closed button 742, and then by way of line 744 to the normally closed contacts 746 through the stop button 748. One of the normally closed contacts 746 is identified as an L2 source of power so that the circuit above recited is a complete circuit from one side to the other of the said 110-volt circuit to energize the operating coil 736 of auxiliary relay H to operate the armature 699 thereof into closed position with respect to the contacts 698 and 700 whereby the 220-volt line is connected to operate the auxiliary motor 574. Upon energization of auxiliary relay H, opposed normally open contacts 750 thereof are connected by way of the lead 752 through coil 736 to the L2 side of the circuit immediately above recited, it being noted that this circuit is completed by one of the contacts 750 which, as indicated, is connected to the L1 side of the 110-volt circuit. This circuit constitutes a holding circuit for relay H. The auxiliary motor may be stopped by interrupting the above described circuit through coil 736 by pressing either the main starting button 742 or the stop button 748 which are in the circuit for said coil 736.

The operation of main motor 84 is initiated by pressing the main starter button 742 which completes a circuit across the normally open contacts 754, one of which is on the L1 side of the 110-volt circuit, and the other of which, through lead 756, is connected to one of the normally closed contacts 758 of relay A. Current passes through the closed armature 790 of relay A into conductor 792 to energize main relay J as the current flows through coil 780 into conductor 784 to switch 730 into conductor 786 through switch 748 to L2 of the 110 volt supply. Also current is delivered from contact 758 into the lead 760 to one of the normally open contacts 762 of relay D, the circuit continuing through lead 764, through the operating coil 766 of the relay D and thence by way of lead 768 to one side, as at 770, of the operating coil 772 of relay B. The circuit then continues by way of lead 774 to one of the normally closed contacts 776 of relay B, through lead 778 to one side of operating coil 780, as at 782, of main relay J, then by lead 784 through the normally closed contacts 728, by way of the button 730 of auxiliary starting switch 416, then by way of lead 786 to one of the normally closed contacts 746 of stop switch 418, and then through button 748 thereof to the opposite normally closed contact indicated as L2 and connected with the L2 side of the 110-volt circuit.

The movement of main starter button 742 completing the circuits herein immediately above described, energizes coil 766 of relay D to operate armature 788 to close the normally open contacts 762 thereof, one of which is connected to the L1 side of the 110-volt source of power to complete a holding circuit for operating coil 766 of relay D by means of lead 764 also another circuit for continuously energizing main relay J to operate the main motor 84. This last circuit can be traced from the L1 contact 762 across armature 788 of relay D through lead 760, across the normally closed contacts 758 of relay A, by way of armature 790 thereof, through lead 792, through operating coil 780 of main relay J through lead 784, across the normally closed contacts 728 of auxiliary starting switch 416 by way of the button 730 thereof, through lead 786 to the L2 side of stop switch 418. This completes a circuit across the 110-volt source of supply to maintain coil 780 of main relay J energized, thus holding its armature 707 in position to complete a circuit between leads 704 and 710 through the opposed contacts 706 and 708, connecting the main motor through the 220-volt supply 694.

Relay A controls the operation of main motor 84 as just described, the operation of the motor being dependent upon the fact that the coil 794 is deenergized, which coil is interconnected on one side by way of lead 796 to one of the normally closed contacts 776 of relay B, a circuit being completed through relay B only when armature 798 thereof is in closed relation with contacts 776, which position is effected upon deenergization of coil 772 of said relay B. Contact 776 on the lefthand side of relay B is in the circuit previously described for the main motor and is connected to the L2 side of the stop switch 418.

Coil 794 of relay A on its other side is connected by way of lead 800 to one of the normally closed contacts 802 of relay C. a circuit being completed on this side of coil 794 through armature 804 to the opposed normally closed contact 802 of said relay C which is connected to the L1 side of the 110-volt circuit.

Relay C is normally deenergized in a position whereby its armature 804 is in electrical contact with the contacts 802 thereof. The operation of relay C is controlled by the feed detector switch S at the receiving end of the machine, which is normally in open position, as diagrammatically shown in the control circuit. The said feed detector switch S has its other side connected by way of the lead 808 to one of the normally open contacts 810 of relay C, the circuit through the feed detector switch when the same is closed being completed by way of lead 812, operating coil 814 and lead 816 to one side of the operating coil 794 of relay A and thence through lead 796 to the L2 contact 776 of relay B, by means of the armature 798 thereof as hereinbefore described. Upon energization of operating coil 814, armature 804 is moved to open contacts 802 and a circuit is closed through armature 818 across the normally open contacts 810, operating to establish a holding circuit for coil 814 which is later broken by opening contacts 776 of relay B.

Operating coil 772 of relay B, normally energized, is controlled by the automatic stop switch Q. Automatic stop switch Q in its normal position has its operating arm 220 in contact with the drip pan 228 and is normally in closed condition at that time to complete a circuit, one side of which, through the lead 822, is connected to the L1 source of power, and the other side of which, through the lead 824, is connected through operating coil 772 of relay B to the L2 side of the 110-volt circuit heretofore described as at 770.

Closely associated with stop switch Q is the indicator light switch R which in its normal position has its operating arm 218 also in contact with drip pan 228, the said switch, when in such position, being normally open. One side thereof is connected by the lead 826 to the L1 side of the 110-volt circuit by way of the normally closed contacts 802 and armature 804 of relay C when said relay is deenergized. The other side of the indicator light switch R is connected to junction 828 through lead 830, thence through lead 832 to indicator light V and thence through lead 834 to the L2 side of the 110-volt circuit as at 770 in relay B in the circuit previously described, for energizing coil 766 of relay D. Indicator light V, shown in Figure 12 of the drawings, is visible through an opening in the housing 48 and, as will be explained below, is a means for indicating to the operator at the feeding end of the machine when to feed another set of telescopically arranged intestines to the machine.

The slitting motor 143 is connected at all times to the 110-volt source of power.

For the purpose of illustrating the control for indicating to the operator at the receiving end of the machine when to feed another set of telescopically arranged animal intestines, let it be assumed that the operation of the main motor has been initiated by pressing the button of the main starting switch 414, which initiates movement of conveyor elements 60 and 62. Assuming, further, that the machine is cleared of superimposed animal intestines, under which condition the feed detector switch S is open, indicator light switch R is likewise open and automatic stop switch Q is closed. Because of the normally closed position of stop switch Q, operating coil 772 of relay B is energized, breaking the circuit across its normally closed contacts 776 whereby the main motor will continue to operate because the circuit for operating coil 794 of relay A is interrupted. If, then, a set of telescopically arranged animal intestines is fed into the machine, the same engage contact portion 194 of the operating arm 196 of feed detector switch S to close the same. The closing of this switch at this time is ineffective to energize relay C inasmuch as coil 772 of relay B is energized through the closed circuit including automatic stop switch Q. When operating coil 772 is energized, armature 798 is in open position with respect to contacts 776 of relay B, thus breaking the circuits through operating coils 814 of relay C and 794 of relay A, the energization of which latter coil is necessary to stop the main motor 84. Accordingly the motor continues to operate, whereby conveyor elements 60 and 62 progressively feed the telescopically arranged animal intestines to the slitting blade 136 whereby the same are cut and spread in supporting relation between said conveyor elements 60 and 62 as the same progressively move toward indicator light switch R and automatic stop switch Q.

As the same engage the arm 218 of indicator light switch R and immediately thereafter engage the arm 220 of automatic stop switch Q, respectively, indicator light switch R is closed and automatic stop switch Q is opened. The opening of automatic stop switch Q breaks the circuit through operating coil 772, allowing armature 798 of relay B to bridge the gap between contacts 776 whereby a circuit from the L2 contact 776 of relay B is established through lead 796, operating coil 794 of relay A, lead 800 to contact 802, through armature 804 to the L1 contact 802 of relay C. At this time, if no telescopically arranged animal intestines are in contact with arm 196 of feed detector switch S, the same is open, relay C accordingly is deenergized, and the circuit immediately above described is completed to energize coil 794 of relay A to move its armature 790 and to break the circuit for the main motor 84. The conveyor elements 60 and 62 will therefore come to rest with the operating arms 218 and 220 of indicator light switch R and automatic stop switch Q, respectively, raised and in engagement with the superimposed animal intestines supported between said conveyor elements.

At this time the indicator light V will burn inasmuch as a circuit therefor has been completed through indicator light switch R. This circuit is through the L1 contact 802 of relay C, armature 804 of relay C to the opposite contact 802 thereof, through lead 826, through switch R, through leads 830 and 832, through indicator light V, and thence through lead 834 to the L2 side of the 110-volt circuit as at 770 on one side of the operating coil 772 of relay B. The burning of this light indicates to the operator that another set of telescopically arranged animal intestines should be fed into the machine. If this is done at the time indicator light V flashes, feed detector switch S will be closed to complete a circuit to energize relay C, thus making it impossible to energize operating coil 794 of relay A, and the machine will continue in operation. This circuit for feed detector switch S can be traced from the L1 source of power through feed detector switch S, through lead 808, to contact 810 of relay C, through lead 812 to and through operating coil 814 of said relay, through lead 816, lead 796, and thence through armature 798 of relay B to the L2 side of the 110-volt circuit as at 776. This circuit is effected in the manner indicated because automatic stop switch Q at this time is open to deenergize coil 772 of relay B. Upon energization of relay C, operating coil 794 of relay A is in a deenergized condition whereby the circuit for the main motor is maintained through armature 790 thereof, and at the same time the circuit for the indicator light V, traced above, is broken through armature 804 of relay C. The motor will continue to operate to progressively move the superimposed animal intestines forwardly of the machine.

As the first set of superimposed layers of animal intestines pass beyond indicator light switch R and automatic stop switch Q, the same will return to normal position until their respective operating arms 218 and 220 are engaged by the next successive set of superimposed animal intestines passing through the machine. The return of indicator light switch R to its normal position opens its contacts, which will again be closed by the oncoming superimposed layers of animal intestines to again flash the light to indicate to the operator the time to feed another set of telescopically arranged animal intestines to the machine. Automatic stop switch Q likewise returns to its normal position, completing a circuit through coil 772 of relay B to energize relay B and to break the circuit through its armature 798, which circuit was effected for the purpose of energizing relay A and relay C. This latter circuit was traced through armature 798 of relay B, lead 796, lead 816, coil 814, lead 812 and lead 808 through the feed detector switch S to the L1 side of the 110-volt circuit. This was effective in breaking the normally closed contacts 802 of relay C to maintain operating coil 794 of relay A deenergized and to permit continued operation of the main motor. Return of the automatic stop switch Q to normal position thereby energizes coil 772 to break said circuit, deenergizing coil 814 and allowing the relay C to assume its normal position. Since the control circuit for relay A is broken by armature 798 of relay B, the main motor will continue to operate until the last fed set of superimposed animal intestines engage the operating arms 218 and 220 of indicator light switch R and automatic stop switch Q, respectively, as previously described. This will complete a circuit through indicator light V to indicate to the operator the necessity for feeding another set of telescopically arranged animal intestines into the machine, all as hereinbefore described, and will deenergize operating coil 772 to close relay B across its armature 798 and to permit the completion of the circuit through operating coil 794 of relay A to interrupt the operation of main motor 84 in the event that no additional telescopically arranged animal intestines are fed into the machine to effect energization of coil 814 and to break the circuit for the coil 794 of relay A through the normally closed contacts 802 of relay C.

From the above description, it will be clearly apparent that the control for the main motor 84 through the relay A is effected through relays B and C, operated and controlled through the automatic stop switch Q and feed detector switch S, respectively, and that said motor will continue to run as long as operating coil 794 of relay A is deenergized. In order that operating coil 794 be deenergized, its coil circuit must be open either through the operation of armature 798 of relay B or through operation of armature 804 of relay C.

It will be observed, as explained above, that to deenergize the relay C it is necessary to energize the relay B through automatic stop switch Q. This electrical interlock between relay C which is controlled by the feed detector switch S and the relay B which is controlled by the automatic stop switch Q, has a very definite function of permitting the main motor to continue its operation even though the feed detector switch S should assume its normally open position before the automatic stop switch Q assumes its normal position. In this connection it might be stated that the indicator light switch R and automatic stop switch Q are located at predetermined distance from the feeding end of the machine, depending upon the spaced interval desired between two successively fed sets of animal intestines. Under normal operating conditions, where the operator feeds the telescopically arranged intestines at the flash of indicator light V, the automatic stop switch Q is returned to its normal position prior to the opening of feed detector switch S. However, the interlock referred to operates to continue the operation of main motor 84 even though feed detector switch S opens prior to the return of automatic stop switch Q to its normal position. Thus, under the conditions recited, even though feed detector switch S opens, relay C would continue to be energized by a circuit through the L1 contact 810, armature 818, lead 812, through the coil 814 and lead 816 to lead 796, and thence across armature 798 to the L2 side of the 110-volt circuit, it being understood, of course, that during this possible condition, automatic stop switch Q is riding over the surface of the superimposed layers of animal intestines and is open whereby the operating coil 772 of relay B is deenergized. This condition would exist until the operating arm 220 of automatic stop switch Q drops from its engaging relation with the superimposed layers of animal intestines, returning said automatic stop switch Q to its normal position, energizing coil 772, and breaking the contacts 776 of relay B, which in turn would deenergize the operating coil 814 of control relay C. The motor would therefore continue to operate until automatic stop switch Q has its operating arm 220 lifted by the oncoming superimposed layers of animal intestines, which would again deenergize the operating coil 772 of relay B, and in the event another set of telescopically arranged animal intestines is not fed to the machine, to complete a circuit through the operating coil 794 of relay A to disconnect the motor circuit and to stop the machine with the respective operating arms 218 and 220 of indicator light switch R and automatic stop switch Q in engagement with the said oncoming superimposed layers of animal intestines. This condition could arise where a set of telescopically arranged animal intestines, shorter than the normal length for which the machine is designed, is fed into the machine following the feeding of a set of telescopically arranged animal intestines of the normal length.

Furthermore, whenever the feed detector switch S is open and the automatic stop switch Q is lifted and in engagement with superimposed layers of animal intestines, the main motor will stop as above described. To again start the motor, the operating coil 794 of relay A is deenergized by operation of feed detector switch S, which energizes operating coil 814 of the relay C to break the normally closed contacts 802 thereof.

It is also to be noted that by manipulation of operating arm 216 of switch lever 210 of the feed detector switch S, which is disposed exteriorly of the housing 48, the operator may clear the machine of all suerimposed layers of animal intestines. As noted above, the conveyor elements 60 and 62 come to rest with superimposed layers of animal intestines beneath indicator light switch R and automatic stop switch Q with their respective operating arms in raised position when no telescopically arranged animal intestines are fed into the machine. If at this time it is desired to clear the machine of all animal intestines, the feed detector switch S may be operated through its arm 216 to close its circuit through relay C. This circuit, including operating coil 814 of relay C, can be completed for the reason that the operating coil 772 of relay B is deenergized because of the opening of automatic stop switch Q. If, then, feed detector switch S is held in closed position momentarily, the holding circuit of relay C will permit operation of the main motor 84 until the circuit is broken by armature 798 of relay B which is in turn controlled by automatic stop switch Q. Thus, the coil 794 of relay A is maintained in a deenergized state first by the opened contacts 802 of relay C and next by the opened contacts 776 of relay B. These contacts of relay B open before the contacts 802 of relay C close, inasmuch as it is the opening of contacts 776 that initiate the closing of contacts 802. Thus only a momentary closing of feed detector switch S will allow the machine to clear itself of casings. The motor will therefore continue to operate to clear the machine of animal intestines, after which the same may be stopped either by throwing the wall switches for leads 694 and 696 or by pressing stop button 748.

It is also to be observed that the interlock between relays B and C is such that the indicator light V will burn to indicate to the operator that it is time to feed another set of telescopically arranged animal intestines into the machine even though the said operator might accidentally be holding a new set of telescopically arranged animal intestines under the feed detector switch S to close the same while the intestines previously fed to the machine are approaching indicator light switch R and automatic stop switch Q, and have not opened the automatic stop switch Q to deenergize operating coil 772 of relay B. Inasmuch as the burning of indicator light V is controlled by its circuit extending across the normally closed contacts 802 of relay C, and inasmuch as relay C cannot be energized by way of feed detector switch S until automatic stop switch Q is opened to deenergize operating coil 772 of relay B, the said indicator light V under such conditions will still burn to indicate the necessity for feeding another set of telescopically arranged animal intestines to the machine in proper sequence to the preceding set passing through the machine.

The above described control circuits function to control the feeding of the telescopically arranged animal intestines to the machine at proper intervals.

Additional control circuits are provided for controlling the conditioning of the superimposed layers of animal intestines after they pass beyond operating arms 218 and 220 of indicator light switch R and automatic stop switch Q, respectively. For the description of the remaining control circuits and elements thereof, it is to be assumed that the machine is being operated under normal conditions and that the forward end of one set of superimposed layers of animal intestines has just passed beyond indicator light switch R and automatic stop switch Q. With the normal feeding of these intestines to the machine, another set has followed through the slitting operation and is approaching the arms 218 and 220 of the indicator light switch R and automatic stop switch Q. Under such conditions it is assumed for the purpose of description that there are no superimposed layers of animal intestines ahead of those which are passing beneath the indicator light switch R and automatic stop switch Q. Under such conditions, the finder switch T is in normal position with its mercury switch 402 open and its mercury switch 404 closed, with the operating arm 394 thereof in position to be engaged by the oncoming superimposed layers of animal intestines. The cam clutch mercury switch U is also in its normally closed position, with its operating arm 392 in lowermost position in the path of movement of the oncoming superimposed layers of animal intestines. The "in" limit switch P is in its open position for the reason that the guide members 190 and 192 are in their innermost position with respect to one another. The "out" limit switch O has one of its sets of contacts closed and another set open, with the switch operating element 362 out of contact with the operating arm 354 of this switch. Measuring switch M has its control rider or arm 368 in its lowermost position to receive the oncoming superimposed layers of animal intestines, in which position of said arm the measuring switch M is closed. This is its normal position. Cycle switches F and N are closed, indicating that the cam mechanism for moving sewing machines 236 and 244 is stopped.

In the following discussion it is assumed that the oncoming superimposed layers of animal intestines approaching the rider 368 are of a width requiring guide elements 190 and 192 to spread or move apart in order to tension said intestines for the stitching operation. These superimposed layers of animal intestines move forwardly under the weighted rider 368 of measuring switch M, which is lifted slightly but not enough to open the normally closed measuring switch M. The said layers of superimposed animal intestines therefore continue their travel until the arm 394 of finder switch T is lifted. This movement of finder switch T results in the opening of mercury switch 404 and the closing of mercury switch 402 to complete a circuit to energize the relay L.

This circuit can be traced from the L1 source of power through normally open cycle switch F, through the lead 844 to junction 846, thence through lead 848, through the measuring switch M which is still closed, through lead 850 to the normally open contacts 852 of relay G, thence by way of lead 854 and 833 to the normally closed mercury switch 404 through the mercury switch 402 which is now closed, through lead 835, through the normally closed contacts 837 by way of the multiple armature 839 of relay G, through the lead 841, through operating coil 856 of relay L, thence through lead 858 through the normally closed contacts of the "out" limit switch O, through the lead 878 to junction point 862, which junction point, by way of lead 864, is connected to one of the normally closed contacts 728 of auxiliary starting switch 416, and then by way of lead 786, contact 746 and stop button 748 of stop switch 418 to the L2 side of the 110-volt circuit. The completion of this circuit energizes operating coil 856 of the relay L, operating a multiple armature 866 thereof to close the contacts 720 and 714 thereof to connect leads 722 with leads 712 of the 220-volt circuit to operate the adjusting motor 268 through the leads 726.

Adjusting motor 268, as previously described, operates shafts 246 and 248 to move the guide elements 190 and 192 apart. As these guide members 190 and 192 move apart, switch operating member 360 becomes disengaged from the switch arm 362 of the "in" limit switch P to close the same. Outward movement of these guide members 190 and 192 tightens the superimposed layers of animal intestines in supporting relation to conveyor elements 60 and 62, raising the central part thereof which is in engagement with the rider arm 368 of the measuring switch M, and eventually raises said rider arm sufficiently high to operate measuring switch M to open the circuit immediately above described to deenergize coil 856 of relay L, allowing its multiple armature 866 to break the 220-volt circuit across the lines 712 and 722 to stop the adjusting motor 268. Inasmuch as the operating coil of solenoid 324 is connected in parallel by way of the leads 868 and 870 to relay L at contacts 720 thereof, deenergization of coil 856 to return armature 866 of said relay to normally open position causes deenergization of the coil of solenoid 324, releasing armature 322 and allowing coil spring 312 through the arms 308 and 310 to move friction shoes 304 and 306 into engagement with pulley 276 on shaft 246 to apply a braking action thereto and to stop rotation of said shaft 246 and 248, thus bringing guide members 190 and 192 to a stop. Since the coil of solenoid 324 is in parallel with the motor coils of adjusting motor 268, the brake W will be released or become set, as above described, whenever the motor starts or stops.

If for any reason the measuring switch M should fail to open, the guides 190 and 192 will continue their outward movement due to the continued operation of adjusting motor 268 until member 352 engages the operating arm 354 of the "out" limit switch O. This movement of arm 354 breaks the circuit above described for energizing coil 856 of relay L through the normally closed contacts of the "out" limit switch O, thus deenergizing coil 856 to open the multiple armature 866 of relay L and to complete a circuit through relay K by way of the normally open contacts, generally referred to as 872, of the "out" limit switch O.

This circuit may be traced from the L1 side of the operating coil 874 of relay G through said coil, through the lead 876 to and through the normally open contacts 872, which are now closed, and through the lead 878 to junction point 862, which connects with the L2 side of the 110-volt circuit at the stop switch 418, as previously traced, by way of the lead 864. Completion of this circuit through the normally open contacts 872 of "out" limit switch O energizes operating coil 874 of relay G to move its multiple armature 839 to close the normally open contacts 852 and 882 and to open its normally closed contacts 837. A holding circuit for the operating coil 874 is completed through the L1 side of coil 874, through the said coil 874, through the lead 886, across the normally open contacts 882, through lead 888 to one side of operating coil 890 of relay K, as at 892, thence through the lead 894, through the contacts of "in" limit switch P, which are now closed, through lead 896 to junction 862, which connects to the L2 side of the stop switch 418, as hereinabove previously traced.

This energization of operation coil 874 of relay G as above described, closes the normally open contacts 852 thereof, whereby a circuit is completed through operating coil 890 of relay K to energize the same and to operate said relay. This circuit can be traced from the L1 source of power through cycle switch F, through lead 844 to junction 846, through lead 848, through the measuring switch M, through lead 850, through contacts 852, which are now closed by armature 839, and thence through lead 898 which is connected to operating coil 890 of relay K as at 900. The circuit to the L2 side of the 110-volt circuit is completed through coil 890, through lead 894, through the closed contacts of "in" limit switch P, and then through 896 to junction 862 which, as hereinbefore described, is connected to the L2 side of the stop button 418.

Energization of operating coil 890 of relay K operates its multiple armature 902 to close its contacts 718 and 724 to operate the adjusting motor in a reverse direction to cause the guide members 190 and 192 to move toward one another and toward the "in" limit switch P. Said guide members 190 and 192 are moved toward one another by the adjusting motor until switch operating member 360 contacts the switch arm 362 to open the "in" limit switch P, which breaks the circuit immediately above described.

It is also to be noted that the guides 190 and 192 will be returned to their innermost position by the adjusting motor 268 irrespective of the position of finder switch T, since when the circuit through the coil 856 of relay L is broken through the armature 839 of relay G, an equivalent circuit through the contacts 852 and operating coil 890 of relay K is effected. Thus, if finder switch T remains in its lifted position while relay G is energized, both circuits through switches 402 and 404 are interrupted and finder switch T will have no active function.

A condition might exist where finder switch T has returned to its normal position due to the tearing of the superimposed layers of animal intestines from the conveyors 60 and 62, under which condition the rider 368 of measuring switch M would be in its normal position to close switch M. At this time the cycle switch F is closed, and accordingly a circuit can be traced from the L1 souce of power through cycle switch F, through lead 844 to junction 846, through lead 848, through measuring switch M, through lead 850 to contact 852 of relay G, thence through lead 854 to and through the normally closed mercury switch 404 of finder switch T, through lead 904, through coil 890 of relay K, through lead 894, through "in" limit switch P, through lead 896 to junction 862, and then to the L2 side of the stop switch 418, as previously described. The completion of this circuit would return the guides 190 and 192 to their innermost position, whereby "in" limit switch P would be operated to open this circuit and to stop the adjusting motor 268.

Note that when the above described condition exists, where for any reason the measuring switch M assumes its normally closed position, when at the same time cycle switch F is closed, and "in" limit switch P is closed, a circuit is immediately established to coil 890 of relay K as described directly above. This makes it unnecessary to energize coil 874 of relay G through contacts 872 of "out" switch O in order to establish circuit to coil 890 of relay K.

Under normal conditions, however, the circuit to energize the coil 856 of relay L is broken by measuring switch M prior to the operation of "out" limit switch O. Under such conditions, the circuit through operating coil 856 of relay L would be broken by measuring switch M, after which the guides 190 and 192 would remain in such position until returned by energization of operating coil 890 of relay K which, as will be later more fully explained, takes place just prior to the completion of the stitching operation. This energization of coil 890 takes place by the circuit hereinbefore described, as the normal circuit is established as the casings move forward through the machine and allow switches T and M to assume their normal positions.

It is also to be noted that relays K and L are mechanically interlocked as by means of the locking mechanism 906 to prevent a short in the 220-volt line of the adjusting motor 268.

It is also to be observed that if finder switch T is raised and maintained in its lifted position, the guides 190 and 192 will vibrate between the "in" and "out" limit switches P and O, respectively, provided that the cycle switch F and measuring switch M are closed, this movement, of course, being effected by breaking the circuit through operating coils 856 and 890 through said limit switches O and P, respectively.

The solenoid brake W is also connected across relay L in such a manner that the brake W is inoperative when either of the limit switches O and P are contacted for the reason that the coil of solenoid 324 thereof is energized across either relay L or K.

As the guides 190 and 192 complete their outward movement to place the superimposed layers of animal intestines under tension, the same are continuously moved by the conveyor elements 60 and 62 toward the clutch switch U. The said superimposed layers of animal intestines contact the operating arm 392 thereof to open said switch, but up until such engagement said switch was closed, completing a circuit for the energization of operating coil 838 of relay E, which rendered the clutch solenoid X inoperative.

This previously existing circuit prior to the engagement of operating arm 392 of clutch switch U can be traced from the L1 source of power through clutch switch U, through lead 910 to junction 912, then by way of lead 914 through the cycle switch N which is closed at this time, through lead 916, through the operating coil 838 of relay E to the L2 side of the 110-volt circuit. Note that the L2 source does not pass through the stop button contacts 746. Hence, if the condition exists where relay E is energized and the stop button 748 is pressed, relay E will remain energized and prevent the clutch X being energized. Thus, the correct timing of the cams relative to the positions of the casings on the conveyors 60 and 62 is maintained even when emergency stop switch 418 is operated. Energization of coil 838 moves the armature 918 to open the contacts 920 of said relay. However, upon engagement of the arm 392 of clutch switch U, the circuit immediately above described is broken, allowing armature 918 to engage the contacts 920 of said relay E to complete a 220-volt circuit through the operating coil 922 of clutch solenoid X. This circuit can be traced from relay K, through lead 924 to relay E, through the armature 918 thereof, through lead 926 to the operating coil 922 of clutch solenoid X, and then by way of lead 928 back to relay K.

When the operating coil 922 of clutch solenoid X is energized, clutch 622, through the shipper mechanism 624, is operated to drive pulley 500 in accordance with the operation of shaft 94 to drive pulley 498 which, through the gear reduction box 492, operates sprocket chain 486 to rotate cam shaft 478 and to start the movement of the operating cams 474, 476 and 530 and 535 for one complete revolution. As soon as these cams start to rotate, the cycle switches F and N, due to the movement of their respective operating arms 534 and 540, are returned to their normally open position, which definitely opens the circuits through the operating coils of relays E, K, and L. Accordingly, the operating coil 922 of clutch solenoid X is energized and remains energized to rotate said cams through one complete revolution, at which time cycle switch N is operated by its arm 540 engaging pin 542 on cam 474 to energize operating coil 838 of relay E since operating arm 392 of switch U will have run off the back end of the casing and allowed switch U to make its normally closed contact. Thus, the completed circuit for said operating coil 922 is broken, releasing the armature 626, whereupon spring 637 operates the shipper mechanism 624 to disengage clutch 622 and to apply friction shoe 627 to pulley 500 to stop movement of said cams. The operating coil 922 of clutch solenoid X will be energized in the manner indicated for a complete cycle of operation of the said cams irrespective of whether the superimposed layers of animal intestines move past the operating arms 392 and 394 of clutch switch U and finder switch T, respectively, as the superimposed layers of animal intestines are being stitched by the sewing machines 236 and 244.

As the cams 474, 476, 530 and 532 approach the end of one complete cycle, the cam plate 536 on cam 474 engages arm 534 of cycle switch F to close the circuit to the operating coil 890 of relay K, as has been previously explained, which operation moves the guides 190 and 192 toward their innermost position. This movement of guides 190 and 192, controlled by the cycle switch F, takes place toward the end of the stitching cycle along the stitchings 18 and 20 of the superimposed layers of animal intestines, as shown in Figure 27, but inasmuch as the sewing machines 236 and 244 are moved by the flexible shafts 300 and 302 in the manner heretofore explained simultaneously with the movement of guides 190 and 192, the said sewing machines will continue to stitch the superimposed layers of animal intestines along their margins at the trailing end thereof at the same distance from the guides 190 and 192 even though the tension has been removed therefrom. The timing of this inward movement of guides 190 and 192 is accomplished by cam member 536 attached to cam 474 which, as previously indicated, engages operating arm 534 of cycle switch F.

As the superimposed layers of animal intestines are moved by the conveyor elements 60 and 62, a stitching thereof is effected by the sewing machines 236 and 244 according to the pattern of Figure 27, effected by the cams 474, 476, 530 and 532 which, through the mechanism hereinbefore described, moves the sewing machines 236 and 244 transversely of the superimposed layers of animal intestines in such a path that, when combined with the movement of said superimposed layers of animal intestines by the conveyor elements 60 and 62, result in opposed and overlapping loops 22 and 24 to provide the cross-stitching as at 28 and 30.

As the superimposed layers of animal intestines during this stitching operation pass beyond the rider arm 368 of the measuring switch M, the same returns to its normal position to close said switch and to await the next oncoming superimposed layers of animal intestines, whereby the circuit through relay K can be completed for return of the guides 190 and 192 to their innermost position to open the limit switch P before the next succeeding set of superimposed layers of animal intestines engage the operating arm 394 of finder switch T. As the cams return to normal position at the end of one complete revolution, the pin 542 engages arm 540 to operate the cycle switch N and to close the same.

Since the superimposed layers of animal intestines have moved past the operating arm 392 of clutch switch U, the circuit through the coil 838 of relay E is again completed, deenergizing the circuit through operating coil 922 of clutch solenoid X, as above described, to stop movement of the cams. During the operation of the cams as before recited, the sewing machines 236 and 244 are returned to their initial position for another stitching operation on the oncoming superimposed layers of animal intestines which operate the control mechanism to bring about definite operations of the various elements of the machine, as hereinbefore described in detail.

In connection with the control circuit of Figure 51, it is to be noted that the counter 930 is provided, having its operating coil 932 connected to the L2 side of the 110-volt line and the other side of the circuit being connected to the L1 side of the 110-volt line through lead 934, through relay E, through lead 916, through cycle switch N, through lead 914 to junction 912, through lead 910, through clutch switch U, and to the L1 source of power. Thus operating coil 932 connected in parallel with the coil of relay E, will be energized once to operate its counter 930 for each revolution of cam shaft 478. The counter dial is made visible through an opening in the relay box 692 whereby the production for the machine at any time can be readily determined.

As the stitched superimposed layers of animal intestines are progressively moved toward the discharge end of the machine, the sewing machines 236 and 244 continue to operate whereby the successively stitched superimposed layers of animal intestines are interconnected by said stitching for a purpose hereinbefore fully disclosed. During this movement of the stitched superimposed layers of animal intestines, which have been followed through their normal course in the machine, other telescopically arranged animal intestines are fed into the machine in accordance with the flash of indicator light V, slit as described, and progressively move through the machine to undergo the various operations which have been heretofore explained.

It will be clearly apparent from the above that the machine is automatic to the extent of automatically handling the telescopically arranged animal intestines fed thereto, and it becomes necessary only to feed such telescopically arranged intestines at the proper intervals to the machine and to sever the discharged stitched intestines in the manner heretofore described to form the finished casings.

The contact between the monitoring means and the spaced series of intestines flowing through the machine is shown in Figure 52. As there represented, one pair of superimposed, slit and stretched intestines is just starting into the sewing machine after having tripped the switch M through the switch arm 368 and also the finder switch T and clutch switch U through the switch arms 394 and 392 respectively. The sewing and feeding cycle will then continue until that pair of intestines is sewn with the pattern shown in Figure 27. When this cycle has been completed, the succeeding pair of slit intestines will have passed from under switch arm 218 and 220 and will have moved into a position immediately in front of the switch arm 368 so that during the next cycle of operations of the machine, this switch arm will be tripped along with the monitoring means 394, 392.

When the sewing cycle has been completed on one pair of slit intestines and the succeeding pair of slit intestines passing to the sewing machines has reached its position immediately before engaging the switch arm 368, the pair of telescopically arranged intestines which were last fed to the machine, will have passed from under the switch arm 194 of the feed detector switch S and will have moved into position engaging the switch arm 218 of the indicator light switch R. When the switch R is actuated, the indicator light V is energized and the operator may then present another set of telescopically arranged intestines into position to actuate switch arm 194 and if this is done while the preceding pair of slit intestines is passing from the switch arm 218 of switch R to the switch arm 220 of the automatic stop switch Q then the circuits established by tripping the monitoring means 194 and 220 will cause the conveyor mechanism to feed the intestines carried thereby forwardly whereby 368, 394 and 392 are tripped to send the machine through another cycle of operations.

While we have herein described and upon the drawings shown illustrative embodiments of the invention, it is to be understood that the invention is not limited thereto but may comprehend other constructions, arrangements of parts, details, features and method steps without departing from the spirit of the invention.

We claim:

1. A sewing device comprising conveyor means for moving juxtaposed layers of material in a substantially linear path, spaced sewing means for stitching said material longitudinally adjacent the marginal edges thereof and transversely therebetween from substantially one margin to the other, said sewing means being spaced laterally to cooperate with the edges of the material and offset longitudinally with respect to the material whereby each sewing means may move from substantially one margin to the other.

2. A sewing device comprising continuously operable conveyor means for moving layers of material in superimposed relation, spaced movable sewing means operable during the movement of said conveyor to stitch said material adjacent the marginal edges thereof over portions of their length and cross-stitching said material between said first named stitching intermediate the said longitudinal portions thereof from substantially one margin to the other, said sewing means being spaced laterally to cooperate with the edges of the material and offset longitudinally with respect to the material whereby each sewing means may move from substantially one margin to the other.

3. A sewing device comprising spaced sewing means, means for presenting layers of material in superimposed relation to said sewing means to effect longitudinal stitching of said material adjacent the marginal edges thereof, and means for moving said sewing means relative to said material to effect cross-stitching of said material between said first named stitching from substantially one margin to the other, said sewing means being spaced laterally to cooperate with the edges of the material and offset longitudinally with respect to the material whereby each sewing means may move from substantially one margin to the other.

4. A sewing device comprising two spaced sewing means, said sewing means being spaced both transversely and longitudinally, means for presenting and feeding layers of material in superimposed relation to said sewing means for stitching said material longitudinally thereof, and means for moving both of said spaced sewing means transversely of said material during said feeding to stitch said material transversely in the form of loops, said means for feeding and said means for moving both of said sewing means being timed with respect to the movement of each other to produce overlapping loops intermediate and interconnected with said longitudinal stitching.

5. A sewing device comprising spaced sewing means, means for presenting and feeding layers of material in superimposed relation to said sewing means for stitching said material longitudinally thereof, and means operable sequentially in predetermined relation to move said sewing means transversely of said material to effect a cross-stitching of said material in transverse relation to said longitudinal stitching from substantially one margin to the other, said sewing means being spaced laterally to cooperate with the edges of the material and offset longitudinally with respect to the material whereby each sewing means may move from substantially one margin to the other.

6. In a sewing device, the combination of material feeding means, sewing means operatively associated therewith, means under the control of material on the feeding means for adjustably positioning said sewing means with respect to said feeding means, and means for moving said sewing means longitudinally and transversely with respect to said feeding means.

7. In a sewing device, the combination of material feeding means, sewing means operatively associated therewith, means under the control of material on the feeding means for adjustably positioning said sewing means with respect to said feeding means, means for mounting said sewing means for movement longitudinally and transversely with respect to said feeding means, and cam operated means for operating said last named means.

8. A sewing device comprising material feeding means having spaced conveyor elements adapted to support juxtaposed layers of material therebetween, means controlled by a material on the conveyor for varying the spacing of said conveyor elements, sewing means for said material operatively associated with said material feeding means, and means for adjustably positioning said sewing means with respect to said material feeding means in accordance with the adjustment of said conveyor elements.

9. A sewing device comprising material feeding means having spaced conveyor elements adapted to support juxtaposed layers of material therebetween, means controlled by a material on the conveyor for adjustably positioning at least one of said elements with respect to the other to vary the spacing therebetween, sewing means operatively associated with each of said conveyor elements, and means for adjustably positioning at least one of said sewing means in accordance with the adjustment of said one of said elements to dispose the same in proper operative association therewith.

10. A sewing device comprising material feeding means having spaced conveyor elements adapted to support juxtaposed layers of material therebetween, means controlled by a material on the conveyor for adjustably positioning said elements to vary the spacing therebetween, means for operating said last named means, sewing means operatively associated with each of said elements, and means for adjustably positioning said sewing means to maintain fixed operative association thereof with said elements, and means operable in accordance with said operating means for operating said last named operating means.

11. A sewing device comprising material feeding means having spaced conveyor elements adapted to support juxtaposed layers of material therebetween, adjustable guide means for said conveyor elements, sewing means operatively associated with each of said conveyor elements, means for adjustably mounting said sewing means, means controlled by a material on the conveyor for moving said guide means for varying the spacing between said conveyor elements, and means operable in accordance with the operation of said last named means for adjusting the said mounting means for said sewing means to position the same in operative position with respect to said adjusted conveyor elements.

12. A sewing device comprising material feeding means having spaced conveyor elements adapted to support juxtaposed layers of material therebetween, means to measure the tautness of the material stretched between said conveyor elements, means for adjustably positioning said elements in accordance with predetermined tautness desired in said material, and sewing means for stitching said material while in said taut condition.

13. A sewing device comprising material feeding means having spaced conveyor elements adapted to support juxtaposed layers of material therebetween, means to measure the tautness of the material stretched between said conveyor elements, means for adjustably positioning said elements in accordance with predetermined tautness desired in said material, and sewing means for stitching said material longitudinally and transversely while in said taut condition.

14. A sewing device comprising material feeding means having spaced conveyor elements adapted to support juxtaposed layers of material therebetween, adjustable guide means for said conveyor elements, means to measure the tautness of the material stretched between said conveyor elements, means for adjusting said guide means in accordance with predetermined tautness desired in said material, sewing means having predetermined operative association with each of said conveyor elements for stitching said material while in said taut condition, and means for adjusting said sewing means in accordance with the adjustment of said conveyor elements to maintain the predetermined operative association of said sewing means with said conveyor elements.

15. A sewing device comprising material feeding means having spaced conveyor elements adapted to support juxtaposed layers of material therebetween, adjustable guide means for said conveyor elements, means to measure the tautness of the material stretched between said conveyor elements, means for adjusting said guide means in accordance with predetermined tautness desired in said material, sewing means having predetermined operative association with each of said conveyor elements for stitching said material longitudinally while in said taut condition, means for adjusting said sewing means in accordance with the adjustment of said conveyor elements to maintain the predetermined operative association of said sewing means with said conveyor elements, and means for moving said sewing means transversely with respect to said material to cross-stitch the same between said longitudinal stitching.

16. A sewing device comprising material feeding means having spaced conveyor elements adapted to support in taut condition juxtaposed layers of material therebetween, means controlled by a material on the conveyor for adjustably positioning said conveyor elements to accommodate and hold in taut condition layers of material of varying width, and sewing means adjustable in accordance with the adjustment of said conveyor elements for stitching said juxtaposed layers of material of varying width in predetermined relation to said conveyor elements, and means for moving said sewing means in any of its adjusted positions to stitch said material transversely with respect to said conveyor elements.

17. A device for stitching juxtaposed layers of animal intestines, comprising means for conveying said juxtaposed layers of animal intestines in moist condition, means controlled by the layers of intestines on the conveying means for stretching said layers of animal intestines supported on said conveying means and holding them in a taut condition, means cooperating with said conveying means for stitching said layers of animal intestines while they are held in said stretched condition, and coordinated drive means for said conveyor, stretching means, and stitching means.

18. A device for stitching juxtaposed layers of animal intestines, comprising means for conveying said juxtaposed layers of animal intestines in moist condition, means for stretching said layers of animal intestines supported on said conveying means and holding them in a taut condition, sewing means operatively associated with said conveyor means for stitching said layers of animal intestines, said sewing means being mounted for movement transversely of said conveying means, means to move said sewing means transversely of said conveying means whereby said material may be stitched both longitudinally and transversely thereof while in said stretched condition, and coordinated drive means for said conveyor, stretching means, and stitching means.

19. A device for stitching juxtaposed layers of animal intestines, comprising means for conveying said juxtaposed layers of animal intestines in moist condition, means for stretching said layers of animal intestines supported on said conveying means and holding them in a taut condition, said means for stretching being under the control of layers on the conveying means, spaced sewing means operatively associated with said conveyor means for stitching said layers of animal intestines longitudinally adjacent their marginal edges over portions of the length thereof, and said sewing means being spaced longitudinally along the juxtaposed layers of animal intestines for cross-stitching the same between said longitudinal stitching intermediate the ends of said layers of animal intestines while in said stretched condition, and coordinated drive means for said conveyor, stretching means, and stitching means.

20. A device for stitching juxtaposed layers of animal intestines, comprising conveyor means having elements for receiving and supporting telescopically and generally tubularly arranged animal intestines, means for severing the wall of said telescopically and generally tubularly arranged animal intestines longitudinally while being moved by said conveyor to provide juxtaposed layers of said animal intestines, and means for stitching said layers of animal intestines while in said juxtaposed relation.

21. A device for stitching juxtaposed layers of animal intestines, comprising conveyor means having elements for receiving and supporting telescopically and generally tubularly arranged animal intestines, means for severing the wall of said telescopically and generally tubularly arranged animal intestines longitudinally while being moved by said conveyor to provide juxtaposed layers of said animal intestines, and spaced sewing means operatively associated with said conveyor means for stitching said layers of animal intestines longitudinally adjacent their marginal edges and cross-stitching the said layers of animal intestines between said longitudinal stitching.

22. A device for stitching juxtaposed layers of animal intestines, comprising conveyor means having elements for receiving and supporting telescopically arranged moist animal intestines, means for severing said telescopically arranged animal intestines longitudinally while being moved by said conveyor to provide juxtaposed layers of said animal intestines, means for stretching said juxtaposed layers of animal intestines supported on said conveying means and holding them in a taut condition, means cooperating with said conveying means for stitching said layers of animal intestines longitudinally and transversely while in said juxtaposed relation while in said stretched condition, and coordinated drive means for said conveyor, stretching means, and stitching means.

23. A device for stitching juxtaposed layers of animal intestines, comprising conveyor means having elements for receiving and supporting telescopically arranged moist animal intestines, means for severing said telescopically arranged animal intestines longitudinally while being moved by said conveyor to provide juxtaposed layers of said animal intestines, means for stretching said juxtaposed layers of animal intestines supported on said conveying means and holding them in a taut condition, spaced sewing means operatively associated with said conveyor means for stitching said layers of animal intestines longitudinally adjacent their marginal edges and cross-stitching the said layers of animal intestines between said longitudinal stitching while in said stretched condition, and coordinated drive means for said conveyor, stretching means, and stitching means.

24. A device for stitching juxtaposed layers of animal intestines, comprising conveyor means having elements for receiving and supporting telescopically and generally tubularly arranged animal intestines, means for severing the wall of said telescopically and generally tubularly arranged animal intestines longitudinally while being moved by said conveyor to provide juxtaposed layers of said animal intestines, means cooperating with said conveying means for stitching said layers of animal intestines longitudinally and transversely while in said juxtaposed relation, and means for effecting relative movement between the layers of animal intestines and the conveyor means after passing the stitching means for removing said stitched layers of animal intestines from said conveyor.

25. A device for stitching juxtaposed layers of animal intestines, comprising conveyor means having elements for receiving and supporting telescopically arranged moist animal intestines, means for severing said telescopically arranged animal intestines longitudinally while being moved by said conveyor to provide juxtaposed layers of said animal intestines, means for stretching said juxtaposed layers of animal intestines supported on said conveying means and holding them in a taut condition, means cooperating with said conveying means for stitching said layers of animal intestines longitudinally and transversely while in said juxtaposed relation while in said stretched condition, and means for effecting relative movement between the layers of animal intestines and the conveyor means after passing the stitching means for removing said stitched layers of animal intestines from said conveyor.

26. A device for stitching juxtaposed layers of animal intestines, comprising conveyor means having elements for receiving and supporting telescopically and generally tubularly arranged animal intestines, means for severing the wall of said telescopically and generally tubularly arranged animal intestines longitudinally while being moved by said conveyor to provide juxtaposed layers of said animal intestines, spaced sewing means operatively associated with said conveyor means for stitching said layers of animal intestines longitudinally adjacent their marginal edges and cross-stitching the said layers of animal intestines between said longitudinal stitching, and means for effecting relative movement between the layers of animal intestines and the conveyor means after passing the stitching means for removing said stitched layers of animal intestines from said conveyor.

27. A device for stitching juxtaposed layers of animal intestines, comprising conveyor means having elements for receiving and supporting telescopically arranged moist animal intestines, means for severing said telescopically arranged animal intestines longitudinally while being moved by said conveyor to provide juxtaposed layers of said animal intestines, means for stretching said juxtaposed layers of animal intestines supported on said conveying means and holding them in a taut condition, spaced sewing means operatively associated with said conveyor means for stitching said layers of animal intestines longitudinally adjacent their marginal edges and cross-stitching the said layers of animal intestines between said longitudinal stitching while in said stretched condition, and means for effecting relative movement between the layers of animal intestines and the conveyor means after passing the stitching means for removing said stitched layers of animal intestines from said conveyor.

28. In a device for handling animal intestines and the like, the combination of a conveyor comprising spaced conveyor elements having means engageable with said animal intestines, means to measure the tautness of the intestines stretched between said elements, variable means under the control of said measuring means for guiding said conveyor to vary the degree of tautness by changing the spacing of said conveyor elements during a portion of their normal operating cycle, stitching means for sewing along the marginal edges of said intestines, and means under the control of said measuring means to position said stitching means adjacent said edges.

29. In a device for handling animal intestines and the like, the combination of a conveyor comprising spaced conveyor elements having means engageable with said animal intestines, means to measure the tautness of the intestines stretched between said elements, means for presenting animal intestines to said conveyor elements, variable guide means for said conveyor elements under the control of said measuring means for increasing the space therebetween from said last-named means in the direction of travel of said conveyor to increase the tautness in the stretched intestines, stitching means for sewing along the marginal edges of said intestines, and means under the control of said measuring means to position said stitching means adjacent said edges.

30. In a device for handling animal intestines and the like, the combination of a conveyor comprising spaced conveyor elements having spaced teeth for puncturing and supporting said animal intestines, resilient means into which said teeth are pressed for presenting said animal intestines to said elements, and guide means for directing the teeth of said conveyor elements into close proximity to one another adjacent said last named means.

31. In a device for handling animal intestines and the like, the combination of a conveyor comprising spaced conveyor elements having spaced teeth for puncturing and supporting said animal intestines, means for presenting said animal intestines to said elements, guide means for directing the teeth of said conveyor elements into close proximity to one another adjacent said last named means and for increasing the spacing between said elements in the direction of travel thereof, and cutting means to sever the intestines longitudinally along a line disposed between said closely spaced elements, said guide means increasing the spacing between said elements after the intestines have been cut.

32. In a device for handling animal intestines and the like, the combination of a conveyor comprising spaced conveyor elements having spaced teeth for puncturing and supporting said animal intestines, means for presenting said animal intestines to said elements, guide means for directing the teeth of said conveyor elements into close proximity to one another adjacent said last named means and for increasing the spacing between said elements as the conveyor travels forwardly, said guide means including means to change the relative angular relation of the teeth of said conveyor elements as the conveyor travels forwardly, stitching means for sewing along the marginal edges of said intestines, and means under the control of said measuring means to position said stitching means adjacent said edges.

33. In a device for handling animal intestines and the like, the combination of a conveyor comprising spaced conveyor elements having spaced teeth for puncturing and supporting said animal intestines, means for presenting telescopically arranged animal intestines to said elements, guide means for said elements for directing said elements into close proximity to one another adjacent said last named means, said last named means having feed rollers for said intestines operated by said teeth as said teeth puncture said intestines disposed thereon, and means disposed in association with said rollers for severing said telescopically arranged animal intestines longitudinally thereof as the same are moved by said conveyor elements.

34. In a device for handling animal intestines and the like, the combination of a conveyor comprising spaced conveyor elements having spaced teeth for puncturing and supporting said animal intestines, means for presenting telescopically arranged animal intestines to said elements, guide means for said elements for directing said elements into close proximity to one another adjacent said last named means, said last named means having feed rollers for said intestines operated by said teeth as said teeth puncture said intestines disposed thereon, means disposed in association with said rollers for severing said telescopically arranged animal intestines longitudinally thereof as the same are moved by said conveyor elements, and means for spreading and guiding said intestines after being severed longitudinally.

35. In a device for handling animal intestines and the like, the combination of a conveyor comprising spaced conveyor elements having spaced teeth for puncturing and supporting said animal intestines, means for presenting telescopically arranged animal intestines to said elements, said means having adjacently disposed feed rollers for receiving said telescopically arranged animal intestines, guide means for directing said conveyor elements into close proximity to one another whereby the teeth thereof are adapted to puncture said intestines and feed rollers for moving said intestines in the direction of travel of said conveyor, means adjacent said feed rollers for severing said telescopically arranged animal intestines longitudinally thereof, and said guide means being so constructed and arranged as to vary the angularity of said teeth for supporting said severed intestines in juxtaposed relation therebetween.

36. In a device for handling animal intestines and the like, the combination of a conveyor comprising spaced conveyor elements having spaced teeth for puncturing and supporting said animal intestines, means for presenting telescopically arranged animal intestines to said elements, said means having adjacently disposed feed rollers for receiving said telescopically arranged animal intestines, guide means for directing said conveyor elements into close proximity to one another whereby the teeth thereof are adapted to puncture said intestines and feed rollers for moving said intestines in the direction of travel of said conveyor, means adjacent said feed rollers for severing said telescopically arranged animal intestines longitudinally thereof, said guide means being so constructed and arranged as to vary the angularity of said teeth for supporting said severed intestines in juxtaposed relation therebetween, and means for moving said punctured animal intestines with respect to said teeth to firmly affix the same thereto.

37. In a device for handling animal intestines and the like, the combination of means for feeding telescopically arranged animal intestines to said device, a conveyor comprising spaced conveyor elements having spaced teeth, guide means for directing said conveyor elements into close proximity to one another adjacent said feeding means whereby said teeth are adapted to puncture said intestines for moving the same, means in the path of movement of said intestines to sever the same longitudinally, said guide means being so constructed and arranged as to turn said teeth into supporting relation with said severed animal intestines in superimposed relation therebetween.

38. In a device for handling animal intestines and the like, the combination of means for feeding telescopically arranged animal intestines to said device, a conveyor comprising spaced conveyor elements having spaced teeth, guide means for directing said conveyor elements into close proximity to one another adjacent said feeding means whereby said teeth are adapted to puncture said intestines for moving the same, means in the path of movement of said intestines to sever the same longitudinally, said guide means being so constructed and arranged as to turn said teeth into supporting relation with said severed animal intestines in superimposed relation therebetween, and means operable to move said intestines relative to said teeth when the same are in supporting relation thereto to firmly affix said superimposed animal intestines to said conveyor elements.

39. A device for stitching animal intestines comprising a continuously operable conveyor comprising spaced flexible conveyor elements having spaced teeth, means adjacent one end of said conveyor for feeding telescopically arranged animal intestines thereto, guide means for said conveyor adjacent said one end thereof for directing said teeth into puncturing relation to said telescopically arranged animal intestines in close proximity to one another to pick up and move said intestines in the normal direction of movement thereof, means adjacent said feeding means for severing said telescopically arranged animal intestines while being moved by said conveyor, said guide means being disposed to move said teeth into supporting relation to said severed animal intestines disposed therebetween in superimposed relation, sewing means in spaced relation to said feeding and severing means for stitching said superimposed animal intestines, and adjustable guide means for said conveyor elements adjacent said sewing means.

40. A device for stitching animal intestines, comprising a continuously operable conveyor comprising spaced flexible conveyor elements having spaced teeth, means adjacent one end of said conveyor for feeding telescopically arranged animal intestines thereto, guide means for said conveyor adjacent said one end thereof for directing said teeth into puncturing relation to said telescopically arranged animal intestines in close proximity to one another to pick up and move said intestines in the normal direction of movement thereof, means adjacent said feeding means for severing said telescopically arranged animal intestines while being moved by said conveyor, said guide means being disposed to move said teeth into supporting relation to said severed animal intestines disposed therebetween in superimposed relation, sewing means in spaced relation to said feeding and severing means for stitching said superimposed animal intestines, guide means for said conveyor elements disposed adjacent said sewing means, and means for adjusting said last named guide means to accommodate superimposed animal intestines of various widths.

41. A device for stitching animal intestines, comprising a continuously operable conveyor comprising spaced flexible conveyor elements having spaced teeth, means adjacent one end of said conveyor for feeding telescopically arranged animal intestines thereto, guide means for said conveyor adjacent said one end thereof for directing said teeth into puncturing relation to said telescopically arranged animal intestines in close proximity to one another to pick up and move said intestines in the normal direction of movement thereof, means adjacent said feeding means for severing said telescopically arranged animal intestines while being moved by said conveyor, said guide means being disposed to move said teeth into supporting relation to said severed animal intestines disposed therebetween in superimposed relation, sewing means in spaced relation to said feeding and severing means for stitching said superimposed animal intestines, movable guide means for said conveyor elements adjacent said sewing means, and means for adjusting said guide means in accordance with predetermined tautness desired in said animal intestines prior to a sewing operation.

42. A device for stitching animal intestines, comprising a continuously operable conveyor comprising spaced flexible conveyor elements having spaced teeth, means adjacent one end of said conveyor for feeding telescopically arranged animal intestines thereto, guide means for said conveyor adjacent said one end thereof for directing said teeth into puncturing relation to said telescopically arranged animal intestines in close proximity to one another to pick up and move said intestines in the normal direction of movement thereof, means adjacent said feeding means for severing said telescopically arranged animal intestines while being moved by said conveyor, said guide means being disposed to move said teeth into supporting relation to said severed animal intestines disposed therebetween in superimposed relation, sewing means in spaced relation to said feeding and severing means for stitching said superimposed animal intestines, and means for discharging said stitched animal intestines from said conveyor.

43. A method of stitching juxtaposed layers of material, comprising the steps of conveying juxtaposed layers of material in a unidirectional linear feeding movement to present said layers of material to sewing mechanism, and stitching said juxtaposed layers of material longitudinally along both marginal edges while holding the layers on the conveyor, and stitching said layers transversely from substantially one margin to the other according to a desired stitching pattern.

44. A method of stitching juxtaposed layers of material, comprising the steps of conveying juxtaposed layers of material in a unidirectional linear feeding movement to present said layers of material to sewing mechanism, stitching said juxtaposed layers of material longitudinally adjacent each of their marginal edges over a portion of their length, cross-stitching said layers of material from substantially one margin to the other, and then stitching said layers of material longitudinally and adjacent their marginal edges over another portion of their length, all of said stitching steps being accomplished during the single conveying step.

45. A method of stitching animal intestines, comprising the steps of positioning layers of moist animal intestines in juxtaposed relation, and temporarily binding the layers together while stitching said layers of animal intestines longitudinally along both margins and transversely thereof during a single stitching operation.

46. A method of stitching animal intestines, comprising the steps of positioning layers of moist animal intestines in juxtaposed relation, temporarily binding the layers together while stitching said layers of animal intestines longitudinally adjacent their marginal edges over a portion of their length, cross-stitching said layers of animal intestines, and then stitching said layers of animal intestines longitudinally and adjacent their marginal edges over another portion of their length, said marginal and cross-stitching being accomplished during a single stitching operation.

47. A method of stitching animal intestines, comprising the steps of positioning layers of moist animal intestines in juxtaposed relation, tensioning said layers of animal intestines by means under the control of the layers, presenting said layers of animal intestines in taut condition to sewing mechanism, and temporarily binding the layers together while stitching said layers of animal intestines.

48. A method of stitching animal intestines, comprising the steps of positioning layers of moist animal intestines in juxtaposed relation, tensioning said layers of animal intestines by means under the control of the layers, presenting said layers of animal intestines in taut condition to sewing mechanism, and temporarily binding the layers together while stitching said layers of animal intestines longitudinally and transversely thereof.

49. A method of stitching animal intestines, comprising the steps of positioning layers of moist animal intestines in juxtaposed relation, presenting said layers of animal intestines in taut condition to sewing mechanism, temporarily binding the layers together while stitching said layers of animal intestines longitudinally adjacent their marginal edges, and cross-stitching said layers of animal intestines transversely thereof and between said first named stitching.

50. A method of forming casings from animal intestines, comprising the steps of slitting moist telescopically arranged animal intestines longitudinally thereof, presenting said moist slit intestines in juxtaposed relation to sewing mechanism, and stitching said juxtaposed animal intestines substantially simultaneously along each marginal edge and transversely thereof during a single stitching operation.

51. A method of forming casings from animal intestines, comprising the steps of slitting moist telescopically arranged animal intestines longitudinally thereof, presenting said moist slit intestines in juxtaposed relation to sewing mechanism, stitching said animal intestines longitudinally adjacent their marginal edges over a portion of their length, cross-stitching said animal intestines in spaced relation and transversely thereof, and then stitching said animal intestines longitudinally and adjacent their marginal edges over another portion of their length during a single stitching operation.

52. A method of forming casings from animal intestines, comprising the steps of slitting moist telescopically arranged animal intestines longitudinally thereof, spreading said slit intestines in superimposed relation, stretching said superimposed intestines to a predetermined taut condition, stitching said intestines longitudinally adjacent their marginal edges, and cross-stitching said intestines transversely thereof between said first named stitching.

53. A method of forming casings from animal intestines, comprising the steps of slitting moist telescopically arranged animal intestines longitudinally thereof, spreading said slit intestines in superimposed relation, stretching said superimposed intestines to a predetermined taut condition, stitching said intestines longitudinally adjacent their marginal edges over a portion of their length, cross-stitching said intestines in spaced relation and transversely thereof, and then stitching said intestines longitudinally and adjacent their marginal edges over another portion of their length.

54. A method of forming casings from animal intestines, comprising the steps of moving moist telescopically arranged animal intestines in a substantially linear path, slitting said intestines longitudinally while moved, supporting said slit intestines in superimposed relation adjacent opposed marginal edges thereof, spreading and stretching said superimposed intestines to the desired taut condition while being moved, and while in said taut condition subjecting said intestines to a stitching operation to stitch adjacent the marginal edges thereof and to cross-stitch therebetween.

55. In a sewing device, the combination of a conveyor having spaced conveyor elements provided with spaced teeth for supporting stitched material impaled thereon between said elements at spaced intervals and interconnected by said stitching, and means for stripping said material from said conveyor elements, said means comprising opposed conveyor belts whose active path for engaging the stitched material intersects the path of and which is disposed between said first named conveyor elements for receiving and conveying said material therebetween, and stripper elements disposed on opposite sides of said last named conveyor belts, said stripper elements having guide means for said stitching between said successive stitched material.

56. In a device for making casings from animal intestines, the combination of conveyor means for supporting and moving stitched animal intestines to discharge the same from said device, said stitched animal intestines being carried by said conveyor as spaced units interconnected by lines of stitching, and means for removing said stitched intestines from said conveyor, said means comprising opposed continuously operable conveyor belts whose active path for engaging the stitched material intersects the path of said conveyor means, and stripper elements disposed on opposite sides of said conveyor belts, said stripper elements being channeled longitudinally thereof to receive the lines of stitching.

57. In a device for sewing juxtaposed layers of material, the combination of spaced conveyor elements for supporting said layers of material therebetween, movable guide means for said conveyor elements, sewing means associated with said guide means and movable in accordance with the movement of said guide means, means controlled by a material on the conveyor for adjusting said guide means, and means operated by said last named means for adjusting said sewing means in accordance with the adjustment of said guide means.

58. In a device for handling animal intestines and the like, the combination of conveyor means adapted to receive pairs of telescopically arranged intestines at predetermined intervals, means for operating said conveyor means, means for slitting said telescopically arranged intestines as the same are conveyed by said conveyor means, said conveyor means being adapted to thereafter move said slit intestines in superimposed relation into operative association with stitching means, variable guide means to spread said conveyor to adjust the tension on each pair of slit intestines, electrical control means, said electrical control means including signaling means whereby telescopically arranged animal intestines can be fed to said conveyor means at said predetermined intervals.

59. In a device for handling animal intestines and the like, the combination of conveyor means adapted to receive pairs of telescopically arranged intestines at predetermined intervals, means for operating said conveyor means, means for slitting said telescopically arranged intestines as the same are conveyed by said conveyor means, said conveyor means being adapted to move said slit intestines in superimposed relation into operative association with stitching means, variable guide means to spread said conveyor to adjust the tension on each pair of slit intestines, electrical control means, said electrical control means including means normally rendered operable to maintain operation of said conveyor means when telescopically arranged animal intestines are fed to said conveyor at predetermined intervals, and said electrical control means including means to render said conveyor operating means inoperative when said telecopically arranged intestines are not fed to said conveyor means at said predetermined intervals.

60. In a device for handling animal intestines and the like, the combination of conveyor means adapted to receive telescopically arranged intestines, means for operating said conveyor means, means for slitting said telescopically arranged intestines as the same are conveyed by said conveyor means, said conveyor means being adapted to move said slit intestines in superimposed relation, electrical control means, said electrical control means including means normally rendered operable to maintain operation of said conveyor means when telescopically arranged animal intestines are fed to said conveyor at predetermined intervals, said electrical control means including signaling means indicating the necessity of feeding telescopically arranged animal intestines to said conveyor means to maintain said means for operating said conveyor means operable, and said electrical control means including means to render said conveyor operating means inoperative when said telescopically arranged intestines are not fed to said conveyor means at said predetermined intervals.

61. In a device for handling animal intestines and the like, the combination of conveyor means adapted to receive telescopically arranged intestines, means for operating said conveyor means, means for slitting said telescopically arranged intestines as the same are conveyed by said conveyor means, said conveyor means being adapted to move said slit intestines in superimposed relation, electrical control means, said electrical control means including means normally rendered operable to maintain operation of said conveyor means, and said electrical control means having means disposed in spaced relation with respect to said conveyor means for controlling operation of said last named means.

62. In a device for handling animal intestines and the like, the combination of conveyor means adapted to receive telescopically arranged intestines, means for operating said conveyor means, means for slitting said telescopically arranged intestines as the same are conveyed by said conveyor means, said conveyor means being adapted to move said slit intestines in superimposed relation, electrical control means, said electrical control means including means normally rendered operable to maintain operation of said conveyor means, and said electrical control means having means disposed in spaced relation with respect to said conveyor means for controlling operation of said last named means, one of said spaced means being in the path of movement of telescopically arranged animal intestines fed to said conveyor and the other of said means being in the path of movement of said superimposed layers of animal intestines.

63. In a device for handling animal intestines and the like, the combination of conveyor means adapted to receive telescopically arranged intestines, means for operating said conveyor means, means for slitting said telescopically arranged intestines as the same are conveyed by said conveyor means, said conveyor means being adapted to move said slit intestines in superimposed relation, electrical control means, said electrical control means including a relay normally closed to maintain operation of said conveyor means, control relays for controlling operation of said first named relay, and control means disposed in spaced relation with respect to said conveyor means for controlling operation of said control relays, one of said control means being in the path of movement of telescopically arranged animal intestines fed to said conveyor and the other of said control means being in the path of movement of said superimposed layers of animal intestines.

64. In a device for handling animal intestines and the like, the combination of conveyor means adapted to receive telescopically arranged intestines, means for operating said conveyor means, means for slitting said telescopically arranged intestines as the same are conveyed by said conveyor means, said conveyor means being adapted to move said slit intestines in superimposed relation, electrical control means, said electrical control means including a relay normally closed to maintain operation of said conveyor means, control relays for controlling operation of said first named relay, control means disposed in spaced relation with respect to said conveyor means for controlling operation of said control relays, one of said control means being in the path of movement of telescopically arranged animal intestines fed to said conveyor and the other of said control means being in the path of movement of said superimposed layers of animal intestines, and an electrical interlock between said control relays.

65. In a device for handling animal intestines and the like, the combination of conveyor means adapted to receive telescopically arranged intestines, means for operating said conveyor means, means for slitting said telescopically arranged intestines as the same are conveyed by said conveyor means, said conveyor means being adapted to move said slit intestines in superimposed relation, electrical control means, said electrical control means including a relay normally closed to maintain operation of said conveyor, said electrical control means including a control circuit including the operating coil for said relay and control relays for controlling said operating coil, control means spaced in relation to said conveyor means for controlling the operation of said control relays, one of said control means being in said control circuit for controlling one of said control relays and being normally open but in the path of movement of said telescopically arranged animal intestines to be closed thereby, the other of said control means being in said control circuit for controlling the other of said control relays and being normally closed but in the path of movement of said superimposed layers of animal intestines to be opened thereby, and said control circuit including an electrical interlock between said control relays whereby said operating coil is maintained deenergized to maintain operation of said conveyor operating means when either one of said control means is closed by said intestines to deenergize said control circuit in the normal operation of said device.

66. In a device for handling animal intestines and the like, the combination of conveyor means adapted to receive telescopically arranged intestines, means for operating said conveyor means, means for slitting said telescopically arranged intestines as the same are conveyed by said conveyor means, said conveyor means being adapted to move said slit intestines in superimposed relation, electrical control means, said electrical control means including a relay normally closed to maintain operation of said conveyor, said electrical control means including a control circuit including the operating coil for said relay and control relays for controlling said operating coil, control means spaced in relation to said conveyor means for controlling the operation of said control relays, one of said control means being in said control circuit for controlling one of said control relays and being normally open but in the path of movement of said telescopically arranged animal intestines to be closed thereby, the other of said control means being in said control circuit for controlling the other of said control relays and being normally closed but in the path of movement of said superimposed layers of animal intestines to be opened thereby, said control circuit including an electrical interlock between said control relays whereby said operating coil is maintained deenergized to maintain operation of said conveyor operating means when either one of said control means is closed by said intestines to deenergize said control circuit in the normal operation of said device, said control circuit embodying in said electrical interlock means for rendering said one of said control means ineffective to operate its control relay even though open prior to the return of said other of said control means to its normal closed position.

67. In a device for stitching superimposed layers of animal intestines and the like, the combination of spaced movable conveyor elements adapted to support said superimposed layers of animal intestines therebetween, guide members for said conveyor elements, means for moving at least one of said guide members laterally away from and with respect to the other guide member, electrical control means for controlling operation of said means for moving at least said one of said guide members, and means operable when said superimposed layers of animal intestines are in predetermined relation to said guide members for controlling said electrical control means to initiate operation of said means for moving at least said one of said guide members to tension said superimposed layers of animal intestines.

68. In a device for stitching superimposed layers of animal intestines and the like, the combination of spaced movable conveyor elements adapted to support said superimposed layers of animal intestines therebetween, guide members for said conveyor elements, means for moving at least one of said guide members laterally away from and with respect to the other guide member, electrical control means for controlling operation of said means for moving at least one of said guide members, means operable when said superimposed layers of animal intestines are in predetermined relation to said guide members for controlling said electrical control means to initiate operation of said means for moving at least said one of said guide members to tension said superimposed layers of animal intestines, and means operable in accordance with predetermined desired tension of said superimposed layers of animal intestines to render said means for moving at least said one of said guide members inoperative.

69. In a device for stitching superimposed layers of animal intestines and the like, the combination of spaced movable conveyor elements adapted to support said superimposed layers of animal intestines therebetween, laterally movable guide members for said conveyor elements, means for moving said guide members laterally toward and away from each other, electrical control means for controlling operation of said means for moving said guide members, means in the path of movement of said superimposed layers of animal intestines for controlling said electrical control means to initiate operation of said means for moving said guide members to move the same apart to tension said superimposed layers of animal intestines, and means operable in accordance with predetermined desired tension of said superimposed layers of animal intestines to render said means for moving said guide members inoperative.

70. In a device for stitching superimposed layers of animal intestines and the like, the combination of spaced movable conveyor elements adapted to support said superimposed layers of animal intestines therebetween, movable guide members for said conveyor elements, means for moving said guide members, said last named means including a driving element, brake mechanism for said element, electrical control means for controlling operation of said means for moving said guide members, means in the path of movement of said superimposed layers of animal intestines for controlling said electrical control means to initiate operation of said means for moving said guide members to move the same apart to tension said superimposed layers of animal intestines, said electrical means including means for rendering said brake mechanism inoperative upon operation of said means for moving said guide members and for rendering the same operative to stop said driving element when said means for operating said means for moving said guide members is inoperative, and means operable in accordance with predetermined desired tension of said superimposed layers of animal intestines to render said means for moving said guide members inoperative.

71. In a device for stitching superimposed layers of animal intestines and the like, the combination of spaced movable conveyor elements adapted to support said superimposed layers of animal intestines therebetween, movable guide members for said conveyor elements, adjustable sewing mechanisms for sitching said superimposed layers of animal intestines, means for simultaneously moving said guide members and adjusting said sewing mechanisms to correspond to the said movement of said guide members, electrical control means for controlling the operation of said last named means, means in the path of movement of said superimposed layers of animal intestines for controlling said electrical control means to initiate operation of said last named means to move said guide members apart to tension said superimposed layers of animal intestines and to adjust said sewing mechanisms in accordance with the movement of said guide members, and means operable in accordance with predetermined desired tension of said superimposed layers of animal intestines to render said last named means inoperative.

72. In a device for stitching superimposed layers of animal intestines and the like, the combination of spaced movable conveyor elements adapted to support said superimposed layers of animal intestines therebetween, movable guide members for said conveyor elements, adjustable sewing mechanisms for stitching said superimposed layers of animal intestines, means for simultaneously moving said guide members and adjusting said sewing mechanisms to correspond to the said movement of said guide members, said last named means including a driving element, brake mechanism for said element, electrical control means for controlling the operation of said last named means, means in the path of movement of said superimposed layers of animal intestines for controlling said electrical control means to initiate operation of said last named means to move said guide members apart to tension said superimposed layers of animal intestines and to adjust said sewing mechanisms in accordance with the movement of said guide members, said electrical control means including means for rendering said brake mechanism inoperative upon operation of said last named means and for rendering the same operative to stop said driving element when said last named means is inoperative, and means operable in accordance with predetermined desired tension of said superimposed layers of animal intestines to render said last named means inoperative.

73. In a device for stitching superimposed layers of animal intestines and the like, the combination of spaced movable conveyor elements adapted to support said superimposed layers of animal intestines therebetween, movable guide members for said conveyor elements, adjustable and movable sewing mechanisms for stitching said superimposed layers of animal intestines, means for simultaneously moving said guide members and adjusting said sewing mechanisms to correspond to the said movement of said guide members, means for moving said sewing mechanisms, electrical control means, said electrical control means having means for controlling the operation of said means for moving said sewing mechanisms, means in the path of movement of said superimposed layers of animal intestines for controlling said electrical control means to initiate operation of said means for simultaneously moving said guide members and adjusting said sewing mechanisms to move said guide members apart to tension said superimposed layers of animal intestines and to adjust said sewing mechanisms in accordance with the movement of said guides, said electrical control means having means conditioned by said means for moving said sewing mechanisms to render said means in the path of movement of said superimposed layers of animal intestines effective for controlling said electrical control means, means operable in accordance with predetermined desired tension of said superimposed layers of animal intestines to render said means for simultaneously moving said guide members and adjusting said sewing mechanisms inoperative, and means in the path of movement of said superimposed layers of animal intestines for controlling said electrical control means to initiate operation of said means for moving said sewing mechanisms.

74. In a device for stitching superimposed layers of animal intestines and the like, the combination of spaced movable conveyor elements adapted to support said superimposed layers of animal intestines therebetween, movable guide members for said conveyor elements, adjustable and movable sewing mechanisms for stitching said superimposed layers of animal intestines, means for simultaneously moving said guide members and adjusting said sewing mechanisms to correspond to the said movement of said guide members, means for moving said sewing mechanisms, electrical control means, said electrical control means having means for controlling the operation of said means for moving said sewing mechanisms, detecting means in the path of movement of said superimposed layers of animal intestines for controlling said electrical control means to initiate operation of said means for simultaneouslly moving said guide members and adjusting said sewing mechanisms to move said guide members apart to tension said superimposed layers of animal intestines and to adjust said sewing mechanisms in accordance with the movement of said guide members, said electrical control means having means conditioned by said means for moving said sewing mechanisms to render said means in the path of movement of said superimposed layers of animal intestines effective for controlling said electrical control means, means operable in accordance with predetermined desired tension of said superimposed layers of animal intestines to render said means for simultaneously moving said guide members and adjusting said sewing mechanisms inoperative, means in the path of movement of said superimposed layers of animal intestines for controlling said electrical control means to initiate operation of said means for moving said sewing mechanisms, and said first named detecting means in the path of movement of said superimposed layers of animal intestines having means operable upon return to normal position in disengaged relation to said superimposed layers of animal intestines for controlling said electrical control means to operate said means for simultaneously moving said guide members and adjusting said sewing mechanisms to return said guide members and said sewing mechanisms to their innermost position toward the end of a stitching cycle.

75. In a device for stitching superimposed layers of animal intestines and the like, the combination of spaced movable conveyor elements adapted to support said superimposed layers of animal intestines therebetween, movable guide members for said conveyor elements, adjustable and movable sewing mechanisms for stitching said superimposed layers of animal intestines, means for simultaneously moving said guide members and adjusting said sewing mechanisms to correspond to the said movement of said guide members, means for moving said sewing mechanisms, means for driving said means for moving said sewing mechanisms including a clutch, electrical control means, said electrical control means including means for rendering said clutch inoperative to drive said means for moving said sewing mechanisms, said electrical control means having means for controlling the operation of said means for simultaneously moving said guide members and adjusting said sewing mechanisms, means in the path of movement of said superimposed layers of animal intestines for controlling said electrical control means to operate said clutch to drive said means for moving said sewing mechanisms, said electrical control means having means conditioned by said means for moving said sewing mechanisms to render said means in the path of movement of said superimposed layers of animal intestines effective for controlling said electrical control means, and means operable in accordance with predetermined desired tension of said superimposed layers of animal intestines to render said means for simultaneously moving said members and adjusting said sewing mechanisms inoperative.

76. In a device for stitching superimposed layers of animal intestines and the like, the combination of spaced movable conveyor elements adapted to support said superimposed layers of animal intestines therebetween, movable guide members for said conveyor elements, adjustable and movable sewing mechanisms for stitching said superimposed layers of animal intestines, means for simultaneously moving said guide members and adjusting said sewing mechanisms to correspond to the said movement of said guide members, means for moving said sewing mechanisms, means for driving said means for moving said sewing mechanisms including a clutch, electrical control means, said electrical control means including means for rendering said clutch inoperative to drive said means for moving said sewing mechanisms, said electrical control means having means for controlling the operation of said means for simultaneously moving said guide members and adjusting said sewing mechanisms, means in the path of movement of said superimposed layers of animal intestines for controlling said electrical control means to initiate operation of said means for simultaneously moving said guide members and adjusting said sewing mechanisms to move said guide members apart to tension said superimposed layers of animal intestines and to adjust said sewing mechanisms in accordance with the movement of said guides, means in the path of movement of said superimposed layers of animal intestines for controlling said electrical control means to operate said clutch to drive said means for moving said sewing mechanisms, said electrical control means having means conditioned by said means for moving said sewing mechanisms to render said means in the path of movement of said superimposed layers of animal intestines effective for controlling said electrical control means, means operable in accordance with predetermined desired tension of said superimposed layers of animal intestines to render said means for simultaneously moving said guide members and adjusting said sewing mechanisms inoperative, said first named means in the path of movement of said superimposed layers of animal intestines having means operable upon return to normal position in disengaged relation to said superimposed layers of animal intestines for controlling said electrical control means to operate said means for simultaneously moving said guide members and adjusting said sewing mechanisms to return said guide members and said sewing mechanisms to their innermost position toward the end of a stitching cycle, and said second named means in the path of movement of said superimposed layers of animal intestines having means operable upon return to normal position in disengaged relation to said superimposed layers of animal intestines for controlling said electrical control means to disengage said clutch and to render said drive inoperative to move said sewing mechanisms at the end of said stitching cycle.

77. In a device for stitching superimposed layers of animal intestines and the like, the combination of spaced movable conveyor elements adapted to support said superimposed layers of animal intestines therebetween, guide members for said conveyor elements, means for moving said guide members to tension said superimposed layers of animal intestines, movable sewing mechanisms for stitching said superimposed layers of animal intestines, means for moving said sewing mechanisms during a sewing cycle, and electrical control means operable in accordance with the movement of said superimposed layers of animal intestines to operate said means for moving said guide members and sewing mechanisms in a predetermined cycle of operation.

78. In a device for stitching superimposed layers of animal intestines and the like, the combination of spaced movable conveyor elements adapted to support said superimposed layers of animal intestines therebetween, guide members for said conveyor elements, movable sewing mechanisms for stitching said superimposed layers of animal intestines, means for moving said guide members from their normal innermost positions to tension said superimposed layers of animal intestines and to return the same to said normal innermost positions, means for moving said sewing mechanisms during a sewing cycle, and electrical control means controlled by the said superimposed layers of animal intestines to operate said means for moving said guide means and sewing mechanisms in a predetermined cycle of operation to stitch said superimposed layers of animal intestines and to return said guide members and said sewing mechanisms to their normal positions.

79. In a device for stitching superimposed layers of animal intestines and the like, the combination of spaced movable conveyor elements adapted to support said superimposed layers of animal intestines therebetween, guide members for said conveyor elements, movable sewing mechanisms for stitching said superimposed layers of animal intestines, means for moving said guide members from their normal innermost positions to tension said superimposed layers of animal intestines and to return the same to said normal innermost positions, means for moving said sewing mechanisms during a sewing cycle, electrical control means controlled by the said superimposed layers of animal intestines to operate said means for moving said guide means and sewing mechanisms in a predetermined cycle of operation to stitch said superimposed layers of animal intestines and to return said guide members and said sewing mechanisms to their normal positions, and said control means having means controlled by the operation of said means for moving said sewing mechanisms for returning said guide members to their normal position in predetermined relation to the operation thereof.

80. In a device for stitching superimposed layers of animal intestines and the like, the combination of spaced movable conveyor elements adapted to support spaced superimposed layers of animal intestines of different widths therebetween, guide members for said conveyor elements, movable sewing mechanisms for stitching said superimposed layers of animal intestines as the same are presented thereto, means for moving said guide members from their normal innermost positions to tension said superimposed layers of animal intestines prior to a stitching operation and to return the same to said normal innermost positions to receive the next successive superimposed layers of animal intestines therebetween, means for moving said sewing mechanisms during a sewing cycle, electrical control means, and means in the path of movement of said superimposed layers of animal intestines to initiate operation of said electrical control means to operate said means for moving said guide means and sewing mechanisms in a predetermined cycle of operation to stitch said superimposed layers of animal intestines and to return said guide members and said sewing mechanisms to their normal positions, said means being positioned in accordance with said predetermined cycle of operation to be operated by the superimposed layers of animal intestines successively presented by said conveyor elements whereby said electrical control means is operated in proper sequence in said cycle of operation.

81. In a device for stitching superimposed layers of animal intestines and the like, the combination of spaced movable conveyor elements adapted to support spaced superimosed layers of animal intestines of different widths therebetween, guide members for said conveyor elements, moving sewing mechanisms for stitching said suerimposed layers of animal intestines as the same are presented thereto, means for moving said guide members from their normal innermost positions to tension said superimposed layers of animal intestines prior to a stitching operation and to return the same to said normal innermost positions to receive the next successive superimposed layers of animal intestines therebetween, means for moving said sewing mechanisms during a sewing cycle, electrical control means, means in the path of movement of said superimposed layers of animal intestines to initiate operation of said electrical control means to operate said means for moving said guide means and sewing mechanisms in a predetermined cycle of operation to stitch said superimposed layers of animal intestines and to return said guide members and said sewing mechanisms to their normal positions, and means operated by said means for moving said sewing mechanisms to condition said electrical control means whereby said means in the path of movement of said superimposed layers of animal intestines are rendered effective to be operated by the superimposed layers of animal intestines successively presented by said conveyor elements to operate said electrical control means in proper sequence in said cycle of operation.

82. A device for preparing and stitching animal intestines and the like, comprising a conveyor having spaced conveyor elements for receiving telescopically arranged intestines, means for operating said conveyor, means for slitting said telescopically arranged animal intestines longitudinally whereby the same are disposed in superimposed relation between said conveyor elements, guide members for said conveyor elements for tensioning said superimposed layers of animal intestines, operating means for moving said members, sewing mechanisms for stitching said superimposed layers of animal intestines, operating means for moving said sewing mechanisms during a sewing cycle, and electrical control means for said operating means whereby telescopically arranged animal intestines fed to said conveyor at predetermined intervals automatically move progressively to be successively tensioned by said guide members, stitched by said sewing mechanisms, and discharged from said device.

83. In a machine adapted to receive and convey tubular elements into contact with cutting and sewing means, the combination of a conveyor, means to drive the conveyor, and control means for said drive means comprising primary means operative to maintain said drive means energized, monitoring means in the path of the cut elements and other monitoring means in the path of the tubular elements, said first named monitoring means being operative to render said primary means inoperative in order to stop said drive means when it alone is engaged by said cut element but being operative in cooperation with said other monitoring means when both are engaged by a cut element and a tubular element respectively to condition said primary means to render it operative to maintain said drive means energized.

84. In a machine adapted to receive and convey tubular elements into contact with cutting and sewing means, the combination of a conveyor, means to drive the conveyor, and control means for said drive means comprising electrical relay means operative to maintain said drive means energized, monitoring means in the path of the cut element and other monitoring means in the path of the tubular elements, said monitoring means controlling the electrical condition of said relay, and said first named monitoring means being operative to render said relay means inoperative in order to stop said drive means when it alone is engaged by said cut elements but being operative in cooperation with said second named monitoring means when both are engaged by a cut element and a tubular element respectively to condition said relay means to render it operative to maintain said drive means energized.

85. In a machine adapted to receive and convey tubular elements into contact with cutting and sewing means, the combination of a conveyor, means to drive the conveyor, and control means for said drive means comprising electrical relay means operative to maintain said drive means energized, monitoring means in the path of the cut elements and other monitoring means in the path of the tubular elements, each of said monitoring means including circuit making and breaking elements to control the electrical condition of said relay means, said first named monitoring means being operative through said circuit making and breaking means to render said relay means inoperative in order to stop said drive means when it alone is engaged by said cut elements but being operative through said circuit making and breaking means and in cooperation with said second named monitoring means when both are engaged by a cut element and a tubular element respectively to condition said relay means to render it operative to maintain said drive means energized.

86. In a machine adapted to receive and convey tubular elements into contact with cutting and sewing means, the combination of a conveyor for engaging tubular elements manually presented thereto, means to drive the conveyor, and control means including signaling means for said drive means, comprising primary means operative to maintain said drive means energized, monitoring means in the path of the cut elements and other monitoring means in the path of the tubular elements, said first named monitoring means being operative to render said primary means inoperative in order to stop said drive means when it alone is engaged by said cut elements but being operative in cooperation with said second named monitoring means when both are engaged by a cut element and a tubular element respectively to condition said primary means to render it operative to maintain said drive means energized, and signaling means under the control of each of said first named monitoring means to indicate when a tubular element should be presented to said conveyor means.

87. In a machine adapted to receive and convey tubular elements into contact with cutting and sewing means in a predetermined cyclic manner, the combination of a conveyor, means to drive the conveyor, and control means for said drive means comprising electrical relay means operative to maintain said drive means energized, monitoring means in the path of the cut elements and other monitoring means in the path of the tubular elements, each of said monitoring means including circuit making and breaking means to control the electrical condition of said relay means, said first named monitoring means being operative through said circuit making and breaking means to render said relay means inoperative in order to stop said drive means when it alone is engaged by said cut elements but being operative through said circuit making and breaking means and in cooperation with said second named monitoring means when both are engaged by a cut element and a tubular element respectively to condition said relay means to render it operative to maintain said drive means energized, said monitoring means establishing circuits through said circuit making and breaking means such that once both of said monitoring means have been actuated, said relay means will remain operative to render said drive means energized until said first named monitoring means shall be again engaged by a cut element during the next succeeding cycle of operations.

88. A method of stitching juxtaposed layers of material, comprising the steps of successively conveying a plurality of pairs of juxtaposed layers of material in a unidirectional feeding movement to present said pairs of layers of material to sewing means, successively stitching each of said pairs of said juxtaposed layers of material longitudinally adjacent each of their marginal edges over a portion of their length, cross-stitching each of said pairs of said layers of material from substantially one margin to the other by moving the sewing means relative to the layers being stitched and then relatively positioning the sewing means and layers being stitched for stitching each of said pairs of said layers of material longitudinally and adjacent their marginal edges over another portion of their length, said sewing means being positioned generally during said last named marginal stitching step for stitching the marginal edges of the succeeding pair of said layers, and all of said stitching steps on each of the respective pairs of layers being accomplished during the single conveying step.

CHARLES T. WALTER.
LOWELL R. NEWTON.

CERTIFICATE OF CORRECTION.

Patent No. 2,375,155. May 1, 1945.

CHARLES T. WALTER, ET AL.

It is hereby certified that error appears in the printed specification of the above numbered patent requiring correction as follows: Page 3, first column, line 45, for "tensiond" read --tensioned--; page 8, first column, line 6, for "motor 266" read --motor 268--; page 17, second column, line 66, for "opply" read --apply--; page 18, second column, line 31, for " "out" switch" read --"out" limit switch--; page 23, second column, line 16, claim 32, for "in" read --In--; page 28, first column, line 25, claim 70, for "electrical means" read --electrical control means--; page 29, first column, line 74, claim 75, for "said members" read --said guide members--; page 30, second column, line 16, claim 81, for "suerimposed" read --superimposed--; page 31, second column, line 28-29, claim 87, for "engaded" read --engaged--; and that the said Letters Patent should be read with this correction therein that the same may conform to the record of the case in the Patent Office.

Signed and sealed this 31st day of July, A. D. 1945.

Leslie Frazer (Seal) Acting Commissioner of Patents.